(12) United States Patent
Boutell et al.

(10) Patent No.: US 12,534,569 B2
(45) Date of Patent: Jan. 27, 2026

(54) FLOW CELLS

(71) Applicant: ILLUMINA, INC., San Diego, CA (US)

(72) Inventors: Jonathan Mark Boutell, Bishops Stortford (GB); Wayne N. George, Ilford (GB); Xiaoyu Ma, San Diego, CA (US); Xiaolin Wu, Cambridge (GB); Weixian Xi, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 775 days.

(21) Appl. No.: 17/855,325

(22) Filed: Jun. 30, 2022

(65) Prior Publication Data

US 2023/0042267 A1 Feb. 9, 2023

Related U.S. Application Data

(60) Provisional application No. 63/218,091, filed on Jul. 2, 2021.

(51) Int. Cl.
*C08G 63/685* (2006.01)
*C08G 63/82* (2006.01)
*C08G 63/91* (2006.01)

(52) U.S. Cl.
CPC ....... *C08G 63/6852* (2013.01); *C08G 63/823* (2013.01); *C08G 63/91* (2013.01)

(58) Field of Classification Search
None
See application file for complete search history.

(56) References Cited

U.S. PATENT DOCUMENTS

| 2004/0023207 A1* | 2/2004 | Polansky | A61K 48/005 435/456 |
| 2016/0053252 A1 | 2/2016 | Von Hatten et al. | |
| 2021/0190675 A1* | 6/2021 | Hong | G01N 21/05 |

FOREIGN PATENT DOCUMENTS

| WO | 2009056782 A1 | 5/2009 |
| WO | 2020005503 A1 | 1/2020 |
| WO | 2021126503 A1 | 6/2021 |
| WO | 2021127357 A2 | 6/2021 |
| WO | 2021133735 A1 | 7/2021 |

OTHER PUBLICATIONS

Tomasek et al., "Olefin Metathesis in Aqueous Media", Green Chem., 2013, 15, 2317-2338, DOI: 10.1039/c3gc41042k, Jul. 15, 2013.

Lu, Xiaojie, et al., "Ruthenium Promoted On-DNA Ring-Closing Metathesis and Cross-Metathesis", Bioconjugate Chem. 2017, 28, 6, 1625-1629, https://doi.org/10.1021/acs.bioconjchem.7b00292, Jun. 5, 2017.

Foster et al., "Ring-Opening Metathesis Polymerization in Aqueous Media Using a Macroinitiator Approach", Angew. Chem. Int. Ed., 2018, 57, 10672 -10676, https://doi.org/10.1002/anie.201806719, Jun. 26, 2018.

* cited by examiner

*Primary Examiner* — Samuel C Woolwine

(74) *Attorney, Agent, or Firm* — Dierker & Kavanaugh, P.C.

(57) ABSTRACT

An example of a kit includes a flow cell, a primer fluid, and a cleaving fluid. The flow cell includes at least one surface functionalized with a polymeric hydrogel including azide functional groups or amine functional groups. The primer fluid includes a plurality of alkyne-containing primers, each alkyne-containing primer having an amino cleavable group attaching a primer sequence of the alkyne-containing primer to an alkyne-containing moiety of the alkyne-containing primer. The cleaving fluid includes a substance that is reactive with the amino cleavable group.

12 Claims, 13 Drawing Sheets

Specification includes a Sequence Listing.

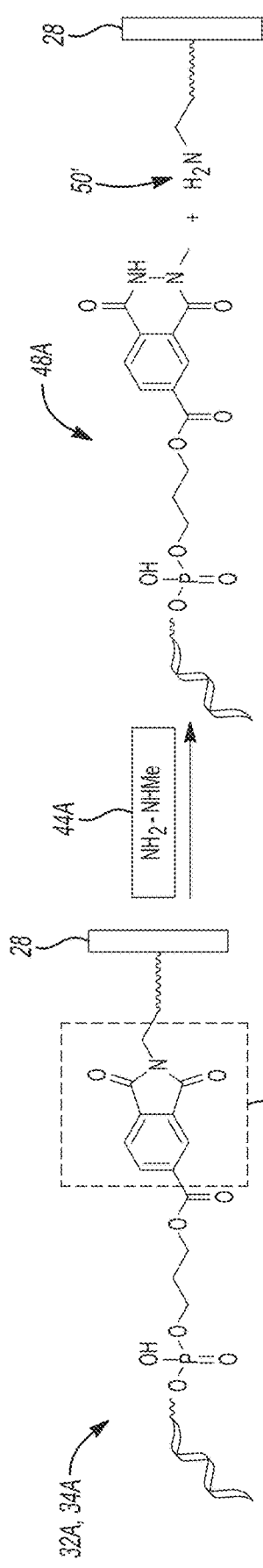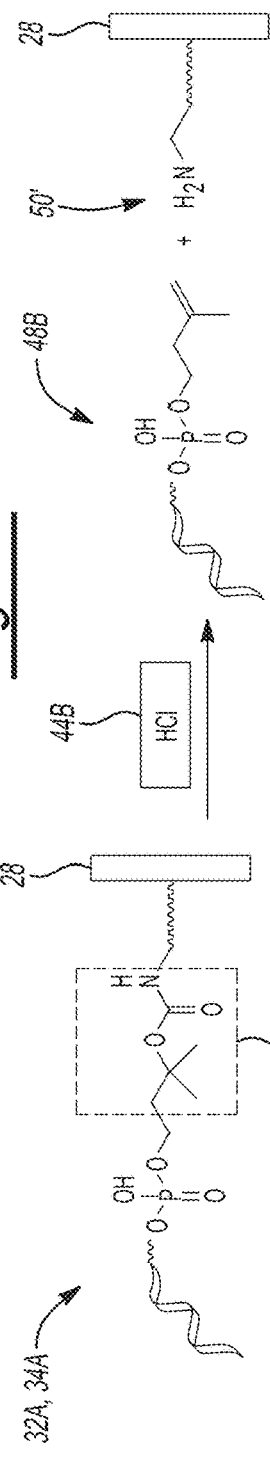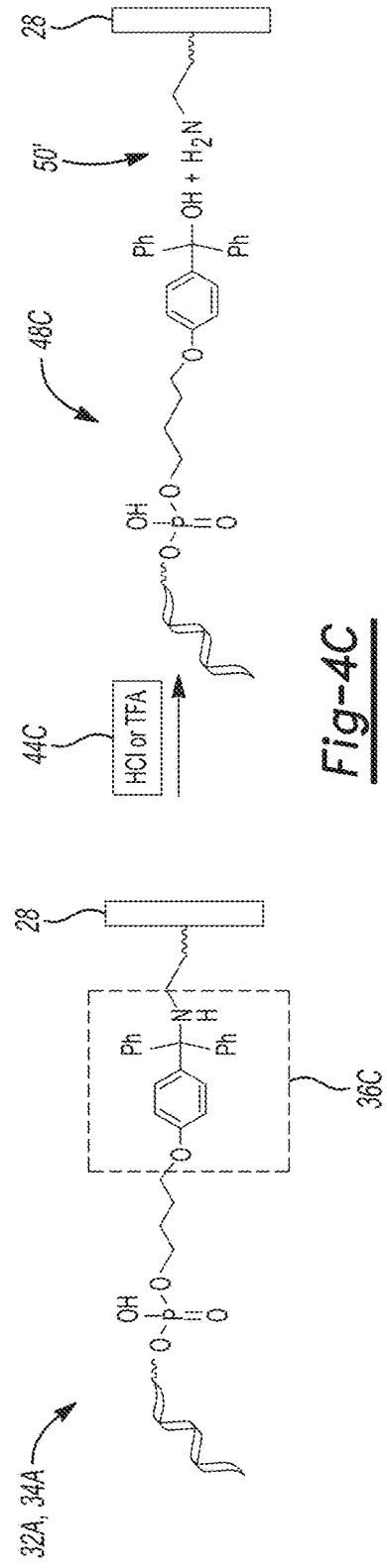

SEQUENCE LISTING

```
<160> NUMBER OF SEQ ID NOS: 12

<210> SEQ ID NO 1
<211> LENGTH: 29
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (23)..(23)
```

-continued

<223> OTHER INFORMATION: Uracil or alkene-thymidine

<400> SEQUENCE: 1
aatgatacgg cgaccaccga ganctacac                                29

<210> SEQ ID NO 2
<211> LENGTH: 24
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (22)..(22)
<223> OTHER INFORMATION: 8-oxoguanine

<400> SEQUENCE: 2
caagcagaag acggcatacg anat                                     24

<210> SEQ ID NO 3
<211> LENGTH: 24
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (20)..(20)
<223> OTHER INFORMATION: 8-oxoguanine

<400> SEQUENCE: 3
caagcagaag acggcatacn agat                                     24

<210> SEQ ID NO 4
<211> LENGTH: 29
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (23)..(23)
<223> OTHER INFORMATION: allyl-T

<400> SEQUENCE: 4
aatgatacgg cgaccaccga ganctacac                                29

<210> SEQ ID NO 5
<211> LENGTH: 35
<212> TYPE: DNA
<213> ORGANISM: Artificial Sequence
<220> FEATURE:
<223> OTHER INFORMATION: Synthesized

<400> SEQUENCE: 5
gctggcacgt ccgaacgctt cgttaatccg ttgag                         35

<210> SEQ ID NO 6
<211> LENGTH: 35
<212> TYPE: DNA
<213> ORGANISM: Artificial Sequence
<220> FEATURE:
<223> OTHER INFORMATION: Synthesized

<400> SEQUENCE: 6
ctcaacggat taacgaagcg ttcggacgtg ccagc                         35

```
<210> SEQ ID NO 7
<211> LENGTH: 35
<212> TYPE: DNA
<213> ORGANISM: Artificial Sequence
<220> FEATURE:
<223> OTHER INFORMATION: Synthesized

<400> SEQUENCE: 7
cgtcgtctgc catggcgctt cggtggatat gaact                              35

<210> SEQ ID NO 8
<211> LENGTH: 35
<212> TYPE: DNA
<213> ORGANISM: Artificial Sequence
<220> FEATURE:
<223> OTHER INFORMATION: Synthesized

<400> SEQUENCE: 8
agttcatatc caccgaagcg ccatggcaga cgacg                              35

<210> SEQ ID NO 9
<211> LENGTH: 35
<212> TYPE: DNA
<213> ORGANISM: Artificial Sequence
<220> FEATURE:
<223> OTHER INFORMATION: Synthesized

<400> SEQUENCE: 9
acggccgcta atatcaacgc gtcgaatccg caact                              35

<210> SEQ ID NO 10
<211> LENGTH: 35
<212> TYPE: DNA
<213> ORGANISM: Artificial Sequence
<220> FEATURE:
<223> OTHER INFORMATION: Synthesized

<400> SEQUENCE: 10
agttgcggat tcgacgcgtt gatattagcg gccgt                              35

<210> SEQ ID NO 11
<211> LENGTH: 34
<212> TYPE: DNA
<213> ORGANISM: Artificial Sequence
<220> FEATURE:
<223> OTHER INFORMATION: Synthesized

<400> SEQUENCE: 11
gccgcgttac gttagccgga ctattcgatg cagc                               34

<210> SEQ ID NO 12
<211> LENGTH: 34
<212> TYPE: DNA
<213> ORGANISM: Artificial Sequence
<220> FEATURE:
<223> OTHER INFORMATION: Synthesized

<400> SEQUENCE: 12
gctgcatcga atagtccggc taacgtaacg cggc                               34
```

FLOW CELLS

CROSS REFERENCE TO RELATED APPLICATION

This application claims the benefit of U.S. Provisional Application Ser. No. 63/218,091, filed Jul. 2, 2021, the contents of which is incorporated by reference herein in its entirety.

REFERENCE TO SEQUENCE LISTING

The Sequence Listing submitted via EFS-Web is hereby incorporated by reference in its entirety. The name of the file is ILI217B_IP-2151-US_Sequence_Listing_ST25.txt, the size of the file is 2,723 bytes, and the date of creation of the file is Jun. 28, 2022.

BACKGROUND

Flow cells are used in a variety of methods and applications, such as gene sequencing, genotyping, etc. For nucleic acid analysis, the surface of the flow cell may be functionalized with specific surface chemistry, such as primers, polymerases, etc. depending upon the reaction that is to take place. In many instances, the surface chemistry is covalently bound to the flow cell surface. Covalent linking may be desirable to maintain the surface chemistry in the active area of the flow cell throughout the lifetime of the flow cell during a variety of uses.

SUMMARY

The flow cells disclosed herein may be used multiple times. At its surface, the flow cell includes a polymeric hydrogel which includes functional groups that are capable of attaching primers to be used in nucleic acid sequencing. After sequencing, the primers are removed. In some instances, primer removal leaves post-sequencing functional groups that are different than the functional groups that are capable of attaching the primers. In these instances, the post-sequencing functional groups are converted back into the functional groups that are capable of attaching the primers, which renders the polymeric hydrogel ready for a subsequent cycle of primer grafting and sequencing. In other instances, primer removal involves a cross-metathesis reaction that introduces the functional groups that are capable of attaching the primers. This reaction also renders the polymeric hydrogel ready for a subsequent cycle of primer grafting and sequencing.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4A through FIG. 4C depict examples of alkyne-containing primers having different amino cleavable groups and the cleavage that takes place at the amino cleavable groups;

DETAILED DESCRIPTION

Figure 1:
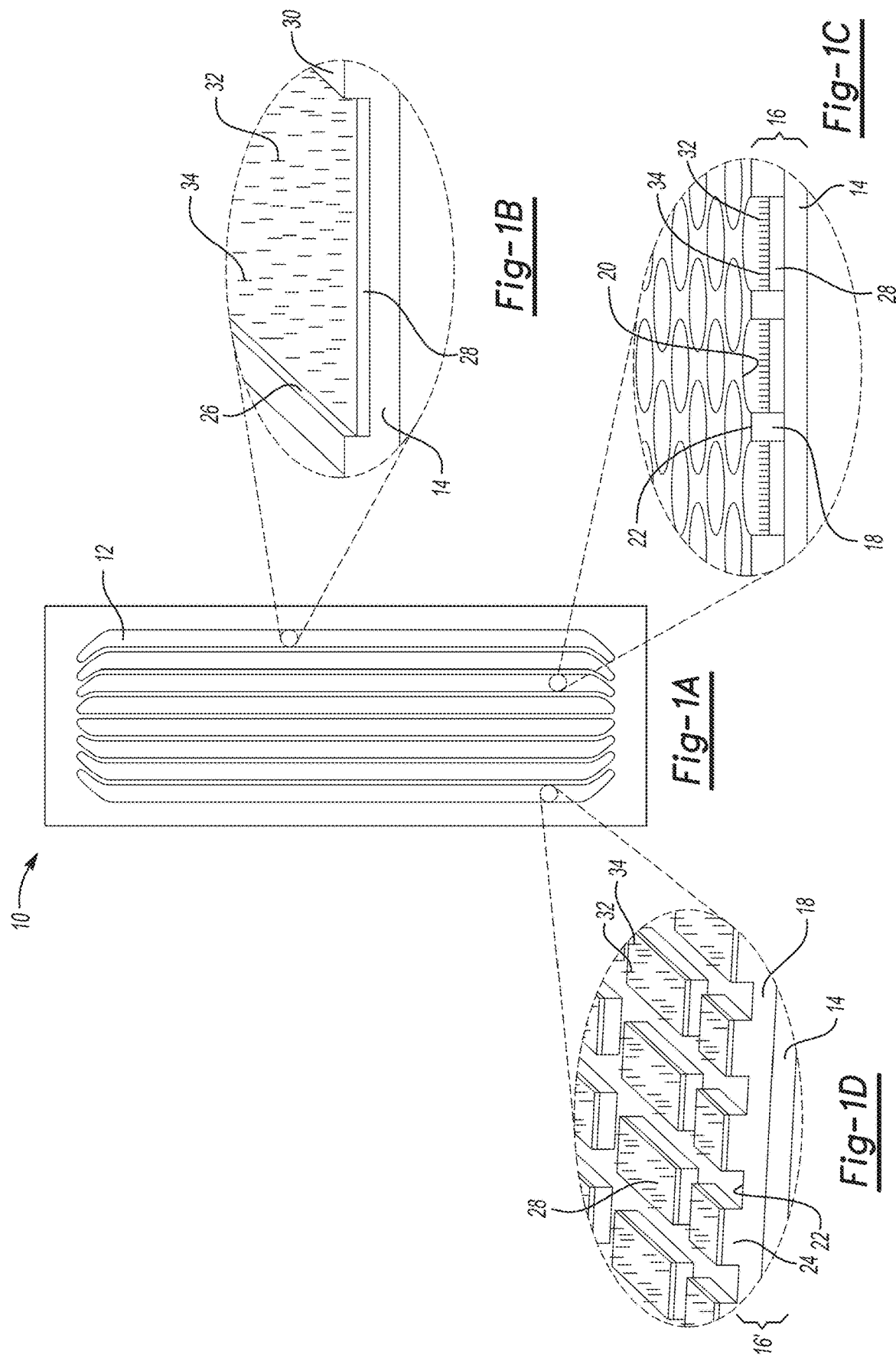
FIG. 1A is a top view of an example flow cell.
FIG. 1B through FIG. 1D are enlarged, and partially cutaway views of different examples of a flow channel of the flow cell.

Disclosed herein are flow cells. The initial flow cell surface includes a polymeric hydrogel which includes functional groups that are capable of attaching primers to be used in nucleic acid sequencing. After sequencing, one or more reactions are performed to remove the primers and regenerate the functional groups that are capable of attaching the primers. The reaction(s) render the polymeric hydrogel ready for a subsequent cycle of primer grafting and sequencing.

The reusability of the flow cell may enable it to be part of the sequencing instrument, as opposed to part of a consumables set.

Definitions

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

The terms first, second, etc. also are not meant to imply a specific orientation or order, but rather are used to distinguish one component from another.

It is to be understood that the ranges provided herein include the stated range and any value or sub-range within the stated range, as if such values or sub-ranges were explicitly recited. For example, a range of about 400 nm to about 1 µm (1000 nm), should be interpreted to include not only the explicitly recited limits of about 400 nm to about 1 µm, but also to include individual values, such as about 708 nm, about 945.5 nm, etc., and sub-ranges, such as from about 425 nm to about 825 nm, from about 550 nm to about 940 nm, etc. Furthermore, when "about" and/or "substantially" are/is utilized to describe a value, they are meant to encompass minor variations (up to +/−10%) from the stated value.

An "acrylamide" is a functional group with the structure

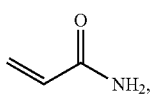

where each H may alternatively be an alkyl, an alkylamino, an alkylamido, an alkylthio, an aryl, a glycol, and optionally substituted variants thereof.

As used herein, "alkyl" refers to a straight or branched hydrocarbon chain that is fully saturated (i.e., contains no double or triple bonds). The alkyl group may have 1 to 20 carbon atoms. Example alkyl groups include methyl, ethyl, propyl, isopropyl, butyl, isobutyl, tertiary butyl, pentyl, hexyl, and the like. As an example, the designation "C1-C6 alkyl" indicates that there are one to six carbon atoms in the alkyl chain, i.e., the alkyl chain is selected from the group consisting of methyl, ethyl, propyl, iso-propyl, n-butyl, isobutyl, sec-butyl, t-butyl, pentyl, and hexyl.

As used herein, "alkylamino" refers to an alkyl group in which one or more of the hydrogen atoms are replaced by an amino group, where the amino group refers to an —NR$_a$R$_b$ group, where R$_a$ and R$_b$ are each independently selected from a C1-C6 alkyl, C2-C6 alkenyl, C2-C6 alkynyl, C3-C7 carbocycle, C6-C10 aryl, a 5-10 membered heteroaryl, and a 5-10 membered heterocycle.

As used herein, "alkylamido" refers to an alkyl group in which one or more of the hydrogen atoms are replaced by a C-amido group or an N-amido group. A "C-amido" group refers to a "—C(=O)N(R$_a$R$_b$)" group in which R$_a$ and R$_b$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicyclic)alkyl. An "N-amido" group refers to a "RC(=O)N(R$_a$)—" group in which R and R$_a$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicyclic)alkyl. Any alkylamido may be substituted or unsubstituted.

As used herein, "alkylthio" refers to RS—, in which R is an alkyl. The alkylthio can be substituted or unsubstituted.

As used herein, "alkene" or "alkenyl" or "olefin" refers to a straight or branched hydrocarbon chain containing one or more double bonds. The alkenyl group may have 2 to 20 carbon atoms. Example alkenyl groups include ethenyl, propenyl, butenyl, pentenyl, hexenyl, and the like.

As used herein, "alkyne" or "alkynyl" refers to a straight or branched hydrocarbon chain containing one or more triple bonds. The alkynyl group may have 2 to 20 carbon atoms.

An "allyl" refers to the unsaturated hydrocarbon radical —CH=CHCH$_2$.

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl, and naphthylalkyl.

The term "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms. Examples of aryl groups include phenyl, naphthyl, azulenyl, and anthracenyl. Any aryl may be a heteroaryl, with at least one heteroatom, that is, an element other than carbon (e.g., nitrogen, oxygen, sulfur, etc.), in ring backbone.

As used herein, the term "attached" refers to the state of two things being joined, fastened, adhered, connected or bound to each other, either directly or indirectly. For example, a nucleic acid can be attached to a functionalized polymer by a covalent or non-covalent bond. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

An "azide" or "azido" functional group refers to —N$_3$.

As used herein, "carbocycle" means a non-aromatic cyclic ring or ring system containing only carbon atoms in the ring system backbone. When the carbocycle is a ring system, two or more rings may be joined together in a fused, bridged or spiro-connected fashion. Carbocycles may have any degree of saturation, provided that at least one ring in a ring system is not aromatic. Thus, carbocycles include cycloalkyls, cycloalkenyls, and cycloalkynyls. The carbocycle group may have 3 to 20 carbon atoms. Examples of carbocycle rings include cyclopropyl, cyclobutyl, cyclopentyl, cyclohexyl, cyclohexenyl, 2,3-dihydro-indene, bicyclo [2.2.2]octanyl, adamantyl, and spiro[4.4]nonanyl. Any of the carbocycles may be heterocycles, with at least one heteroatom in ring backbone.

The term "cross-metathesis," as used herein, refers to the intermolecular reaction of two terminal alkene units in the presence of a metathesis catalyst (e.g., ruthenium carbenoids (e.g., Grubbs catalysts).

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s). In some examples, cycloalkyl groups can contain 3 to 8 atoms in the ring(s). A cycloalkyl group may be unsubstituted or substituted. Example cycloalkyl groups include cyclopropyl, cyclobutyl, cyclopentyl, cyclohexyl, cycloheptyl, and cyclooctyl.

As used herein, "cycloalkenyl" or "cycloalkene" means a carbocycle ring or ring system having at least one double bond, wherein no ring in the ring system is aromatic. Examples include cyclohexenyl or cyclohexene and norbornenyl or norbornene.

As used herein, "cycloalkynyl" or "cycloalkyne" means a carbocycle ring or ring system having at least one triple bond, wherein no ring in the ring system is aromatic. An example is cyclooctyne. Another example is bicyclononyne. Still another example is dibenzocyclooctyne (DBCO).

The term "depositing," as used herein, refers to any suitable application technique, which may be manual or automated, and, in some instances, results in modification of the surface properties. Generally, depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

As used herein, the term "depression" refers to a discrete concave feature in a substrate or a patterned material having a surface opening that is at least partially surrounded by interstitial region(s) of the substrate or the patterned material. Depressions can have any of a variety of shapes at their opening in a surface including, as examples, round, elliptical, square, polygonal, star shaped (with any number of vertices), etc. The cross-section of a depression taken orthogonally with the surface can be curved, square, polygonal, hyperbolic, conical, angular, etc. As examples, the depression can be a well or two interconnected wells. The depression may also have more complex architectures, such as ridges, step features, etc.

The term "each," when used in reference to a collection of items, is intended to identify an individual item in the collection, but does not necessarily refer to every item in the collection. Exceptions can occur if explicit disclosure or context clearly dictates otherwise.

As used herein, the term "flow cell" is intended to mean a vessel having a flow channel that is in fluid communication with surface(s) containing surface chemistry. In some instances, the flow cell surface chemistry is removable and/or regenerable, thus rendering the surface reusable. The flow cell also includes an inlet for delivering reagent(s) to the flow channel and an outlet for removing reagent(s) from the flow channel. The flow cell enables the detection of the reactions involving the surface chemistry. For example, the flow cell may include one or more transparent surfaces, which allow for the optical detection of arrays, optically labeled molecules, or the like within the flow channel.

As used herein, a "flow channel" or "channel" may be an area defined between two bonded components, which can selectively receive a liquid sample. In some examples, the flow channel may be defined between a patterned or non-patterned structure and a lid. In other examples, the flow channel may be defined between two patterned or non-patterned structures that are bonded together.

As used herein, "heteroalicyclic" or "heteroalicycle" refers to three-, four-, five-, six-, seven-, eight-, nine-, ten-, up to 18-membered monocyclic, bicyclic, and tricyclic ring system wherein carbon atoms together with from 1 to 5 heteroatoms constitute said ring system. A heteroalicyclic ring system may optionally contain one or more unsaturated bonds situated in such a way, however, that a fully delocalized pi-electron system does not occur throughout all the rings. The heteroatoms are independently selected from oxygen, sulfur, and nitrogen. A heteroalicyclic ring system may further contain one or more carbonyl or thiocarbonyl functionalities, so as to make the definition include oxo-systems and thio-systems such as lactams, lactones, cyclic imides, cyclic thioim ides, and cyclic carbamates. The rings may be joined together in a fused fashion. Additionally, any nitrogens in a heteroalicyclic may be quaternized. Heteroalicycle or heteroalicyclic groups may be unsubstituted or substituted. Examples of such "heteroalicyclic" or "heteroalicycle" groups include 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, pyrrolidone, pyrrolidine, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, 3,4-methylenedioxyphenyl).

A "(heteroalicyclic)alkyl" refers to a heterocyclic or a heteroalicyclic group connected, as a substituent, via a lower alkylene group. The lower alkylene and heterocycle or a heterocycle of a (heteroalicyclic)alkyl may be substituted or unsubstituted. Examples include tetrahydro-2H-pyran-4-yl) methyl, (piperidin-4-yl)ethyl, (piperidin-4-yl)propyl, (tetrahydro-2H-thiopyran-4-yl)methyl, and (1,3-thiazinan-4-yl) methyl.

As used herein, "hydroxy" or "hydroxyl" refers to an —OH group.

The term "glycol" refers to the end group —$(CH_2)_n$OH, where n ranges from 2 to 10. As specific examples, the glycol may be an ethylene glycol end group —$CH_2CH_2$OH, a propylene glycol end group —$CH_2CH_2CH_2$OH, or a butylene glycol end group —$CH_2CH_2CH_2CH_2$OH.

As used herein, the term "interstitial region" refers to an area, e.g., of a substrate, patterned resin, or other support that separates depressions or protrusions. For example, an interstitial region can separate one depression of an array from another depression of the array, or one protrusion of an array from another protrusion of an array. The two depressions or protrusions that are separated from each other can be discrete, i.e., lacking physical contact with each other. In many examples, the interstitial region is continuous whereas the depressions or protrusions are discrete, for example, as is the case for a plurality of depressions defined in an otherwise continuous surface. In other examples, the interstitial regions and the features (e.g., depressions or protrusions) are discrete, for example, as is the case for a plurality of trenches separated by respective interstitial regions. The separation provided by an interstitial region can be partial or full separation. Interstitial regions may have a surface material that differs from the surface material of the depressions or protrusions. For example, the depression or protrusion surface can include the polymeric hydrogel, while the interstitial regions are free of the polymeric hydrogel.

As used herein, a "nucleotide" includes a nitrogen containing heterocyclic base, a sugar, and one or more phosphate groups. Nucleotides are monomeric units of a nucleic acid sequence. In ribonucleic acids (RNA), the sugar is a ribose, and in deoxyribonucleic acids (DNA), the sugar is a deoxyribose, i.e. a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acids (PNA).

In some examples, the term "over" may mean that one component or material is positioned directly on another component or material. When one is directly on another, the two are in contact with each other. In FIG. 1B, the polymeric hydrogel 28 is applied over the single layer base support 14 so that it is directly on and in contact with the single layer based support 14.

In other examples, the term "over" may mean that one component or material is positioned indirectly on another component or material. By indirectly on, it is meant that a gap or an additional component or material may be positioned between the two components or materials. In FIG. 1D, the polymeric hydrogel 28 is positioned over the base support 14 of the multi-layered structure 16' such that the two are in indirect contact. More specifically, the layer 18 is positioned between the polymeric hydrogel 28 and the base support 14.

As used herein, the term "primer" is defined as a single stranded nucleic acid sequence (e.g., single strand DNA). Some primers are part of a primer set, which serve as a starting point for template amplification and cluster generation. Other primers, referred to herein as sequencing primers, serve as a starting point for DNA synthesis. The 5' terminus of a primer set may be modified to allow a coupling reaction with a functional group of one of the orthogonal polymers. The primer length can be any number of bases long and can include a variety of non-natural nucleotides. In an example, the sequencing primer is a short strand, ranging from 10 to 60 bases, or from 20 to 40 bases.

The term "substrate" refers to a structure upon which various components of the flow cell (e.g., polymeric hydrogel, primers, etc.) may be added. The substrate may be a wafer, a panel, a rectangular sheet, a die, or any other suitable configuration. The substrate is generally rigid and is insoluble in an aqueous liquid. The substrate may be a single layer structure, or a multi-layered structure (e.g., including a support and a patterned material on the support). Examples of suitable substrates will be described further herein.

As used herein, the terms "tetrazine" and "tetrazinyl" refer to six-membered heteroaryl group comprising four nitrogen atoms. Tetrazine can be optionally substituted.

Flow Cells

One example of the flow cell 10 is shown in FIG. 1A from a top view. The flow cell 10 may include two patterned or non-patterned structures bonded together, or one patterned or non-patterned structure bonded to a lid.

The patterned structures, the non-patterned structures, or the patterned or non-patterned structure and the lid) may be attached to one another through a spacer layer (not shown). The spacer layer may be any material that will seal portions of the patterned or non-patterned structures together or portions of the patterned or non-patterned structure and the lid. As examples, the spacer layer may be an adhesive, a radiation-absorbing material that aids in bonding, or the like. In some examples, the spacer layer is the radiation-absorbing material, e.g., KAPTON® black. The patterned or non-patterned structures or the patterned structure and the lid may be bonded using any suitable technique, such as laser bonding, diffusion bonding, anodic bonding, eutectic bonding, plasma activation bonding, glass frit bonding, or others methods known in the art.

Between the two patterned or non-patterned structures or the one patterned or non-patterned structure and the lid is a flow channel 12. The example shown in FIG. 1A includes eight flow channels 12. While eight flow channels 12 are shown, it is to be understood that any number of flow channels 12 may be included in the flow cell 10 (e.g., a single flow channel 12, four flow channels 12, etc.). Each flow channel 12 may be isolated from another flow channel 12 so that fluid introduced into a flow channel 12 does not flow into adjacent flow channel(s) 12. Some examples of the fluids introduced into the flow channel 12 may introduce reaction components (e.g., cleaving fluids, DNA sample, polymerases, sequencing primers, nucleotides, etc.), washing solutions, deblocking agents, etc.

The flow channel 12 may have any desirable shape. In an example, the flow channel 12 has a substantially rectangular configuration. The length of the flow channel 12 depends, in part, upon the size of the substrate upon which the patterned or non-patterned structure is formed. The width of the flow channel 12 depends, in part, upon the size of the substrate upon which the patterned or non-patterned structure is formed, the desired number of flow channels 12, the desired space between adjacent channels 12, and the desired space at a perimeter of the patterned or non-patterned structure.

The depth of the flow channel 12 can be as small as a monolayer thick when microcontact, aerosol, or inkjet printing is used to deposit a separate material that defines the flow channel 12 walls. For other examples, the depth of the flow channel 12 can be about 1 µm, about 10 µm, about 50 µm, about 100 µm, or more. In an example, the depth may range from about 10 µm to about 100 µm. In another example, the depth may range from about 10 µm to about 30 µm. In still another example, the depth is about 5 µm or less. It is to be understood that the depth of the flow channel 12 may be greater than, less than or between the values specified above.

Each flow channel 12 is in fluid communication with an inlet and an outlet (not shown). The inlet and outlet of each flow channel 12 may be positioned at opposed ends of the flow cell 10. The inlets and outlets of the respective flow channels 12 may alternatively be positioned anywhere along the length and width of the flow channel 12 that enables desirable fluid flow.

The inlet allows fluid(s) to be introduced into the flow channel 12, and the outlet allows fluid(s) to be extracted from the flow channel 12. Each of the inlets and outlets is fluidly connected to a fluidic control system (including, e.g., reservoirs, pumps, valves, waste containers, and the like) which controls fluid introduction and expulsion.

FIG. 1B, FIG. 1C, and FIG. 1D depict different examples of the architecture within the flow channel 12.

Each of the architectures includes a substrate, such as a single layer base support 14 (as shown in FIG. 1B), or a multi-layered structure 16, 16' (as shown in FIG. 1C and FIG. 1D, respectively).

Examples of suitable single layer base supports 14 include epoxy siloxane, glass, modified or functionalized glass, plastics (including acrylics, polystyrene and copolymers of styrene and other materials, polypropylene, polyethylene, polybutylene, polyurethanes, polytetrafluoroethylene (such as TEFLON® from Chemours), cyclic olefins/cyclo-olefin polymers (COP) (such as ZEONOR® from Zeon), polyimides, etc.), nylon (polyamides), ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2O_5$) or other tantalum oxide(s) ($TaO_x$), hafnium oxide ($HfO_2$), carbon, metals, inorganic glasses, or the like.

Examples of the multi-layered structure 16, 16' include the base support 14 and at least one other layer 18 thereon, as shown in FIG. 1C and FIG. 1D.

Some examples of the multi-layered structure 16, 16' include glass or silicon as the base support 14, with a coating layer (e.g., layer 18) of tantalum oxide (e.g., tantalum pentoxide or another tantalum oxide(s) ($TaO_x$)) or another ceramic oxide at the surface.

Other examples of the multi-layered structure 16, 16' include the base support 14 (e.g., glass, silicon, tantalum pentoxide, or any of the other base support 14 materials) and a patterned resin as the other layer 18. It is to be understood that any material that can be selectively deposited, or deposited and patterned to form depressions 20 and interstitial regions 22 (FIG. 1C) or protrusions 24 and interstitial regions 22 (FIG. 1D) may be used for the patterned resin.

An example of the patterned resin is an inorganic oxide. Some inorganic oxides may be selectively applied to the base support 14 via vapor deposition, aerosol printing, or inkjet printing. Examples of suitable inorganic oxides include tantalum oxide (e.g., $Ta_2O_5$), aluminum oxide (e.g., $Al_2O_3$), silicon oxide (e.g., $SiO_2$), hafnium oxide (e.g., $HfO_2$), etc.

Another example of the patterned resin is a polymeric resin. Some polymeric resins may be applied to the base support 14 and then patterned. Suitable deposition techniques include chemical vapor deposition, dip coating, dunk coating, spin coating, spray coating, puddle dispensing, ultrasonic spray coating, doctor blade coating, aerosol printing, screen printing, microcontact printing, etc. Suitable patterning techniques include photolithography, nanoimprint lithography (NIL), stamping techniques, embossing techniques, molding techniques, microetching techniques, etc. Some examples of suitable resins include a polyhedral oligomeric silsesquioxane-based resin, a non-polyhedral oligomeric silsesquioxane epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

As used herein, the term "polyhedral oligomeric silsesquioxane" (commercially available under the tradename "POSS" from Hybrid Plastics) refers to a chemical composition that is a hybrid intermediate (e.g., $RSiO_{1.5}$) between that of silica ($SiO_2$) and silicone ($R_2SiO$). An example of a polyhedral oligomeric silsesquioxane may be that described in Kehagias et al., Microelectronic Engineering 86 (2009), pp. 776-778, which is incorporated by reference in its entirety. In an example, the composition is an organosilicon compound with the chemical formula $[RSiO_{3/2}]_n$, where the R groups can be the same or different. Example R groups for polyhedral oligomeric silsesquioxanes include epoxy, azide/azido, a thiol, a poly(ethylene glycol), a norbornene, a tetrazine, acrylates, and/or methacrylates, or further, for example, alkyl, aryl, alkoxy, and/or haloalkyl groups.

In an example, the single base support 14 (whether used singly or as part of the multi-layered structure 16, 16') may be a circular sheet, a panel, a wafer, a die, etc. having a diameter ranging from about 2 mm to about 300 mm, e.g., from about 200 mm to about 300 mm, or may be a rectangular sheet, panel, wafer, die etc. having its largest dimension up to about 10 feet (~3 meters). For example, a die may have a width ranging from about 0.1 mm to about 10 mm. While example dimensions have been provided, it is to be understood that a single base support 14 with any suitable dimensions may be used.

The architecture shown in FIG. 1B is a non-patterned structure. The substrate of the non-patterned structure may be the single layer base support 14. In this example, the single layer base support 14 has a lane 26 defined therein, which is surrounded by edge regions 30. The lane 26 provides a designated area for the polymeric hydrogel 28. The edge regions 30 provide bonding regions where two non-patterned structures can be attached to one another or where one non-patterned structure can be attached to a lid. As such, in this example, the surface of the flow cell is non-patterned, and the polymeric hydrogel 28 is positioned within the lane 26 of the non-patterned surface.

The polymeric hydrogel 28 may be any gel material that can swell when liquid is taken up and can contract when liquid is removed, e.g., by drying. In an example, the polymeric hydrogel 28 includes an acrylamide copolymer. Some examples of the acrylamide copolymer are represented by the following structure (I):

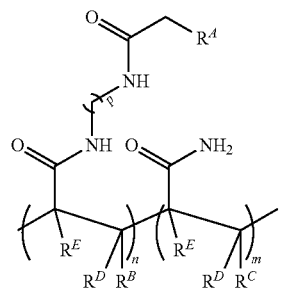

wherein:
$R^A$ is selected from the group consisting of an azide and an optionally substituted amine;
$R^B$ is H or optionally substituted alkyl;
$R^C$, $R^D$, and $R^E$ are each independently selected from the group consisting of H and optionally substituted alkyl;
each of the —$(CH_2)_p$— can be optionally substituted;
p is an integer in the range of 1 to 50;
n is an integer in the range of 1 to 50,000; and
m is an integer in the range of 1 to 100,000.

One specific example of the acrylamide copolymer represented by structure (I) is poly(N-(5-azidoacetamidylpentyl)acrylamide-co-acrylamide, PAZAM.

One of ordinary skill in the art will recognize that the arrangement of the recurring "n" and "m" features in structure (I) are representative, and the monomeric subunits may be present in any order in the polymer structure (e.g., random, block, patterned, or a combination thereof).

The molecular weight of the acrylamide copolymer may range from about 5 kDa to about 1500 kDa or from about 10 kDa to about 1000 kDa, or may be, in a specific example, about 312 kDa.

In some examples, the acrylamide copolymer is a linear polymer. In some other examples, the acrylamide copolymer is a lightly cross-linked polymer.

In other examples, the gel material may be a variation of structure (I). In one example, the acrylamide unit may be replaced with N,N-dimethylacrylamide

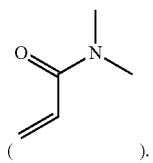

In this example, the acrylamide unit in structure (I) may be replaced with,

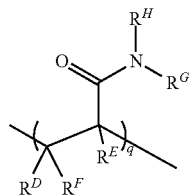

where $R^D$, $R^E$, and $R^F$ are each H or a C1-C6 alkyl, and $R^G$ and $R^H$ are each a C1-C6 alkyl (instead of H as is the case with the acrylamide). In this example, q may be an integer in the range of 1 to 100,000. In another example, the N,N-dimethylacrylamide may be used in addition to the acrylamide unit. In this example, structure (I) may include

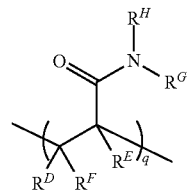

in addition to the recurring "n" and "m" features, where $R^D$, $R^E$, and $R^F$ are each H or a C1-C6 alkyl, and $R^G$ and $R^H$ are each a C1-C6 alkyl. In this example, q may be an integer in the range of 1 to 100,000.

As another example of the polymeric hydrogel, the recurring "n" feature in structure (I) may be replaced with a monomer including a heterocyclic azido group having structure (II):

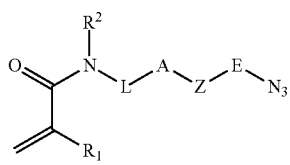

wherein $R^1$ is H or a C1-C6 alkyl; $R_2$ is H or a C1-C6 alkyl; L is a linker including a linear chain with 2 to 20 atoms selected from the group consisting of carbon, oxygen, and nitrogen and 10 optional substituents on the carbon and any nitrogen atoms in the chain; E is a linear chain including 1 to 4 atoms selected from the group consisting of carbon, oxygen and nitrogen, and optional substituents on the carbon and any nitrogen atoms in the chain; A is an N substituted amide with an H or a C1-C4 alkyl attached to the N; and Z is a nitrogen containing heterocycle. Examples of Z include 5 to 10 carbon-containing ring members present as a single cyclic structure or a fused structure. Some specific examples of Z include pyrrolidinyl, pyridinyl, or pyrimidinyl. As still another example, the gel material may include a recurring unit of each of structure (III) and (IV):

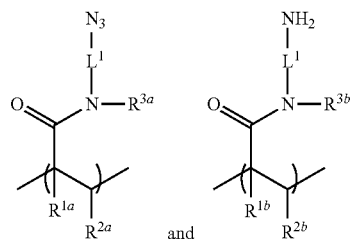

wherein each of $R^{1a}$, $R^{2a}$, $R^{1b}$ and $R^{2b}$ is independently selected from hydrogen, an optionally substituted alkyl or optionally substituted phenyl; each of $R^{3a}$ and $R^{3b}$ is independently selected from hydrogen, an optionally substituted alkyl, an optionally substituted phenyl, or an optionally substituted C7-C14 aralkyl; and each $L^1$ and $L^2$ is independently selected from an optionally substituted alkylene linker or an optionally substituted heteroalkylene linker.

In still another example, the acrylamide copolymer is formed using nitroxide mediated polymerization, and thus at least some of the copolymer chains have an alkoxyamine end group. In the copolymer chain, the term "alkoxyamine end group" refers to the dormant species $—ONR_1R_2$, where each of $R_1$ and $R_2$ may be the same or different, and may independently be a linear or branched alkyl, or a ring structure, and where the oxygen atom is attached to the rest of the copolymer chain. In some examples, the alkoxyamine may also be introduced into some of the recurring acrylamide monomers, e.g., at position $R^A$ in structure (I). As such, in one example, structure (I) includes an alkoxyamine end group; and in another example, structure (I) includes an alkoxyamine end group and alkoxyamine groups in at least some of the side chains.

A variety of polymer architectures containing acrylic monomers (e.g., acrylamides, acrylates etc.) may be utilized in the examples disclosed herein, such as branched polymers, including dendrimers (e.g., multi-arm or star polymers), and the like. For example, the monomers (e.g., acrylamide, etc.) may be incorporated, either randomly or in block, into the branches (arms) of a dendrimer.

To introduce the polymeric hydrogel 28 into the lane 26, a mixture of the polymeric hydrogel 28 may be generated and then applied to the single layer base support 14. In one example, the polymeric hydrogel 28 may be present in a mixture (e.g., with water or with ethanol and water). The mixture may then be applied to the respective substrate surfaces (including in the lane 26) using spin coating, or dipping or dip coating, or flow of the material under positive or negative pressure, or another suitable technique. These types of techniques blanketly deposit the polymeric hydrogel 28 in the lane 26 and on the edge regions 30. Other selective deposition techniques (e.g., involving a mask, controlled printing techniques, etc.) may be used to specifically deposit the polymeric hydrogel 28 in the lane 26 and not on the edge regions 30.

In some examples, the surface of the single layer base support 14 (including the lane 26) may be activated, and then the mixture (including the polymeric hydrogel 28) may be applied thereto. In one example, a silane or silane derivative (e.g., norbornene silane) may be deposited on the surface of the single layer base support 14 using vapor deposition, spin coating, or other deposition methods. In another example, the substrate surface may be exposed to plasma ashing to generate surface-activating agent(s) (e.g., —OH groups) that can adhere to the polymeric hydrogel 28.

Depending upon the chemistry of the polymeric hydrogel 28, the applied mixture may be exposed to a curing process. In an example, curing may take place at a temperature ranging from room temperature (e.g., about 25° C.) to about 95° C. for a time ranging from about 1 millisecond to about several days.

Polishing may then be performed in order to remove the polymeric hydrogel 28 from the edge regions 30 at the perimeter of the lane 26, while leaving the polymeric hydrogel 28 on the surface in the lane 26 at least substantially intact.

The architecture shown in FIG. 1C is one example of a patterned structure. The substrate of this patterned structure is the multi-layered structure 16 with depressions 20 defined in the layer 18. The depressions 20 provide a designated area for the polymeric hydrogel 28. In this example, the surface of the flow cell 10 is patterned with depressions 20 separated by interstitial regions 22, and the polymeric hydrogel 28 is positioned within each depression 20 of the patterned surface.

Many different layouts of the depressions 20 may be envisaged, including regular, repeating, and non-regular patterns. In an example, the depressions 20 are disposed in a hexagonal grid for close packing and improved density. Other layouts may include, for example, rectangular layouts, triangular layouts, and so forth. In some examples, the layout or pattern can be an x-y format in rows and columns. In some other examples, the layout or pattern can be a repeating arrangement of the depressions 20 and the interstitial regions 22. In still other examples, the layout or pattern can be a random arrangement of the depressions 20 and the interstitial regions 22.

The layout or pattern may be characterized with respect to the density (number) of the depressions 20 in a defined area. For example, the depressions 20 may be present at a density of approximately 2 million per mm². The density may be tuned to different densities including, for example, a density of about 100 per mm², about 1,000 per mm², about 0.1 million per mm², about 1 million per mm², about 2 million per mm², about 5 million per mm², about 10 million per mm², about 50 million per mm², or more, or less. It is to be further understood that the density can be between one of the lower values and one of the upper values selected from the ranges above, or that other densities (outside of the given ranges) may be used. As examples, a high density array may be characterized as having depressions 20 separated by less than about 100 nm, a medium density array may be characterized as having the depressions 20 separated by about 400 nm to about 1 µm, and a low density array may be characterized as having the depressions 20 separated by greater than about 1 µm.

The layout or pattern of the depressions 20 may also or alternatively be characterized in terms of the average pitch, or the spacing from the center of one depression 20 to the center of an adjacent depression 20 (center-to-center spacing) or from the right edge of one depression 20 to the left edge of an adjacent depression 20 (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.1 µm, about 0.5 µm, about 1 µm, about 5 µm, about 10 µm, about 100 µm, or more or less. The average pitch for a particular pattern can be between one of the lower values and one of the upper values selected from the ranges above. In an example, the depressions 20 have a pitch (center-to-center spacing) of about 1.5 µm. While example average pitch values have been provided, it is to be understood that other average pitch values may be used.

The size of each depression 20 may be characterized by its volume, opening area, depth, and/or diameter. For example, the volume can range from about $1 \times 10^{-3}$ µm³ to about 100 µm³, e.g., about $1 \times 10^{-2}$ µm³, about 0.1 µm³, about 1 µm³, about 10 µm³, or more, or less. For another example, the opening area can range from about $1 \times 10^{-3}$ µm² to about 100 µm², e.g., about $1 \times 10^{-2}$ µm², about 0.1 µm², about 1 µm², at least about 10 µm², or more, or less. For still another example, the depth can range from about 0.1 µm to about 100 µm, e.g., about 0.5 µm, about 1 µm, about 10 µm, or more, or less. For yet another example, the diameter or length and width can range from about 0.1 µm to about 100 µm, e.g., about 0.5 µm, about 1 µm, about 10 µm, or more, or less.

Any example of the polymeric hydrogel 28 disclosed herein may be used in the architecture shown in FIG. 1C.

To introduce the polymeric hydrogel 28 into the depressions 20, a mixture of the polymeric hydrogel 28 may be generated and then applied to the multi-layered structure 16. In one example, the polymeric hydrogel 28 may be present in a mixture (e.g., with water or with ethanol and water). The mixture may then be applied to the respective substrate surfaces (including in the depressions 20) using spin coating, or dipping or dip coating, or flow of the material under positive or negative pressure, or another suitable technique. These types of techniques blanketly deposit the polymeric hydrogel 28 in the depressions 20 and on the interstitial regions 22. Other selective deposition techniques (e.g., involving a mask, controlled printing techniques, etc.) may be used to specifically deposit the polymeric hydrogel 28 in the depressions 20 and not on the interstitial regions 22.

In some examples, the surface of the layer 18 (including the depressions 20) may be activated, and then the mixture (including the polymeric hydrogel 28) may be applied thereto. In one example, a silane or silane derivative (e.g., norbornene silane) may be deposited on the surface of the layer 18 using vapor deposition, spin coating, or other deposition methods. In another example, the layer 18 may be exposed to plasma ashing to generate surface-activating agent(s) (e.g., —OH groups) that can adhere to the polymeric hydrogel 28.

Depending upon the chemistry of the polymeric hydrogel 28, the applied mixture may be exposed to a curing process. In an example, curing may take place at a temperature ranging from room temperature (e.g., about 25° C.) to about 95° C. for a time ranging from about 1 millisecond to about several days.

Polishing may then be performed in order to remove the polymeric hydrogel 28 from the interstitial regions 22, while leaving the polymeric hydrogel 28 on the surface in the depressions 20 at least substantially intact.

The architecture shown in FIG. 1D is another example of a patterned structure. The substrate of this patterned structure is the multi-layered structure 16' with protrusions 24 defined in the layer 18. The protrusions 24 are three-dimensional structures that extend outward (upward) from an adjacent surface. The protrusions 24 may be generated via etching, photolithography, imprinting, etc. In this example, the surface of the flow cell 10 is patterned with protrusions 24 separated by interstitial regions 22, and the polymeric hydrogel 28 is positioned on each protrusion 24 of the patterned surface.

While any suitable three-dimensional geometry may be used for the protrusion 24, a geometry with an at least substantially flat top surface may be desirable. Example protrusion geometries include a sphere, a cylinder, a cube, polygonal prisms (e.g., rectangular prisms, hexagonal prisms, etc.), or the like.

Many different layouts of the protrusions 24 may be envisaged, including any of those described herein for the depressions 20. The layout or pattern may be characterized with respect to the density (number) of the protrusions 24 in a defined area. The protrusions 24 may be present at a density of approximately 2 million per mm² or at any of the other examples set forth herein for the depressions 20. The layout or pattern of the protrusions 24 may also or alternatively be characterized in terms of the average pitch, or the spacing from the center of one protrusion 24 to the center of an adjacent protrusion 24 (center-to-center spacing) or from the right edge of one protrusion 24 to the left edge of an adjacent protrusion 24 (edge-to-edge spacing).

The size of each protrusion 24 may be characterized by its surface area. The surface area of the protrusion 24 may range from about $1 \times 10^{-3}$ µm² to about 100 µm², e.g., about $1 \times 10^{-2}$ µm², about 0.1 µm², about 1 µm², at least about 10 µm², or more, or less.

The height of each protrusion 24 (measured from the interstitial region 22) may range from about 10 nm to about 500 nm.

Any example of the polymeric hydrogel 28 disclosed herein may be used in the architecture shown in FIG. 1D. To introduce the polymeric hydrogel 28 onto the protrusions 24, a mixture of the polymeric hydrogel 28 may be generated and then applied to the protrusions 24. Selective deposition techniques may be used to deposit the polymeric hydrogel 28 on the protrusions 24 and not the interstitial regions 22. A mask may be used to cover the interstitial regions 22 while the polymeric hydrogel 28 is deposited on the protrusions 24.

Each example of the flow cell architecture also includes primers 32, 34. The primers 32, 34 may be introduced to the flow cell 10 and grafted to the azide or amine functional groups of the polymeric hydrogel 28 at the outset of a nucleic acid analysis. Several primers 32, 34 are discussed below in reference to the various kits and methods.

Kits and Methods

Examples of the flow cell 10 disclosed herein may be used in a variety of methods that regenerate primer-grafting functional groups after a sequencing cycle has been performed, and may be included in a variety of kits with fluids to be used in the methods. The kits and methods will now be described in reference to FIG. 2 through FIG. 8.

Kit and Method #1

In a first example, the kit includes: a flow cell that includes at least one surface functionalized with a polymeric hydrogel including azide functional groups or amine functional groups; a primer fluid including a plurality of alkyne-containing primers, each alkyne-containing primer having an amino cleavable group attaching a primer sequence of the alkyne-containing primer to an alkyne-containing moiety of the alkyne-containing primer; and a cleaving fluid that is reactive with the amino cleavable group. This kit may be used in the example methods shown in FIG. 2 and FIG. 3.

In this example kit, the flow cell 10 may be any of the examples described herein in reference to FIG. 1B through FIG. 1D. The surface functionalized with the polymeric hydrogel may be any of the patterned or non-patterned structures described herein, which may include any example of the polymeric hydrogel 28.

This example kit includes the primer fluid. The primer fluid includes a plurality of alkyne-containing primers, e.g., primers 32A, 34A, in a carrier liquid. The alkyne-containing primers 32A, 34A may include forward and reverse amplification primer sequences that are terminated with an alkyne or that contain an internal alkyne for reaction with the azide functional group of the polymeric hydrogel 28 or with a tetrazine molecule that is attached to the polymeric hydrogel 28. The primers 32A, 34A together enable the amplification of a library template having end adapters that are complementary to the two different primers 32A, 34A.

As examples, the primer sequences of the alkyne-containing primers 32A, 34A may include P5 and P7 primer sequences; P15 and P7 primer sequences; or any combination of the PA primer sequences, the PB primer sequences, the PC primer sequences, and the PD primer sequences set forth herein.

Examples of P5 and P7 primer sequences are used on the surface of commercial flow cells sold by Illumina Inc. for sequencing, for example, on HISEQ™, HISEQX™, MISEQ™, MISEQDX™, MINISEQ™, NEXTSEQ™, NEXTSEQDX™, NOVASEQ™, ISEQ™, GENOME ANALYZER™, and other instrument platforms. The P5 primer sequence is:

```
P5: 5' → 3'
                                        (SEQ. ID. NO. 1)
AATGATACGGCGACCACCGAGAnCTACAC
``` where "n" is uracil or alkene-thymidine (i.e., alkene-dT) in the sequence.

The P7 primer sequence may be any of the following:

```
P7 #1: 5' → 3'
                                        (SEQ. ID. NO. 2)
CAAGCAGAAGACGGCATACGAnAT

P7 #2: 5' → 3'
                                        (SEQ. ID. NO. 3)
CAAGCAGAAGACGGCATACnAGAT
``` where "n" is 8-oxoguanine (referred to herein as "8-oxo-G") in each of the sequences.

The P15 primer sequence is:

```
P15: 5' → 3'
                                        (SEQ. ID. NO. 4)
AATGATACGGCGACCACCGAGAnCTACAC
where "n" is allyl-T.

The other primer sequences (PA-PD) mentioned above
include:
PA 5' → 3'
                                        (SEQ. ID. NO. 5)
GCTGGCACGTCCGAACGCTTCGTTAATCCGTTGAG cPA (PA') 5' → 3'
                                        (SEQ. ID. NO. 6)
CTCAACGGATTAACGAAGCGTTCGGACGTGCCAGC PB 5' → 3'
                                        (SEQ. ID. NO. 7)
CGTCGTCTGCCATGGCGCTTCGGTGGATATGAACT
```

-continued cPB (PB') 5' → 3'
(SEQ. ID. NO. 8)
AGTTCATATCCACCGAAGCGCCATGGCAGACGACG

PC 5' → 3'
(SEQ. ID. NO. 9)
ACGGCCGCTAATATCAACGCGTCGAATCCGCAACT cPC (PC') 5' → 3'
(SEQ. ID. NO. 10)
AGTTGCGGATTCGACGCGTTGATATTAGCGGCCGT

PD 5' → 3'
(SEQ. ID. NO. 11)
GCCGCGTTACGTTAGCCGGACTATTCGATGCAGC cPD (PD') 5' → 3'
(SEQ. ID. NO. 12)
GCTGCATCGAATAGTCCGGCTAACGTAACGCGGC

While not shown in the example sequences for PA-PD, it is to be understood that any of these primer sequences may include a cleavage site, such as uracil, 8-oxoguanine, allyl-T, etc. at any point in the strand.

Each of the alkyne-containing primers 32A, 34A in the first example kit also includes an amino cleavable group 36 (see FIG. 2) attached at the 5' end of any of the sequences set forth herein. The amino cleavable group 36 has cleaving chemistry that is orthogonal to the cleaving chemistry of the cleavage site (e.g., uracil, 8-oxoguanine, allyl-T, etc.) used for linearization during cluster generation. As such, the amino cleavable group 36 is not cleaved during linearization. When cleaved, the amino cleavable group 36 leaves a terminal amine functional group on the polymeric hydrogel 28. Examples of the amino cleavable group 36 are selected from the group consisting of selected from the group consisting of a phthalimide group, a BOC (tert-butyloxycarbonyl) amide, and triphenylmethylamine. These cleavable groups are stable through at least 300 sequencing cycles that may take place during the nucleic acid analysis.

Each of the alkyne-containing primers 32A, 34A in the first example kit may also include a linking molecule attached to the amino cleavable group 36. Examples of suitable linking molecules may include nucleic acid linkers (e.g., 10 nucleotides or less) or non-nucleic acid linkers, such as a polyethylene glycol chain (e.g., hexaethylene glycol), an alkyl group or a carbon chain, an aliphatic linker, a peptide linker, etc. An example of a nucleic acid linker is a polyT spacer, although other nucleotides can also be used. In some examples, the polyT region includes from 2 T bases to 20 T bases. As specific examples, the polyT region may include 3, 4, 5, 6, 7, or 10 T bases.

Figure 2:
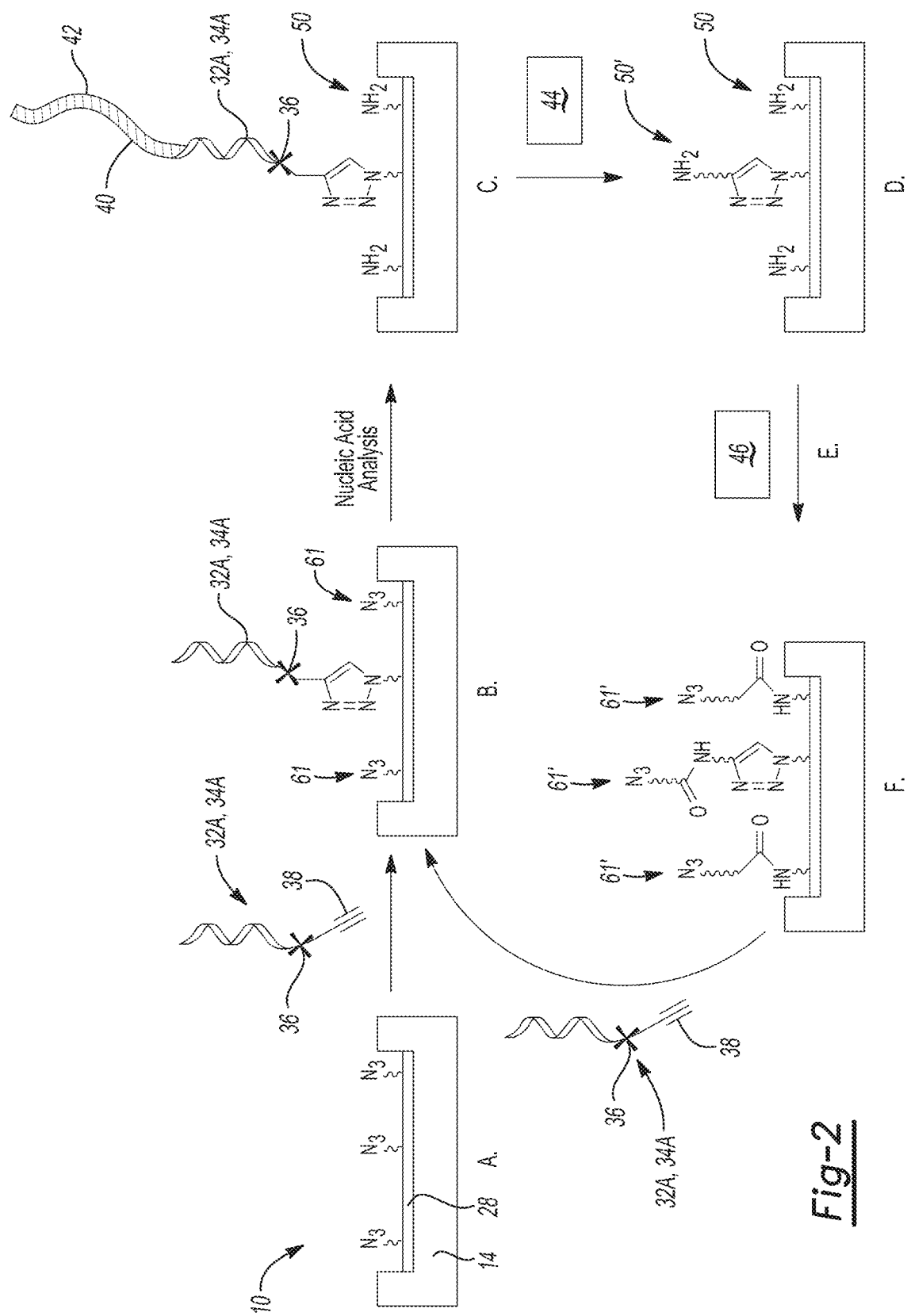
FIG. 2 is a schematic illustration of one example of a method for regenerating primer-grafting functional groups of the polymeric hydrogel after a nucleic acid analysis.
Figure 3:
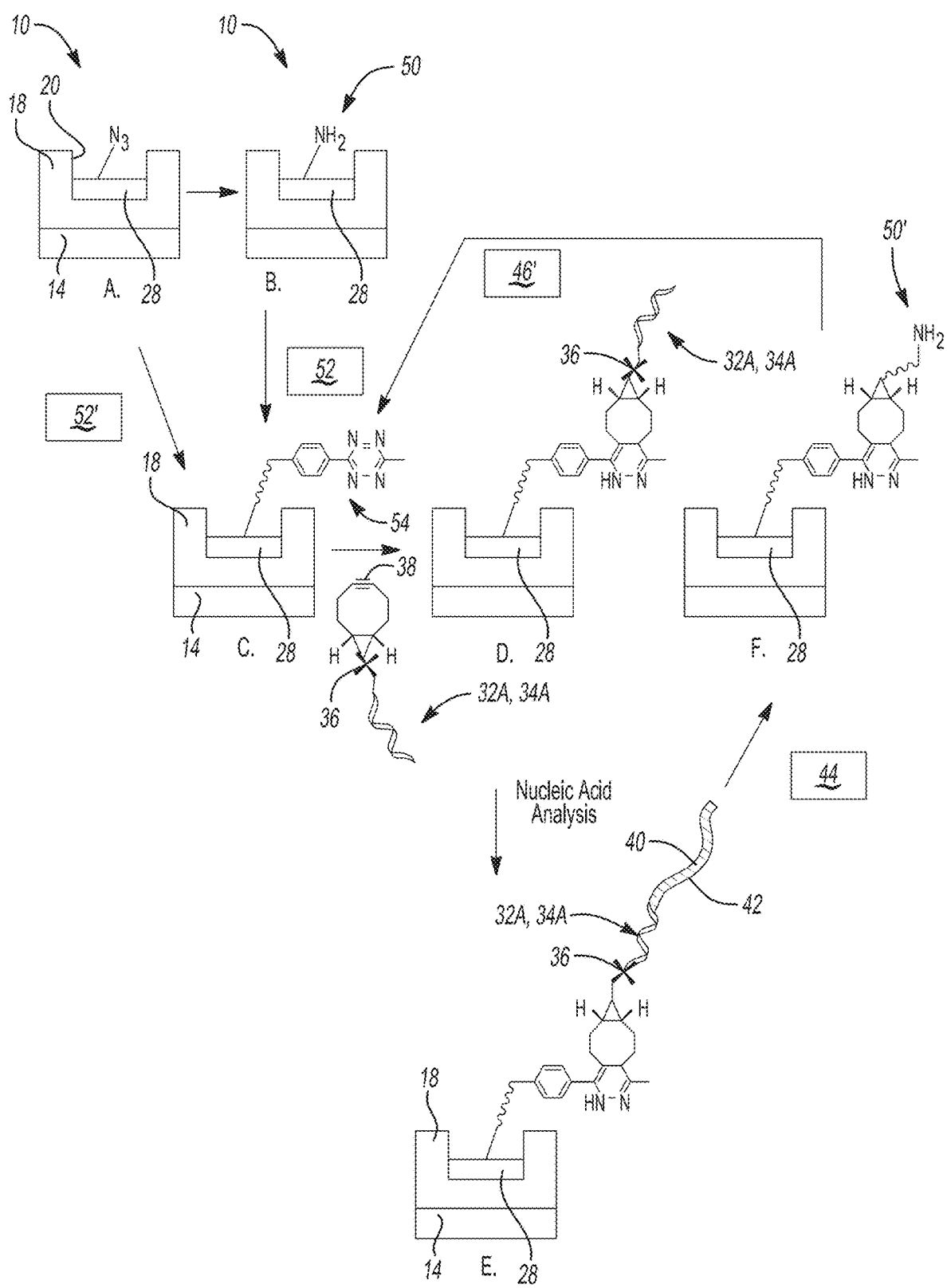
FIG. 3 is a schematic illustration of another example of a method for regenerating primer-grafting functional groups of the polymeric hydrogel after a nucleic acid analysis.

Each of the alkyne-containing primers 32A, 34A in the first example kit also includes an alkyne that is to react with the azide functional group of the polymeric hydrogel 28 or with a tetrazine molecule that is attached to the polymeric hydrogel 28. The alkyne is part of an alkyne-containing moiety 38 (FIG. 2) that is attached to the amino cleavable group 36 attached to the 5' end of the primer sequence. As such, the amino cleavable group 36 attaches the primer sequence of the alkyne-containing primer 32A, 34A to the alkyne-containing moiety 38 of the alkyne-containing primer 32A, 34A. In some examples, the alkyne is a terminal alkyne (as shown in FIG. 2). Hexynyl is one example that can be attached to the amino cleavable group 36 to generate a terminal alkyne. The alkyne may alternatively be an internal alkyne (as shown in FIG. 3), for example, where the alkyne is part of a cyclic compound that is attached to the amino cleavable group 36. Bicyclo[6.1.0]nonyne (BCN) is one example that can be attached to the amino cleavable group 36 to generate an internal alkyne.

The alkyne-containing primers 32A, 34A may be included in the carrier liquid in a concentration ranging from about 0.5 µM to about 100 µM. The higher concentrations (e.g., from about 25 µM to about 100 µM) may be more suitable for the non-patterned structures disclosed herein, while the lower concentrations (e.g., from about 0.5 µM to about 25 µM) may be more suitable for the patterned structures disclosed herein. In one example, the primer concentration ranges from about 5 µM to about 10 µM.

The carrier liquid of the primer fluid in the first example kit may be water. A buffer and/or salt may be added to the carrier liquid for grafting the primers 32A, 34A to suitable functional groups of the polymeric hydrogel 28. The buffer has a pH ranging from 5 to 12, and the buffer used will depend upon the alkyne-containing primers being used. A neutral buffer and/or salt may be added to the primer fluid for grafting BCN terminated primers, while an alkaline buffer may be added to the primer fluid for copper-assisted grafting methods (e.g., the click reaction). Any of the primer fluids disclosed herein used in copper-assisted grafting methods may also include a copper catalyst. Examples of neutral buffers include Tris(hydroxymethyl) aminomethane (TRIS) buffers, such as TRIS-HCl or TRIS-EDTA, or a carbonate buffer (e.g., 0.25 M to 1 M). Sodium sulfate (e.g., 1 M to 2 M) is a suitable salt that may be used. Examples of alkaline buffers include Tris(hydroxymethyl) aminomethane (CHES), 3-(Cyclohexylamino)-1-propanesulphonic acid (CAPS), and alkaline buffer solution (from Sigma-Aldrich).

In another example, the primer fluid is not included in the kit. Rather, one of the alkyne-terminated primers (e.g., P5 or P7) is grafted to the flow cell surface and the other of the alkyne-terminated primers (e.g., P7 or P5) is in solution. The primer that is in solution may be incorporated into the sample that includes the plurality of template nucleic acid strands (described below).

The first example kit also includes the cleaving fluid 44. The cleaving fluid 44 is reactive with the amino cleavable group 36. In one example, the amino cleavable group 36 is the phthalimide group, and the cleaving fluid 44 is hydrazine or methyl hydrazine. In another example, the amino cleavable group 36 is the BOC amide or the triphenylmethylamine, and the cleaving fluid 44 is an acid. Example acids include hydrochloric acid in water, trifluoroacetic acid in water, and methanol.

The first example kit may also include a regeneration fluid 46 (FIG. 2), 46' (FIG. 3). The regeneration fluid 46, 46' includes i) azide terminated molecules selected from the group consisting of azido-PEG$_4$-C2-carboxylic acid (where "PEG" is poly(ethylene glycol)), trifluoromethanesulfonyl azide, imidazolium sulfonyl azide hydrochloride, 1-(fluorosulfuryl)-2,3-dimethyl-1H-imidazol-3-ium trifluoromethanesulfonate, fluorosulfuryl azide, perfluorobutanesulfonyl azide, azido-PEG$_4$-N-Hydroxysuccinimide ester, and imidazole-1-sulfonyl azide hydrochloride, or ii) tetrazine terminated molecules selected from the group consisting of tetrazine-N-Hydroxysuccinimide ester and methyltetrazine-sulfo-N-Hydroxysuccinimide ester.

The regeneration fluid 46, 46' may also include a carrier liquid, such as water, alone or in combination with a buffer. Example buffers include phosphate, citrate, borate, or any alkaline buffer. The pH of the regeneration fluid ranges from about 7 to about 10.5. The azide terminated molecules or the tetrazine terminated molecules may be included in a carrier liquid in a concentration ranging from about 1 µM to about 50 mM. In one example, the azide terminated molecules are included in the carrier liquid in a concentration ranging from about 1 mM to about 20 mM. In another example, the tetrazine terminated molecules are included in the carrier liquid in a concentration ranging from about 2.5 µM to about 50 µM. In still another example, the tetrazine terminated molecules are included in the carrier liquid in a concentration ranging from about 10 µM to about 100 µM.

Some examples of the first example kit may also include a linker fluid 52, 52' (FIG. 3). In some examples, the linker fluid 52 includes tetrazine molecules that are to react with amine functional groups of the polymeric hydrogel 28 of the flow cell 10. In this linker fluid 52, the tetrazine molecules are selected from the group consisting of tetrazine-N-Hydroxysuccinimide ester, methyltetrazine-sulfo-N-Hydroxysuccinimide ester, and methyltetrazine-PEG$_n$-N-Hydroxysuccinimide ester where n=4 or 5 or 8. In other examples, the linker fluid 52' includes tetrazine molecules that are to react with azide functional groups of the polymeric hydrogel 28 of the flow cell 10. In this linker fluid 52', the tetrazine molecule is sulfo-6-methyl-tetrazine-dibenzocyclooctyne. In any example of the linker fluid 52, 52', the tetrazine molecules may be included in a carrier liquid in a concentration ranging from about 1 µM to about 50 mM. In one example, the tetrazine terminated molecules are included in the carrier liquid in a concentration ranging from about 10 µM to about 100 µM.

The carrier liquid of the linker fluid 52, 52' may be water, alone or in combination with a buffer. Example buffers include phosphate buffers, 2-ethanesulfonic acid (MES), or another acidic buffer. The pH of the regeneration fluid ranges from about 5 to about 8.

In some examples, the linker fluid 52 may be included in the kit with a flow cell 10 that includes the polymeric hydrogel 28 having amine functional groups. In other examples, the linker fluid 52 or 52' may be included in the kit with a flow cell 10 that includes the polymeric hydrogel 28 having azide functional groups. This kit may also include an azide reducing agent to initially convert the azide functional groups to the amine functional groups if the tetrazine molecules in the linker fluid 52 are to react with the amine functional groups. Examples of suitable azide reducing agents include phosphine, tin(IV) 1,2-benzenedithiolate in the presence of NaBH$_4$, dichloroindium hydride, borontrifluoride diethyl etherate and sodium iodide, and copper nanoparticles in water in the presence of ammonium formate.

The method which utilizes the first example kit includes: grafting a plurality of alkyne-containing primers 32A, 34A to respective azide functional groups or tetrazine functional groups of a polymeric hydrogel 28 on a surface of a flow cell 10, each of the plurality of alkyne-containing primers 32A, 34A having an amino cleavable group 36 attaching a primer sequence of the alkyne-containing primer to an alkyne-containing moiety of the alkyne-containing primer; performing a nucleic acid analysis involving the grafted plurality of alkyne-containing primers 32A, 34A; introducing a cleaving fluid 44 to cleave the grafted plurality of alkyne-containing primers 32A, 34A at the amino cleavable group 36, thereby leaving a plurality of amine functional groups at the surface of the flow cell 10; and reacting respective azide terminated molecules or tetrazine terminated molecules with at least some of the plurality of amine functional groups to introduce new azide functional groups or new tetrazine functional groups to the surface of a flow cell 10.

It is to be understood that in this example of the method, the plurality of alkyne-containing primers 32A, 34A may alternatively be pre-grafted to the flow cell 10. In these examples, the method would include performing a nucleic acid analysis involving the grafted plurality of alkyne-containing primers 32A, 34A; introducing the cleaving fluid to cleave the grafted plurality of alkyne-containing primers 32A, 34A at the amino cleavable group 36, thereby leaving a plurality of amine functional groups at the surface of the flow cell 10; and reacting respective azide terminated molecules or tetrazine terminated molecules with at least some of the plurality of amine functional groups to introduce new azide functional groups or new tetrazine functional groups to the surface of a flow cell 10.

One example of this method is shown in FIG. 2. This example depicts the regeneration of the azide functional groups (N$_3$) of the polymeric hydrogel 28 in the lane 26 of the non-patterned structure of the flow cell 10. The lane 26 of the flow cell 10 is depicted at letter A in FIG. 2. It is to be understood that any of the flow cell architectures disclosed herein could be used.

If the alkyne-containing primers 32A, 34A are not pre-grafted to the polymeric hydrogel 28 of the flow cell 10, the method involves grafting the alkyne-containing primers 32A, 34A to at least some of the azide functional groups of the polymeric hydrogel 28. For grafting, the primer fluid of the first example kit is introduced into the flow cell 10. The primer fluid may be introduced using flow through deposition. Grafting may be performed at a temperature ranging from about 55° C. to about 65° C. for a time ranging from about 20 minutes to about 60 minutes. In one example, grafting is performed at 60° C. for about 30 minutes or 60 minutes. It is to be understood that a lower temperature and a longer time or a higher temperature and a shorter time may also be used. Some primer grafting techniques, such as those involving N-hydroxysuccinimide (NHS) or BCN grafting to tetrazine units, may be performed at room temperature (e.g., 18° C. to about 25° C.). During grafting, the alkyne-containing primers 32A, 34A attach to at least some of the azide groups of the polymeric hydrogel 28 and have no affinity for the interstitial regions 22 or edge portions 30 of the flow cell 10. A grafted primer 32A, 34A is shown at letter B of FIG. 2.

The nucleic acid analysis may then be performed. In one example, the nucleic acid analysis involves introducing a sample including a plurality of template nucleic acid strands into the flow cell 10, whereby at least some of the plurality of template nucleic acid strands respectively hybridize to the primer sequence of at least some of the grafted plurality of alkyne-containing primers 32A, 34A; and performing sequencing-by-synthesis. Sequencing-by-synthesis involves amplification of the template nucleic acid strands and sequencing of the amplified template nucleic acid strands.

The sample including a plurality of template nucleic acid strands (i.e., library templates) may first be prepared from any nucleic acid sample (e.g., a DNA sample or an RNA sample). The DNA nucleic acid sample may be fragmented into single-stranded, similarly sized (e.g., <1000 bp) DNA fragments. The RNA nucleic acid sample may be used to synthesize complementary DNA (cDNA), and the cDNA may be fragmented into single-stranded, similarly sized (e.g., <1000 bp) cDNA fragments. During preparation, adapters may be added to the ends of any of the fragments. Through reduced cycle amplification, different motifs may be introduced in the adapters, such as sequencing primer binding sites, indices, and regions that are complementary to the primers 32A, 34A on the flow cell surface. The final library templates include the DNA or cDNA fragment and adapters at both ends. The DNA or cDNA fragment represents the portion of the final library template that is to be sequenced.

The sample may be introduced to the flow cell 10. The template nucleic acid strands hybridize, for example, to one of two types of primers 32A, 34A.

Amplification of the template nucleic acid strand(s) may be initiated to form a cluster of the template stands across the polymeric hydrogel 28 (e.g., in the lane 26, in each depression 20, or on each protrusion 24). In one example, amplification involves cluster generation. In one example of cluster generation, the library templates are copied from the hybridized primers by 3' extension using a high-fidelity DNA polymerase. The original library templates are denatured, leaving the copies immobilized to the polymeric hydrogel 28. Isothermal bridge amplification or some other form of amplification may be used to amplify the immobilized copies. For example, the copied templates loop over to hybridize to an adjacent, complementary primer, and a polymerase copies the copied templates to form double stranded bridges, which are denatured to form two single stranded strands. These two strands loop over and hybridize to adjacent, complementary primers and are extended again to form two new double stranded loops. The process is repeated on each template copy by cycles of isothermal denaturation and amplification to create dense clonal clusters. Each cluster of double stranded bridges is denatured. In an example, the reverse strand is removed by specific cleavage at the cleavage site (e.g., uracil, 8-oxoguanine, allyl-T, etc. in the primer sequence, leaving forward template strands. The generated template strand 40 is shown at letter C in FIG. 2. Clustering results in the formation of several template strands 40 immobilized on the polymeric hydrogel 28 through the primer 32A or 34A. This example of clustering is referred to as bridge amplification, and is one example of the amplification that may be performed. It is to be understood that other amplification techniques may be used.

Some examples of the method then include blocking non-protected (free) 3' OH ends of the template strands 40 and primers 32A or 34A that do not have template strands 40 attached thereto. A blocking group (e.g., a 3' phosphate) may be added that attaches to the exposed 3' ends to prevent undesired extension.

Sequencing primers may then be introduced to the flow cell 10. The sequencing primers hybridize to the template nucleic acid strands 40. These sequencing primers render the template strands 40 ready for sequencing.

An incorporation mix including labeled nucleotides may then be introduced into the flow cell 10, e.g., via the inlet. In addition to the labeled nucleotides, the incorporation mix may include water, a buffer, and polymerases. When the incorporation mix is introduced into the flow cell 10, the mix enters the flow channel 12, and contacts the anchored and sequence ready template strands 40.

The incorporation mix is allowed to incubate in the flow cell 10, and labeled nucleotides (including optical labels) are incorporated by respective polymerases into the nascent strands 42 along the template strands 40. During incorporation, one of the labeled nucleotides is incorporated, by a respective polymerase, into one nascent strand 42 that extends one sequencing primer and that is complementary to one of the template strands 40. Incorporation is performed in a template strand dependent fashion, and thus detection of the order and type of labeled nucleotides added to the nascent strand 42 can be used to determine the sequence of the template strand 40. Incorporation occurs in at least some of the template strands 40 across the flow cell 10 during a single sequencing cycle.

The incorporated labeled nucleotides may include a reversible termination property due to the presence of a 3' OH blocking group, which terminates further sequencing primer extension once the labeled nucleotide has been added. After a desired time for incubation and incorporation, the incorporation mix, including non-incorporated labeled nucleotides, may be removed from the flow cell 10 during a wash cycle. The wash cycle may involve a flow-through technique, where a washing solution (e.g., buffer) is directed into, through, and then out of flow channel 12, e.g., by a pump or other suitable mechanism.

Without further incorporation taking place, the most recently incorporated labeled nucleotides can be detected through an imaging event. During the imaging event, an illumination system may provide an excitation light to the flow cell 10. The optical labels of the incorporated labeled nucleotides emit optical signals in response to the excitation light. These optical signals may be captured using an imaging device.

After imaging is performed, a cleavage mix may then be introduced into the flow cell 10. In an example, the cleavage mix is capable of i) removing the 3' OH blocking group from the incorporated nucleotides, and ii) cleaving the optical label from the incorporated nucleotide. Examples of 3' OH blocking groups and suitable deblocking agents/components in the cleavage mix may include: ester moieties that can be removed by base hydrolysis; allyl-moieties that can be removed with NaI, chlorotrimethylsilane and $Na_2S_2O_3$ or with Hg(II) in acetone/water; azidomethyl which can be cleaved with phosphines, such as tris(2-carboxyethyl)phosphine (TCEP) or tri(hydroxypropyl)phosphine (THP); acetals, such as tert-butoxy-ethoxy, which can be cleaved with acidic conditions; MOM ($—CH_2OCH_3$) moieties that can be cleaved with $LiBF_4$ and $CH_3CN/H_2O$; 2,4-dinitrobenzene sulfenyl which can be cleaved with nucleophiles such as thiophenol and thiosulfate; tetrahydrofuranyl ether which can be cleaved with Ag(I) or Hg(II); and 3' phosphate which can be cleaved by phosphatase enzymes (e.g., polynucleotide kinase). Examples of suitable optical label cleaving agents/components in the cleavage mix may include: sodium periodate, which can cleave a vicinal diol; phosphines, such as tris(2-carboxyethyl)phosphine (TCEP) or tri(hydroxypropyl)phosphine (THP), which can cleave azidomethyl linkages; palladium and THP, which can cleave an allyl; bases, which can cleave ester moieties; or any other suitable cleaving agent of the 3' OH blocking group.

Additional sequencing cycles may then be performed until the template strands 40 are sequenced. The nascent strands 42 may be dehybridized, and the blocking group at the 3' OH ends of the template strands 40 and primers 32A or 34A may be removed. Clustering is performed again, and this time, the forward strands are removed by specific cleavage at the cleavage site (e.g., uracil, 8-oxoguanine, allyl-T, etc. in the primer sequence, leaving the reverse template strands. Sequencing of the reverse template strands may be performed as described herein.

The azide functional groups that do not attach to primers 32A, 34A during grafting are reduced to amino functional groups 50 by the cleavage mix used during sequencing. This is shown at letter C in FIG. 2.

After sequencing, the cleaving fluid 44 is introduced into the flow cell 10, e.g., via the inlet, to cleave the grafted plurality of alkyne-containing primers 32A, 34A at the amino cleavable group 36, thereby leaving a plurality of amine functional groups 50' at the surface of the flow cell 10. This is shown at letter D in FIG. 2. FIG. 4A through FIG. 4C illustrate different examples of the reactions that take place at the amino cleavable group 36 when the cleaving fluid 44 is introduced.

In FIG. 4A, the amino cleavable group 36A is the phthalimide group, and the cleaving fluid 44A is methyl hydrazine. In this example, hydrazine may also be used instead of methyl hydrazine. In FIG. 4B, the amino cleavable group 36B is the BOC amide, and the cleaving fluid 44B is hydrochloric acid (HCl) in water. In this example, another acid may be used instead of HCl. In FIG. 4C, the amino cleavable group 36C is triphenylmethylamine, and the cleaving fluid 44C is hydrochloric acid (HCl) in water or trifluoroacetic acid (TFA) in water. As illustrated, each of the reactions generates a cleaved portion 48A, 48B, 48C and leaves amino functional groups ($NH_2$) 50' attached to the polymeric hydrogel 28 in the flow cell 10.

After a desired time for cleaving, a wash cycle may be performed to remove the cleaved portions 48A, 48B, 48C.

As shown at letter D in FIG. 2, nucleic acid analysis and cleavage of the amino cleavable group 36 leave amino functional groups 50, 50' attached to the polymeric hydrogel 28.

The regeneration fluid 46 is then introduced into the flow cell 10, e.g., via the inlet (see letter E of FIG. 2). In this example, the regeneration fluid 46 includes the azide terminated molecules, which are selected from the group consisting of azido-$PEG_4$-C2-carboxylic acid (where "PEG" is poly(ethylene glycol)), trifluoromethanesulfonyl azide, imidazolium sulfonyl azide hydrochloride, 1-(fluorosulfuryl)-2,3-dimethyl-1H-imidazol-3-ium trifluoromethanesulfonate, fluorosulfuryl azide, perfluorobutanesulfonyl azide, azido-$PEG_4$-N-Hydroxysuccinimide ester, and imidazole-1-sulfonyl azide hydrochloride. The azide terminated molecules in the regeneration fluid 46 react with amino functional groups 50, 50' to introduce fresh azide functional groups 61' to the polymeric hydrogel 28, as shown at letter F in FIG. 2.

In this example method, the flow cell 10 includes the azide functional groups; some of the azide functional groups 61 remain free after grafting (as shown at letter B in FIG. 2); the free (ungrafted) azide functional groups 61 are reduced to amine groups 50 during the nucleic acid analysis (as shown at letter C in FIG. 2); and at least some of the azide terminated molecules (introduced in the regeneration fluid 46) react with at least some of the plurality of amine functional groups 50' (generated when the amino cleavable group 36 is cleaved, as shown at letter D in FIG. 2) and least some other of the azide terminated molecules (introduced in the regeneration fluid 46) react with the amine groups 50.

With fresh azide functional groups 61' located at the surface of the polymeric hydrogel 28, the flow cell surface is regenerated for another round of primer 32A, 34A grafting and nucleic acid analysis. The processes shown and described in reference to letters B through F may be repeated as desired to perform multiple nucleic acid analyses.

Two other examples of this method are shown in FIG. 3. These examples depict the regeneration of tetrazine functional groups on the polymeric hydrogel 28 in the depression 20 of the patterned structure of the flow cell 10. It is to be understood that any of the flow cell architectures disclosed herein could be used in these methods.

Both of the example methods in FIG. 3 begin at letter A when the polymeric hydrogel 28 includes the azide functional groups ($N_3$).

In one example, the method may begin by exposing the flow cell surface to an azide reducing agent. As an example, the azide reducing agent is phosphine (e.g., Tris(2-carboxyethyl)phosphine hydrochloride) (TCEP), Tris(hydroxypropyl)phosphine, etc.) or phosphite, and the reduction reaction occurs at a temperature ranging from about 50° C. to about 60° C. for a time ranging from about 5 minutes to about 10 minutes. The reduction reaction may occur in seconds (e.g., 30 seconds). Exposure to the azide reducing agent may also be allowed to occur for a longer duration, e.g., 60 minutes or more. The reduction reaction reduces the azide functional groups to amine functional groups 50, as shown at letter B in FIG. 3.

Alternatively, this example method begins at letter B in FIG. 3 when the polymeric hydrogel 28 includes the amide functional groups 50 from the outset. In this example, the reduction of the azide functional groups is not performed.

When the polymeric hydrogel 28 initially includes or is treated to generate the amine functional groups 50, the linker fluid 52 is introduced into the flow cell 10, e.g., via the inlet. The tetrazine molecules of the linker fluid 52 react with the amine functional groups 50 of the polymeric hydrogel 28. Any of the tetrazine molecules that can react with the amine functional groups 50 may be used in the linker fluid 52. The linker fluid 52 may be allowed to incubate in the flow cell 10 for about 30 minutes at about 60° C. This will introduce tetrazine functional groups 54 to the polymeric hydrogel 28, as shown at letter C in FIG. 3. It is to be understood that while not shown in FIG. 3, the amine functional groups 50 that do not attach to tetrazine functional groups 54 at the outset of the method remain free to attach to fresh tetrazine functional groups 54 during regeneration.

In another example, the method of FIG. 3 may begin by attaching the tetrazine molecules 54 to the azide functional groups of the polymeric hydrogel 28. In these examples, the method proceeds from letter A to letter C, as the azide reduction reaction is not performed. When the polymeric hydrogel 28 includes the azide functional groups, and these groups are not reduced to amine functional groups, the linker fluid 52' is introduced into the flow cell 10, e.g., via the inlet. The tetrazine molecules of the linker fluid 52' react with the azide functional groups of the polymeric hydrogel 28. The linker fluid 52' may be allowed to incubate in the flow cell 10 for about 30 minutes at about 60° C. This will introduce tetrazine functional groups 54 to the polymeric hydrogel 28, as shown at letter C in FIG. 3.

Both of the example methods shown in FIG. 3 then involve grafting the alkyne-containing primers 32A, 34A to at least some of the tetrazine functional groups 54 of the polymeric hydrogel 28. For grafting, the primer fluid of the first example kit is introduced into the flow cell 10. The primer fluid may be introduced using flow through deposition. During grafting, the alkyne-containing primers 32A, 34A attach to at least some of the tetrazine functional groups 54 of the polymeric hydrogel 28 and have no affinity for the interstitial regions 22 or edge portions 30 of the flow cell 10. A grafted primer 32A, 34A is shown at letter D of FIG. 3.

The incubation of the linker fluid 52 or 52' and the primer grafting may take place at a temperature ranging from about 15° C. to about 75° C. for a time period ranging from about 5 minutes to about 75 minutes. In one example, each reaction (attachment of tetrazine molecules of the linker fluid 52 or 52' and subsequent primer grafting) may take place at a temperature ranging from about 20° C. to about 60° C. for about 30 minutes.

The nucleic acid analysis may then be performed as described in reference to FIG. 2. The template strand 40 and the nascent strand 42 are shown at letter E in FIG. 3.

After sequencing, the cleaving fluid 44 is introduced into the flow cell 10, e.g., via the inlet, to cleave the grafted plurality of alkyne-containing primers 32A, 34A at the amino cleavable group 36, thereby leaving a plurality of amine functional groups 50' at the surface of the flow cell 10. This is shown at letter F in FIG. 3. As described in reference to FIG. 4A through FIG. 4C, the cleaving fluid 44 that is used will depend upon the amino cleavable group 36 that is incorporated into the alkyne-containing primers 32A, 34A. After a desired time for cleaving, a wash cycle may be performed to remove the cleaved portions.

The regeneration fluid 46' is then introduced into the flow cell 10, e.g., via the inlet. In this example, the regeneration fluid 46' includes the tetrazine terminated molecules that can react with amine functional groups, e.g., 50, 50'. In this example, the regeneration fluid 46' includes the tetrazine terminated molecules, which are selected from the group consisting of tetrazine-N-Hydroxysuccinimide ester and methyltetrazine-sulfo-N-Hydroxysuccinimide ester. Some of the tetrazine terminated molecules in the regeneration fluid 46' react with amino functional groups 50' to introduce fresh tetrazine functional groups to the polymeric hydrogel 28. The tetrazine terminated molecules may also react with amine functional groups 50 that i) did not react when exposed to the linker fluid 52, or ii) are generated from azide functional groups that did not react when exposed to the linker fluid 52' and that are reduced during nucleic acid analysis.

With fresh tetrazine functional groups located at the surface of the polymeric hydrogel 28, the flow cell surface is regenerated for another round of primer 32A, 34A grafting and nucleic acid analysis. The processes shown and described in reference to letters B through F of FIG. 3 may be repeated as desired to perform multiple nucleic acid analyses.

Other examples of the method shown in FIG. 3 may not use the regeneration fluid 46'. Primer grafting may result in 5% or less of the tetrazine functional groups 54 having a primer 32A, 34A attached thereto, and thus there may be ungrafted tetrazine functional groups 54 on the polymeric hydrogel 28. This example of the method continues with another round of primer 32A, 34A grafting (which will attach to ungrafted tetrazine functional groups 54) and nucleic acid analysis. The processes shown and described in reference to letters D through F may be repeated as desired to perform multiple nucleic acid analyses.

Kit and Method #2

In a second example, the kit includes: a flow cell including at least one surface functionalized with a polymeric hydrogel including azide functional groups; a surface preparation kit selected from the group consisting of: i) a linker fluid including tetrazine terminated molecules to react with the azide functional groups; and ii) an azide reducing agent to reduce the azide functional groups to amine functional groups; and a second linker fluid including tetrazine terminated molecules to react with the amine functional groups; a primer fluid including a plurality of alkyne-containing primers; and an enzymatic cleaving fluid including a substance that enzymatically digests single stranded deoxyribonucleic acids. This kit may be used in the example method shown in FIG. 5.

In this example kit, the flow cell 10 may be any of the examples described herein in reference to FIG. 1B through FIG. 1D. The surface functionalized with the polymeric hydrogel may be any of the patterned or non-patterned structures described herein, which may include any example of the polymeric hydrogel 28.

The second example kit includes the surface preparation kit. In one example, the surface preparation kit includes a linker fluid, e.g., linker fluid 52', which includes tetrazine terminated molecules to react with the azide functional groups of the polymeric hydrogel 28. Any of the linker fluids 52' described herein in reference to the first example kit may be used in the second example kit. In another example, the surface preparation kit includes both an azide reducing agent to reduce the azide functional groups to amine functional groups; and a linker fluid, e.g., linker fluid 52, including tetrazine terminated molecules to react with the amine functional groups. Any of the azide reducing agents and linker fluids 52 described in reference to the first example kit may be used in the second example kit. In the one example of the surface preparation kit, the tetrazine terminated molecules in the linker fluid 52' are sulfo-6-methyl-tetrazine-dibenzocyclooctyne; or in the other example of the surface preparation kit, the tetrazine terminated molecules in the (second) linker fluid 52 are selected from the group consisting of tetrazine-N-Hydroxysuccinimide ester, methyltetrazine-sulfo-N-Hydroxysuccinimide ester, and methyltetrazine-PEG$_n$-N-Hydroxysuccinimide ester where n=4 or 5 or 8.

The second example kit also includes a primer fluid. This example of the primer fluid includes a plurality of alkyne-containing primers, e.g., primers 32B, 34B, in a carrier liquid. The alkyne-containing primers 32B, 34B may include forward and reverse amplification primer sequences that are terminated with an alkyne or that contain an internal alkyne for reaction with the tetrazine molecule that is attached to the polymeric hydrogel 28. The primers 32B, 34B together enable the amplification of a library template having end adapters that are complementary to the two different primers 32B, 34B.

As examples, the primer sequences of the alkyne-containing primers 32B, 34B may include P5 and P7 primer sequences; P15 and P7 primer sequences; or any combination of the PA primer sequences, the PB primer sequences, the PC primer sequences, and the PD primer sequences set forth herein.

The alkyne-containing primers 32B, 34B in the second example kit may include an enzymatically cleavable group 56 attached near the 5' end of any of the sequences set forth herein. The enzymatically cleavable group 56 has cleaving chemistry that is orthogonal to the cleaving chemistry of the cleavage site (e.g., uracil, 8-oxoguanine, allyl-T, etc.) used for linearization during cluster generation. As such, the enzymatically cleavable group 56 is not cleaved during linearization, but is cleaved when it is desirable to regenerate the flow cell surface. In one example, the alkyne-containing primers 32B, 34B are bicyclononyne terminated primers (shown in FIG. 5) and the enzymatically cleavable group 56 is selected from the group consisting of an enzymatically cleavable nucleobase (e.g., uracil) and a phosphodiester linkage. In this example, the cleavage site used for linearization will not be the same enzymatically cleavable nucleobase (as the enzymatically cleavable group 56) or a phosphodiester linkage. In one specific example, the alkyne-containing primers 32B, 34B are bicyclononyne terminated primers that respectively include the P5 and P7 primer sequences, where the P5 sequence includes uracil as the enzymatically cleavable group 56 and alkene-dT as its linearization cleavage site and the P7 sequence includes uracil as the enzymatically cleavable group 56 and 8-oxo-G as its linearization cleavage site.

The alkyne-containing primers 32B, 34B do not have to include the enzymatically cleavable group 56 as the enzymatic cleaving fluid is capable of enzymatically digesting single stranded deoxyribonucleic acids.

Each of the alkyne-containing primers 32B, 34B in the second example kit may also include a polyT sequence or other linking molecule attached at the 5' end of the primer sequence. In some examples, the polyT region includes from 2 T bases to 20 T bases. As specific examples, the polyT region may include 3, 4, 5, 6, 7, or 10 T bases.

Figure 5:
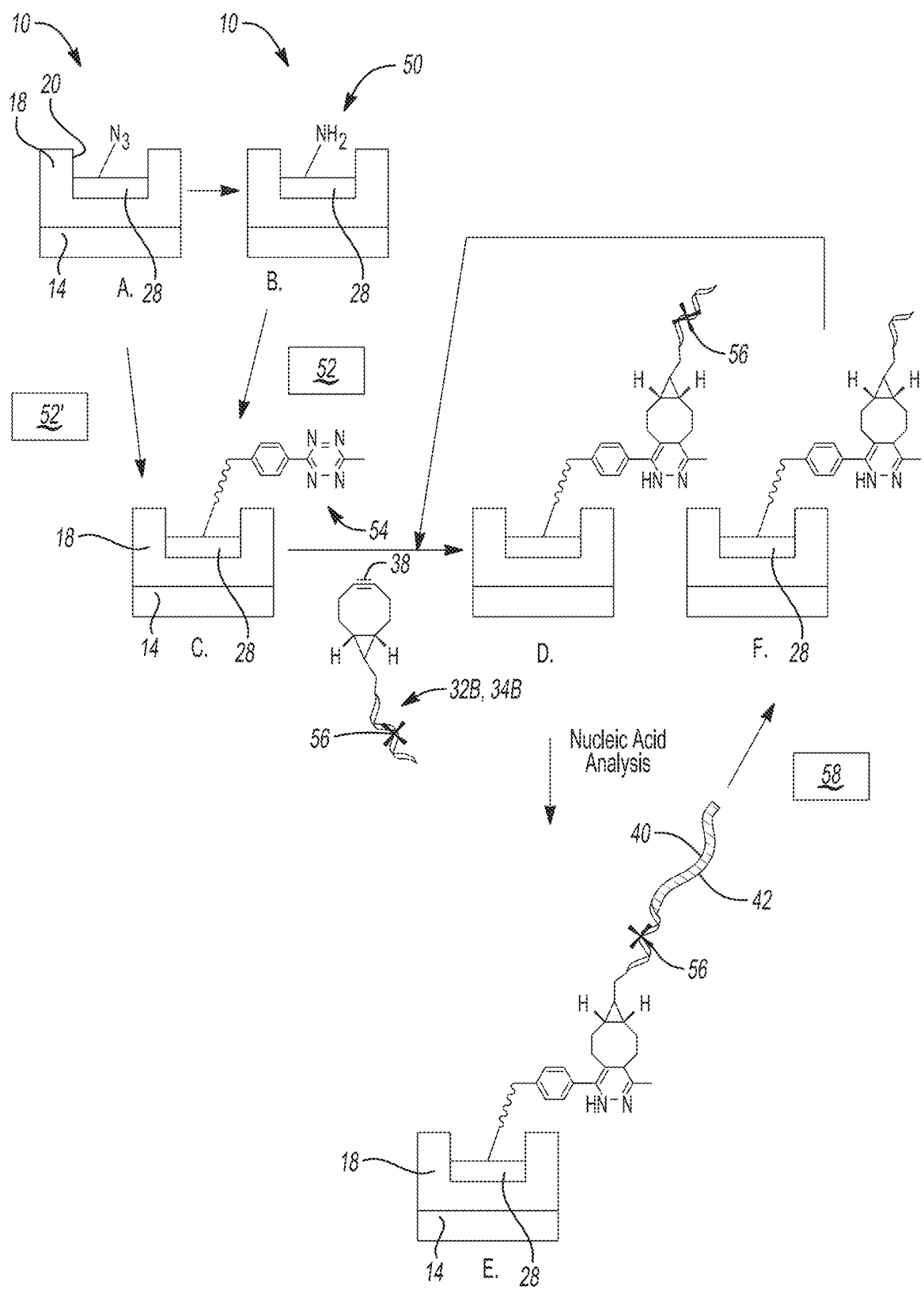
FIG. 5 is a schematic illustration of an example of a method for regenerating a flow cell surface for a subsequent nucleic acid analysis.

Each of the alkyne-containing primers 32B, 34B in the second example kit also includes an alkyne that is to react with the tetrazine molecule that is attached to the polymeric hydrogel 28. The alkyne is part of an alkyne-containing moiety 38 that is attached to the 5' end of the primer sequence or to the polyT sequence or other linking molecule that is attached to the 5' end of the primer sequence. In some examples, the alkyne is a terminal alkyne. Hexynyl is one example that can be attached to generate a terminal alkyne. The alkyne may alternatively be an internal alkyne (as shown in FIG. 5), for example, where the alkyne is part of a cyclic compound that is attached to 5' end of the primer sequence of the primers 32B, 34B. Bicyclo[6.1.0]nonyne (BCN) is one example that can be attached to generate an internal alkyne.

The carrier liquid of the primer fluid in the second example kit may be water, and any of the neutral buffers may be added to the primer fluid for grafting the alkyne-containing primers 32B. The alkyne-containing primers 32B, 34B may be included in the carrier liquid in a concentration ranging from about 0.5 µM to about 100 µM. As examples, the primer concentration ranges from about 50 µM to about 100 µM or the primer concentration ranges from about 0.5 µM to about 20 µM.

The second example kit also includes the enzymatic cleaving fluid 58 including a substance that is reactive with the enzymatically cleavable group 56. Thus, the components of the enzymatic cleaving fluid 58 will depend upon the enzymatically cleavable group 58 of the primers 32B, 34B. In one example, enzymatically cleavable group 56 is the enzymatically cleavable nucleobase, and the enzymatic cleaving fluid 58 includes an enzyme that can cleave the enzymatically cleavable nucleobase. For example, when the enzymatically cleavable group 56 is uracil, and the enzymatic cleaving fluid 58 includes the USER™ enzyme, which is a mixture of uracil DNA glycosylase (UDG) and the DNA glycosylase-lyase Endonuclease VIII. For another example, when the enzymatically cleavable group 56 is the phosphodiester linkage, and the enzymatic cleaving fluid 58 includes the DNAse enzyme. The enzymatic cleaving fluid 58 may also include cations, such as $Ca^{2+}$ and $Mg^{2+}$, to activate or enable the enzyme activity. The enzymatic cleaving fluid 58 may also include a liquid, such as water.

The method which utilizes the second example kit includes: grafting a plurality of primers 32B, 34B to respective tetrazine functional groups 54 of a polymeric hydrogel 28 on a surface of a flow cell 10, each of the plurality of primers 32B, 34B having an enzymatically cleavable group 56; performing a nucleic acid analysis involving the grafted plurality of primers 32B, 34B; enzymatically cleaving the grafted plurality of primers 32B, 34B; and grafting a second plurality of primers 32B, 34B to residual respective tetrazine functional groups 54 of the polymeric hydrogel 28.

It is to be understood that in this example of the method, the plurality of primers 32B, 34B may alternatively be pre-grafted to the flow cell 10. In these examples, the method would include performing a nucleic acid analysis involving the grafted plurality of primers 32B, 34B; enzymatically cleaving the grafted plurality of primers 32B, 34B; and grafting a second plurality of primers 32B, 34B to residual respective tetrazine functional groups 54 of the polymeric hydrogel 28.

Two examples of this method are shown in FIG. 5. These examples depict the regeneration of the flow cell surface after nucleic acid analysis using ungrafted tetrazine functional groups 54 on the polymeric hydrogel 28. In some instances, primer grafting (letter D in FIG. 5) may result in 5% or less of the tetrazine functional groups 54 having a primer 32B, 34B attached thereto. These ungrafted tetrazine functional groups 54 can be used in subsequent nucleic acid analyses, and thus the flow cell 10 could be re-grafted up to 20 times in order to use all of the tetrazine functional groups 54.

FIG. 5 depicts the polymeric hydrogel 28 in the depression 20 of the patterned structure of the flow cell 10. It is to be understood that any of the flow cell architectures disclosed herein could be used in these methods.

Both of the example methods in FIG. 5 begin at letter A when the polymeric hydrogel 28 includes the azide functional groups ($N_3$).

In one example, the method may begin by exposing the flow cell surface to an azide reducing agent. In this example, the method includes reducing azide functional groups of the polymeric hydrogel 28 to amine functional groups; and reacting tetrazine terminated molecules with the amine functional groups, thereby introducing the tetrazine functional groups 54 to the polymeric hydrogel 28. As an example, the azide reducing agent is phosphine (e.g., Tris (2-carboxyethyl)phosphine hydrochloride) (TCEP), Tris(hydroxypropyl)phosphine, etc.) or phosphite, and the reduction reaction occurs at a temperature ranging from about 50° C. to about 60° C. for a time ranging from about 5 minutes to about 10 minutes. The reduction reaction reduces the azide functional groups to amine functional groups 50, as shown at letter B in FIG. 5.

Alternatively, this example method begins at letter B in FIG. 5 when the polymeric hydrogel 28 includes the amide functional groups 50 from the outset. In this example, the reduction of the azide functional groups is not performed.

When the polymeric hydrogel 28 initially includes or is treated to generate the amine functional groups 50, the linker fluid 52 is introduced into the flow cell 10, e.g., via the inlet. The tetrazine molecules of the linker fluid 52 react with the amine functional groups 50 of the polymeric hydrogel 28. Any of the tetrazine molecules that can react with the amine functional groups may be used in the linker fluid 52. The linker fluid 52 may be allowed to incubate in the flow cell 10 for about 30 minutes at about 60° C. This will introduce tetrazine functional groups 54 to the polymeric hydrogel 28, as shown at letter C in FIG. 5.

In another example, the method may begin by attaching the tetrazine molecules 54 to the azide functional groups of the polymeric hydrogel 28. In these examples, the method proceeds from letter A to letter C, as the azide reduction reaction is not performed. When the polymeric hydrogel 28 includes the azide functional groups, and these groups are not reduced to amine functional groups 50, the linker fluid 52' is introduced into the flow cell 10, e.g., via the inlet. The tetrazine molecules of the linker fluid 52' react with the azide functional groups of the polymeric hydrogel 28. The linker fluid 52' may be allowed to incubate in the flow cell 10 for about 30 minutes at about 60° C. This will introduce tetrazine functional groups 54 to the polymeric hydrogel 28, as shown at letter C in FIG. 5.

Both of the example methods shown in FIG. 5 then involve grafting the alkyne-containing primers 32B, 34B to at least some of the tetrazine functional groups 54 of the polymeric hydrogel 28. For grafting, the primer fluid of the second example kit is introduced into the flow cell 10. The primer fluid may be introduced using flow through deposition. Grafting may be performed as described herein, e.g., at a temperature ranging from about 55° C. to about 65° C. for a time ranging from about 20 minutes to about 35 minutes. In one example, grafting is performed at 60° C. for about 30 minutes. During grafting, the alkyne-containing primers 32B, 34B attach to at least some of the tetrazine functional groups 54 of the polymeric hydrogel 28 and have no affinity for the interstitial regions 22 or edge portions 30 of the flow cell 10. A grafted primer 32B, 34B is shown at letter D of FIG. 5.

The nucleic acid analysis may then be performed as described in reference to FIG. 2. The template strand 40 and the nascent strand 42 are shown at letter E in FIG. 5.

After sequencing, the enzymatic cleaving fluid 58 is introduced into the flow cell 10, e.g., via the inlet, to cleave the grafted plurality of alkyne-containing primers 32B, 34B at the enzymatic cleavable group 56. This leaves a non-reactive portion of the primer 32B, 34B, such as a polyT tail or other linking molecule, attached to the polymeric hydrogel 28. This is shown at letter F in FIG. 5. As described herein, the enzymatic cleaving fluid 58 that is used will depend upon the enzymatic cleavable group 56 that is incorporated into the alkyne-containing primers 32B, 34B. After a desired time for cleaving, a wash cycle may be performed to remove the cleaved portions.

Because there are ungrafted tetrazine functional groups 54 on the polymeric hydrogel 28, this method may be repeated when it is desirable to perform another nucleic acid analysis. The method continues with another round of primer 32B, 34B grafting (which will attach to ungrafted tetrazine functional groups 54) and nucleic acid analysis. The processes shown and described in reference to letters D through F may be repeated as desired to perform multiple nucleic acid analyses.

Kit and Method #3

In a third example, the kit includes: a flow cell including at least one surface functionalized with a polymeric hydrogel including azide functional groups; a primer fluid including a plurality of alkyne-containing primers, each alkyne-containing primer having a chemically cleavable group or an enzymatically cleavable group; a cleaving fluid including a substance that is reactive with the chemically cleavable group or the enzymatically cleavable group; and a regeneration fluid including an amine oxidizing agent. This kit may be used in the example method shown in FIG. 6.

In this example kit, the flow cell 10 may be any of the examples described herein in reference to FIG. 1B through FIG. 1D. The surface functionalized with the polymeric hydrogel may be any of the patterned or non-patterned structures described herein, which may include any example of the polymeric hydrogel 28 including azide functional groups.

This example kit includes yet another example of the primer fluid. This primer fluid includes a plurality of alkyne-containing primers 32C, 34C in a carrier liquid. The alkyne-containing primers 32C, 34C may include forward and reverse amplification primer sequences that are terminated with an alkyne or that contain an internal alkyne for reaction with the azide functional groups attached to the polymeric hydrogel 28. The primers 32C, 34C together enable the amplification of a library template having end adapters that are complementary to the two different primers 32C, 34C.

As examples, the primer sequences of the alkyne-containing primers 32C, 34C may include P5 and P7 primer sequences; P15 and P7 primer sequences; or any combination of the PA primer sequences, the PB primer sequences, the PC primer sequences, and the PD primer sequences set forth herein.

Each of the alkyne-containing primers 32C, 34C in the third example kit also includes a chemically cleavable group 60 or an enzymatically cleavable group 60'. The chemically cleavable group 60 or the enzymatically cleavable group 60' is attached at or near the 5' end of any of the sequences set forth herein. The chemically cleavable group 60 or enzymatically cleavable group 60' has cleaving chemistry that is orthogonal to the cleaving chemistry of the cleavage site (e.g., uracil, 8-oxoguanine, allyl-T, etc.) used for linearization during cluster generation. As such, the chemically cleavable group 60 or an enzymatically cleavable group 60' is not cleaved during linearization, but is cleaved when it is desirable to regenerate the flow cell surface. The chemically cleavable group 60 is susceptible to cleavage by reaction with a particular chemical or with light. Examples of the chemically cleavable group 60 include a vicinal diol, an azobenzene, a photocleavable group, allyl T (a thymine nucleotide analog having an allyl functionality), allyl ethers, or an azido functional ether. The enzymatically cleavable group 60' is susceptible to cleavage by reaction with an enzyme or enzyme mixture (e.g., a glycosylase and an endonuclease), which may be followed by the introduction of an exonuclease to remove leftover bases. One specific example of the enzymatically cleavable group 60' is uracil, which can be targeted by the USER™ enzyme.

In one specific example, the alkyne-containing primers 32C, 34C are hexynyl terminated primers that respectively include the P5 and P7 primer sequences, where the P5 sequence includes vicinal diol as the chemically cleavable group or enzymatically cleavable group 60, 60' and uracil as its linearization cleavage site and the P7 sequence includes vicinal diol as the chemically cleavable group or enzymatically cleavable group 60, 60' and 8-oxo-G as is linearization cleavage site. In another specific example, the alkyne-containing primers 32C, 34C are hexynyl terminated primers that respectively include the P5 and P7 primer sequences, where the P5 sequence includes uracil as the chemically cleavable group or enzymatically cleavable group 60, 60' and allyl-T as its linearization cleavage site and the P7 sequence includes uracil as the chemically cleavable group or enzymatically cleavable group 60, 60' and 8-oxo-G as its linearization cleavage site.

Each of the alkyne-containing primers 32C, 34C in the third example kit may also include a polyT sequence or other linking molecule attached at the 5' end of the primer sequence. In some examples, the polyT region includes from 2 T bases to 20 T bases. As specific examples, the polyT region may include 3, 4, 5, 6, 7, or 10 T bases.

Figure 6:
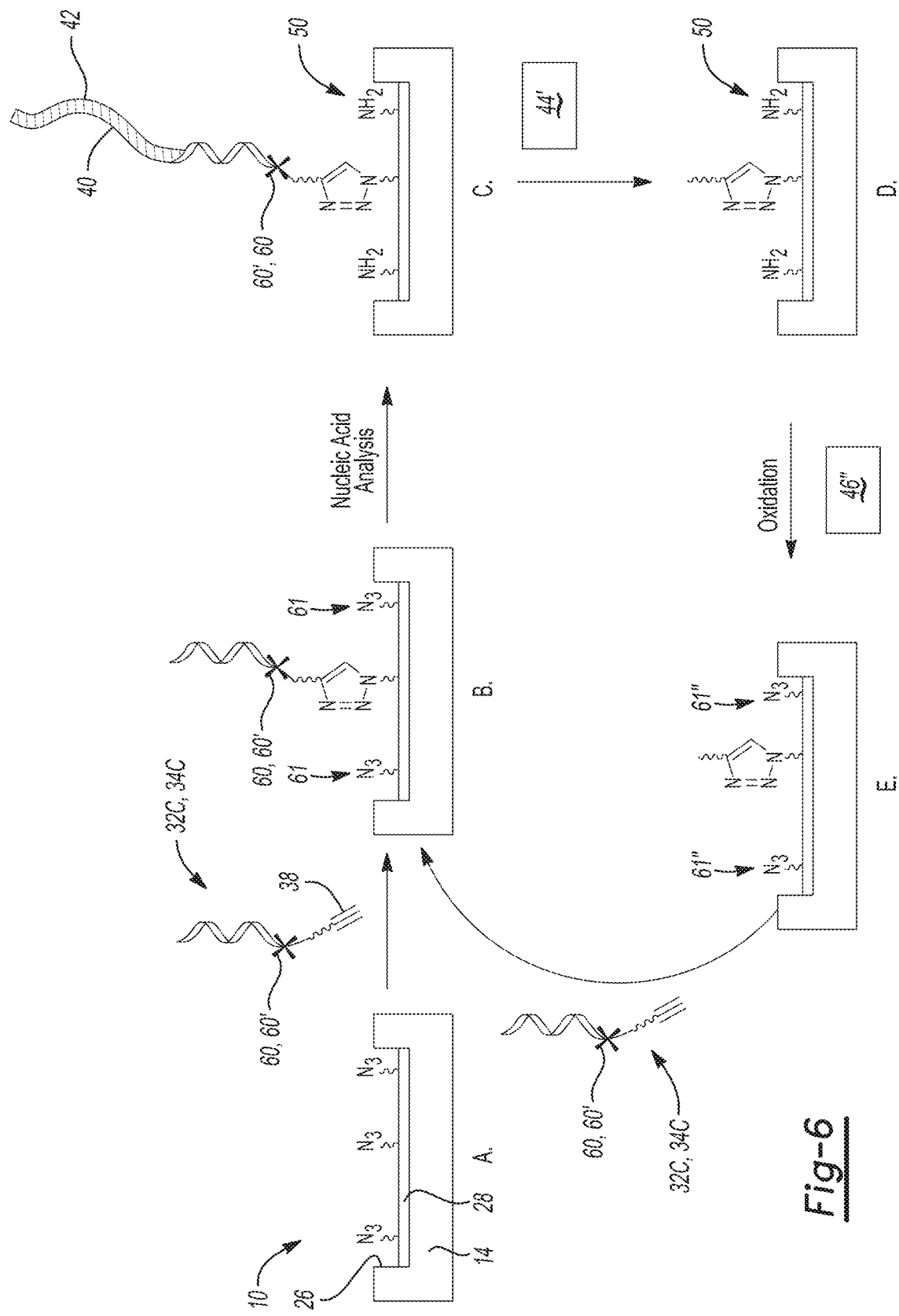
FIG. 6 is a schematic illustration of another example of a method for regenerating primer-grafting functional groups of the polymeric hydrogel after a nucleic acid analysis.

Each of the alkyne-containing primers 32C, 34C in the third example kit also includes an alkyne that is to react with the azide functional groups of the polymeric hydrogel 28. The alkyne is part of the alkyne-containing moiety 38 that is attached to the 5' end of the primer sequence or to the polyT sequence or other linking molecule that is attached to the 5' end of the primer sequence. In some examples, the alkyne is a terminal alkyne (as shown in FIG. 6). Hexynyl is one example that can be attached to generate a terminal alkyne. The alkyne may alternatively be an internal alkyne, for example, where the alkyne is part of a cyclic compound that is attached to 5' end of the primer sequence of the primers 32B, 34B. Bicyclo[6.1.0]nonyne (BCN) is one example that can be attached to generate an internal alkyne.

The carrier liquid of the primer fluid in the third example kit may be water, and any of the neutral or alkaline buffers may be added to the primer fluid for grafting the alkyne-containing primers 32C, 34C. As described herein, the buffer used will depend upon the alkyne-containing moiety 38 and its grafting technique. The alkyne-containing primers 32C, 34C may be included in the carrier liquid in a concentration ranging from about 0.5 µM to about 100 µM (or any sub-range therebetween).

The third example kit also includes an example of the cleaving fluid. The cleaving fluid 44' in the third example kit includes a substance that is reactive with the chemically cleavable group 60 or the enzymatically cleavable group 60' of the alkyne-containing primers 32C, 34C. Thus, the components of the cleaving fluid 44' will depend upon the chemically cleavable group or the enzymatically cleavable group 60, 60' of the primers 32C, 34C. A chemical cleaving fluid 44' may be a buffer that contains palladium (e.g., [Pd(allyl)Cl]$_2$). An enzymatic cleaving fluid 44' may include the USER™ enzyme.

In some examples, the cleaving fluid 44' is formulated to cleave the enzymatically cleavable group 60'. This example kit may also include an exonuclease fluid that is to be introduced into the flow cell 10 after cleavage of the enzymatically cleavable group 60'. The exonuclease can remove bases that are left on the flow cell surface after cleavage of the enzymatically cleavable group 60'. For example, after cleavage and transfer 3' from phosphate to —OH by Kinase, exonuclease can be flowed in the flow cell to chew base by base.

The third example kit also includes an example of a regeneration fluid. The regeneration fluid 46" in the third example kit includes an amine oxidizing agent. In one example, the regeneration fluid 46" includes imidazole-1-sulfonyl azide hydrochloride (as the amine oxidizing agent). This example of the regeneration fluid 46" is an alcohol solution (e.g., methanol, isopropanol, t-butyl alcohol, etc.) including one or more salts, such as potassium carbonate (potassium concentration is about 1 mol % and potassium carbonate is 1.5 eq.), sodium bicarbonate, and/or copper sulfate (e.g., $CuSO_4 \cdot 5H_2O$).

The method which utilizes the third example kit includes: grafting a plurality of primers 32C, 34C to respective azide functional groups of a polymeric hydrogel 28 on a surface of a flow cell 10, each of the plurality of primers 32C, 34C having a chemically cleavable group 60 or an enzymatically cleavable group 60'; performing a nucleic acid analysis involving the grafted plurality of primers 32C, 34C, whereby free azide functional groups are reduced to amine groups; cleaving the grafted plurality of primers 32C, 34C; and exposing the polymeric hydrogel 28 to a regeneration fluid 46", thereby regenerating azide functional groups from the amine groups.

It is to be understood that in this example of the method, the plurality of primers 32C, 34C may alternatively be pre-grafted to the flow cell 10. In these examples, the method would include performing a nucleic acid analysis involving the grafted plurality of primers 32C, 34C, whereby free azide functional groups are reduced to amine groups; cleaving the grafted plurality of primers 32C, 34C; and exposing the polymeric hydrogel 28 to a regeneration fluid 46", thereby regenerating azide functional groups from the amine groups.

One example of this method is shown in FIG. 6. This example depicts the regeneration of the azide functional groups ($N_3$) of the polymeric hydrogel 28 in the lane 26 of the non-patterned structure of the flow cell 10. The lane 26 of the flow cell 10 is depicted at letter A in FIG. 6. It is to be understood that any of the flow cell architectures disclosed herein could be used.

This example method depicts the regeneration of the ungrafted azide functional groups 61 on the flow cell surface. In some instances, primer grafting (letter B in FIG. 6) results in 5% or less of the azide functional groups having a primer 32C, 34C attached thereto. These ungrafted azide functional groups 61 are reduced to amine functional groups 50 during the nucleic acid analysis (see letter C in FIG. 6). This example method oxidizes these amine functional groups 50 to regenerate the azide functional groups 61" for subsequent grafting and nucleic acid analysis (see letters D and E in FIG. 6). This method enables the flow cell 10 to be re-grafted up to 20 times in order to use all of the azide functional groups.

The method shown in FIG. 6 begins with grafting the alkyne-containing primers 32C, 34C to at least some of the azide functional groups ($N_3$) of the polymeric hydrogel 28. For grafting, the primer fluid of the third example kit is introduced into the flow cell 10. The primer fluid may be introduced using flow through deposition. Grafting may be performed at a temperature ranging from about 55° C. to about 65° C. for a time ranging from about 20 minutes to about 35 minutes. In one example, grafting is performed at 60° C. for about 30 minutes. During grafting, the alkyne-containing primers 32C, 34C attach to at least some of the azide functional groups of the polymeric hydrogel 28 and have no affinity for the interstitial regions 22 or edge portions 30 of the flow cell 10. A grafted primer 32C, 34C and some ungrafted azide functional groups 61 are shown at letter B of FIG. 6.

The nucleic acid analysis may then be performed as described in reference to FIG. 2. The template strand 40 and the nascent strand 42 are shown at letter C in FIG. 6. As shown at letter C in FIG. 6, the ungrafted azide functional groups 61 are reduced to amine groups 50.

After sequencing, the cleaving fluid 44' is introduced into the flow cell 10, e.g., via the inlet, to cleave the grafted plurality of alkyne-containing primers 32C, 34C at the chemically cleavable group 60 or the enzymatically cleavable group 60'. This is shown at letter D in FIG. 6. The cleaving fluid 44' that is used will depend upon the chemically cleavable group 60 or the enzymatically cleavable group 60' that is incorporated into the alkyne-containing primers 32C, 34C. After a desired time for cleaving, a wash cycle may be performed to remove the cleaved portions.

The regeneration fluid 46" is then introduced into the flow cell 10, e.g., via the inlet. In this example, the regeneration fluid 46" includes the amine oxidizing agent that can oxidize the amine groups 50 to regenerate azide functional groups 61". This is shown at letter E in FIG. 6.

With fresh azide functional groups 61" located at the surface of the polymeric hydrogel 28, the flow cell surface is regenerated for another round of primer 32C, 34C grafting and nucleic acid analysis. Newly introduced primers 32C, 34C will graft to the fresh azide functional groups 61". The processes shown and described in reference to letters B through E may be repeated as desired to perform multiple nucleic acid analyses.

Kit and Method #4

In a fourth example, the kit includes: a flow cell including at least one surface functionalized with a polymeric hydrogel including azide functional groups; a linker fluid including olefin terminated molecules, each olefin terminated molecule including a terminal alkyne functional group to react with a respective one of the azide functional groups; a primer fluid including a plurality of olefin terminated primers; a ruthenium carbene complex; and a regeneration fluid including another olefin terminated molecule. This kit may be used in the example method shown in FIG. 7.

In this example kit, the flow cell 10 may be any of the examples described herein in reference to FIG. 1B through FIG. 1D. The surface functionalized with the polymeric hydrogel may be any of the patterned or non-patterned structures described herein, which may include any example of the polymeric hydrogel 28 that includes azide functional groups.

This example kit includes another example of the linker fluid 52". In this example, the linker fluid 52" includes olefin terminated molecules. Each olefin terminated molecule also includes a terminal alkyne functional group to react with a respective one of the azide functional groups of the polymeric hydrogel 28. An example of the olefin terminated molecule has structure (I):

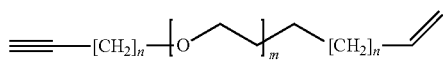

wherein n ranges from 1 to 6 and m ranges from 4 to 12.

The linker fluid 52" also includes a carrier liquid, such as water, an aqueous buffer, dimethylsulfoxide (DMSO), or a mixture of a buffer and DMSO. Any buffer may be used that does not react with the olefin. The olefin terminated molecules may be included in the carrier liquid in a concentration ranging from about 0.5 µM to about 100 µM. The higher concentrations (e.g., from about 25 µM to about 100 µM) may be more suitable for the non-patterned structures disclosed herein, while the lower concentrations (e.g., from about 0.5 µM to about 25 µM) may be more suitable for the patterned structures disclosed herein. In one example, the primer concentration ranges from about 5 µM to about 10 µM. The linker fluid 52" may also include a copper catalyst for the click reaction.

The fourth example kit includes another example of the primer fluid. The primer fluid in the fourth example kit includes a plurality of olefin terminated primers 32D, 34D in a carrier liquid. The olefin terminated primers 32D, 34D may include forward and reverse amplification primer sequences that are terminated with an olefin that can participate in a cross-metathesis reaction with the olefin terminated molecule that is introduced to the polymeric hydrogel 28. The primers 32D, 34D together enable the amplification of a library template having end adapters that are complementary to the two different primers 32D, 34D.

As examples, the primer sequences of the olefin terminated primers 32D, 34D may include P5 and P7 primer sequences; P15 and P7 primer sequences; or any combination of the PA primer sequences, the PB primer sequences, the PC primer sequences, and the PD primer sequences set forth herein.

Each of the olefin terminated primers 32D, 34D in the fourth example kit may also include a polyT sequence or another linking molecule attached at the 5' end of the primer sequence. In some examples, the polyT region includes from 2 T bases to 20 T bases. As specific examples, the polyT region may include 3, 4, 5, 6, 7, or 10 T bases.

Each of the olefin terminated primers 32D, 34D in the fourth example kit also includes the terminal olefin. The terminal olefin is part of an olefin-containing moiety 62 that is attached to the 5' end of the primer sequence or to the polyT sequence or other linking molecule that is attached to the 5' end of the primer sequence. One example of the olefin-containing moiety 62 is an allyl-type phosphoramidite, such as

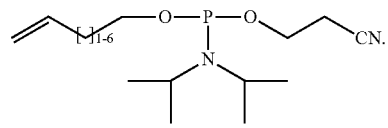 [SMILES: C=CCCOP(OCCC#N)N(C(C)C)C(C)C]

This moiety 62 can be used to generate:

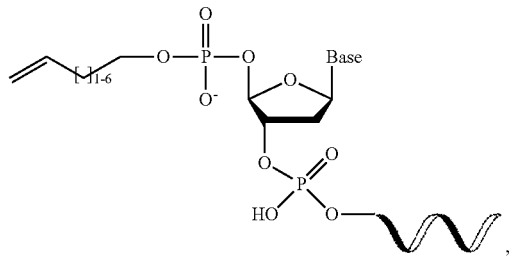

where ⌇⌇ is the primer sequence.

The carrier liquid of the primer fluid in the fourth example kit may be water, alone or in combination with any of the neutral buffers set forth herein. The primer fluid may also include a copper catalyst. The olefin terminated primers 32D, 34D may be included in the carrier liquid in a concentration ranging from about 0.5 µM to about 100 µM. The concentration selected may depend upon the architecture of the flow cell 10 as described herein.

The fourth example kit also includes a ruthenium carbene complex 64. The ruthenium carbene complex 64 is used during the cross-metathesis reaction to graft the olefin terminated primers 32D, 34D and during the cross-metathesis reaction to regenerate the flow cell surface after the nucleic acid analysis (see FIG. 7). Examples of the ruthenium carbene complex 64 include those known as the Grubbs Catalysts, or derivatives of the Grubbs Catalysts. Any of the examples set forth herein may be used.

The 1$^{st}$ generation Grubbs Catalyst is Benzylidene-bis (tricyclohexylphosphino)-dichlororuthenium:

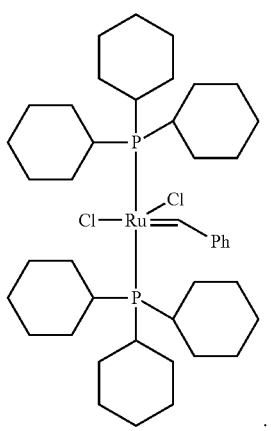

The 2nd generation Grubbs Catalyst is 1,3-Bis-(2,4,6-trimethylphenyl)-2-imidazolidinylidene]dichloro(o-isopropoxyphenylmethylene)ruthenium:

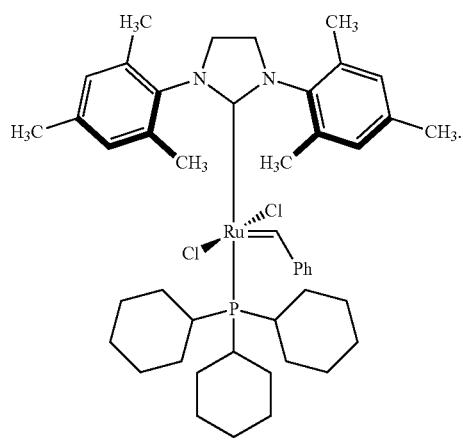

The 3rd generation Grubbs Catalyst is Dichloro[1,3-bis(2,4,6-trimethylphenyl)-2-imidazolidinylidene](benzylidene)bis(3-bromopyridine)ruthenium(II):

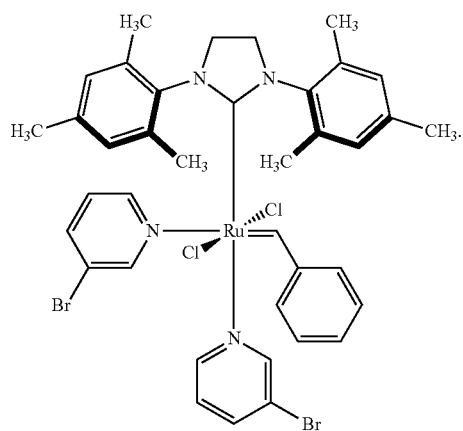

The 1st generation Hoveyda-Grubbs Catalyst is Dichloro(o-isopropoxyphenylmethylene)(tricyclohexylphosphine)ruthenium(II):

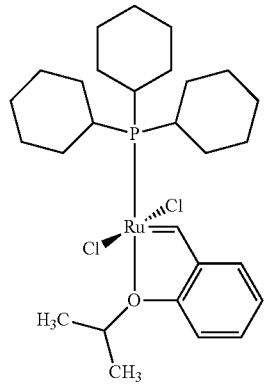

The 2nd generation Hoveyda-Grubbs Catalyst is [1,3-bis-(2,4,6-trimethylphenyl)-2-imidazolidinylidene]dichloro(phenylmethylene)(tricyclohexylphosphino)ruthenium:

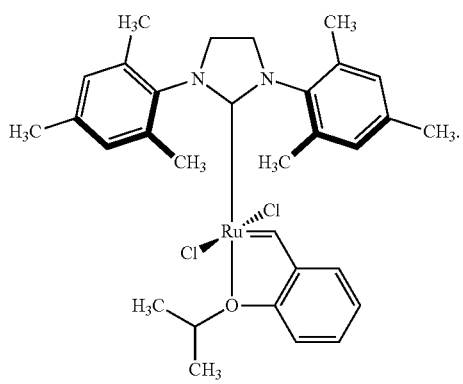

Some derivatives of the Grubbs Catalysts are ammonium-tagged. Examples of the ammonium-tagged catalysts include 1-9 below:

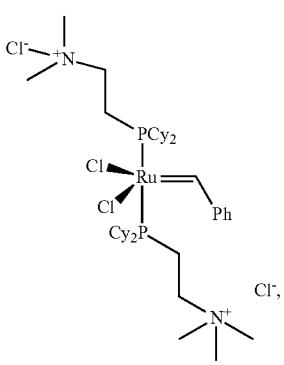

1)

2)
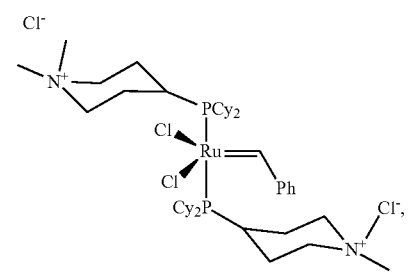
3)
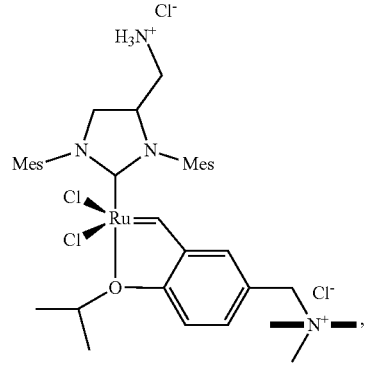
4)
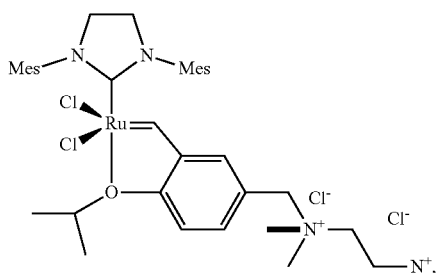
5)
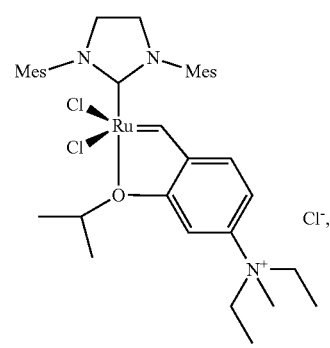
6), 7), or 8)
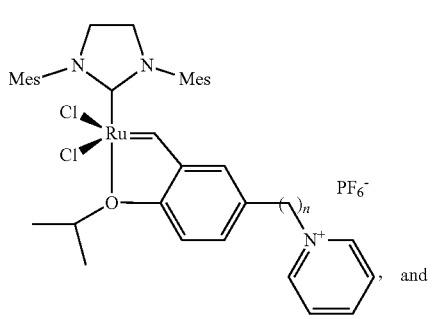
wherein n = 0, 1, and 3, respectively
9)
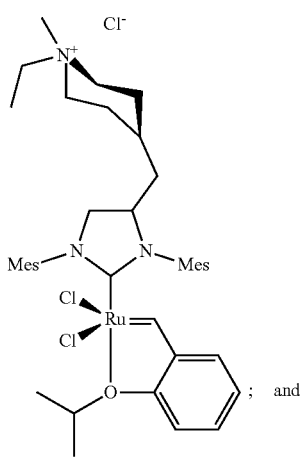
; and
in any of structures 1-9:
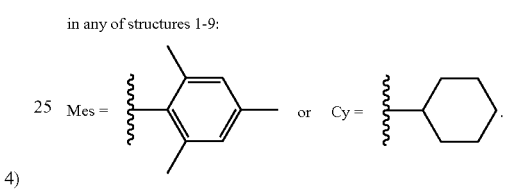
Other derivatives of the Grubbs Catalysts are poly(ethylene glycol) (PEG) tethered. Examples of the PEG-tethered catalysts include 10-12 below:
10)
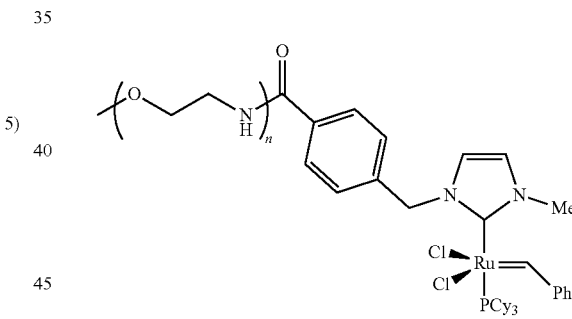
11)
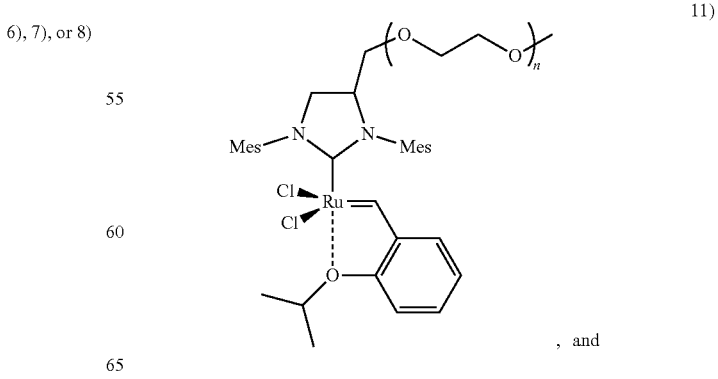
, and

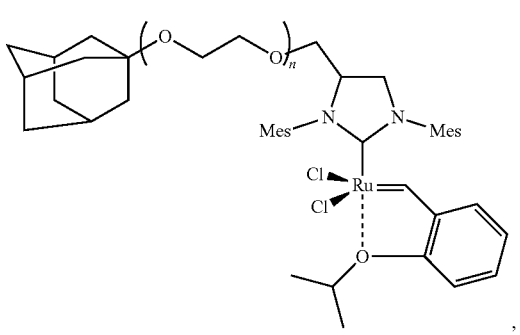

wherein in any of structures 10-12:

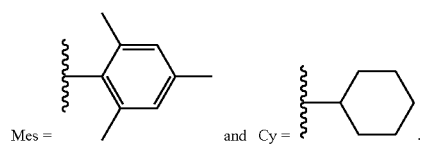

In one example, the ruthenium carbene complex is selected from the group consisting of Benzylidene-bis(tricyclohexylphosphino)-dichlororuthenium (1$^{st}$ generation Grubbs Catalyst), [1,3-bis-(2,4,6-trimethylphenyl)-2-imidazolidinylidene]dichloro(phenylmethylene)(tricyclohexylphosphino)ruthenium (2$^{nd}$ generation Hoveyda-Grubbs Catalyst), Dichloro(o-isopropoxyphenylmethylene)(tricyclohexylphosphine)ruthenium(II) (1$^{st}$ generation Hoveyda-Grubbs Catalyst), [1,3-Bis-(2,4,6-trimethylphenyl)-2-imidazolidinylidene]dichloro(o-isopropoxyphenylmethylene) ruthenium (2$^{nd}$ generation Grubbs Catalyst), and Dichloro[1,3-bis(2,4,6-trimethylphenyl)-2-imidazolidinylidene] (benzylidene)bis(3-bromopyridine)ruthenium(II) (3$^{rd}$ generation Grubbs Catalyst).

The fourth example kit also includes a regeneration fluid. This example of the regeneration fluid 64''' includes another olefin terminated molecule, such as ethylene (in liquid form). Other examples of suitable olefin terminated molecules include:

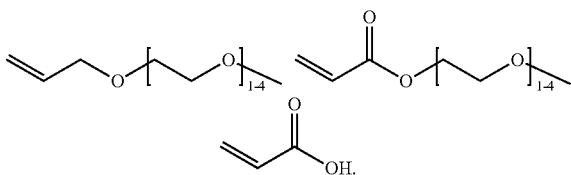

The method which utilizes the fourth example kit includes: attaching a plurality of olefin terminated molecules to respective azide functional groups of a polymeric hydrogel 28 on a surface of a flow cell 10, each olefin terminated molecule including a terminal alkyne functional group to react with a respective one of the azide functional groups; initiating a first cross-metathesis reaction, in the presence of a ruthenium carbene complex 64, to respectively graft olefin terminated primers 32D, 34D to at least some of the olefin terminated molecules; performing a nucleic acid analysis involving the grafted olefin terminated primers 32D, 34D; and initiating a second cross-metathesis reaction, in the presence of the ruthenium carbene complex 64, to cleave the grafted olefin terminated primers 32D, 34D and generate new olefin terminated molecules.

It is to be understood that in this example of the method, the plurality of olefin terminated primers 32D, 34D may alternatively be pre-grafted to the flow cell 10. In these examples, the method would include performing a nucleic acid analysis involving the grafted olefin terminated primers 32D, 34D; and initiating a cross metathesis-reaction, in the presence of the ruthenium carbene complex 64, to cleave the grafted olefin terminated primers 32D, 34D and generate new olefin terminated molecules.

Figure 7:
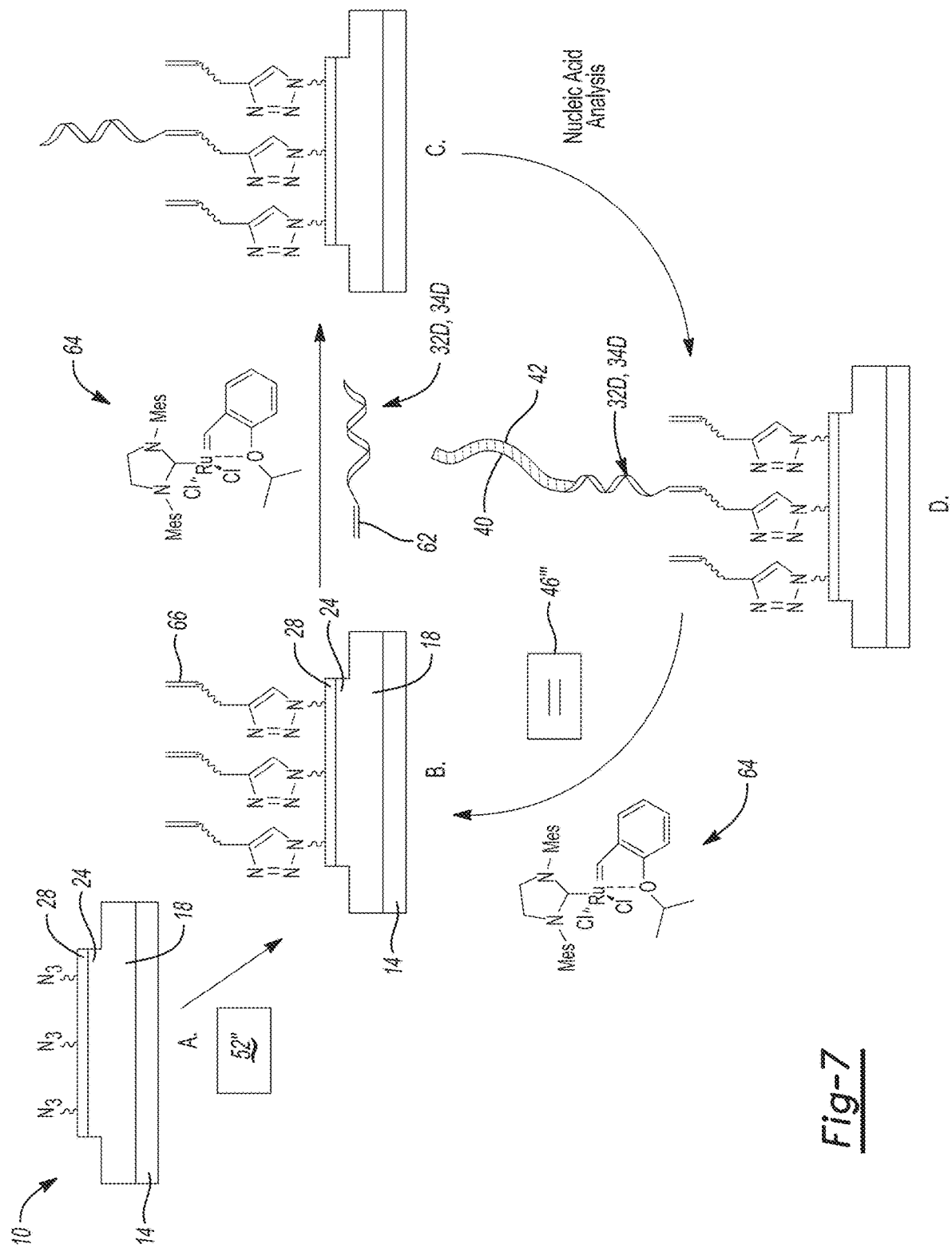
FIG. 7 is a schematic illustration of yet another example of a method for regenerating primer-grafting functional groups of the polymeric hydrogel after a nucleic acid analysis.

The example method shown in FIG. 7 depicts the regeneration of the olefin terminated molecules attached to the polymeric hydrogel 28, which is positioned on the protrusion 24 of the patterned structure of the flow cell 10. One protrusion 24 of the flow cell 10 is depicted at letter A in FIG. 7. It is to be understood that any of the flow cell architectures disclosed herein could be used.

At the outset of the method shown in FIG. 7, the linker fluid 52" is introduced into the flow cell 10, e.g., via the inlet. As mentioned above, the linker fluid 52" includes olefin terminated molecules, which also include a terminal alkyne functional group. The terminal alkyne functional group undergoes a click reaction with a respective one of the azide functional groups of the polymeric hydrogel 28. The linker fluid 52" may be allowed to incubate in the flow cell 10 for about 30 minutes at about 60° C. This will introduce terminal olefins 66 to the polymeric hydrogel 28, as shown at letter B in FIG. 7.

This example method then involves grafting the olefin terminated primers 32D, 34D. This grafting process is carried out using the cross-metathesis reaction, where the terminal olefin (alkene) 62 of the olefin terminated primers 32D, 34D and the terminal olefin (alkene) 66 of the polymeric hydrogel 28 undergo transalkylidenation. The intermolecular reaction of the two terminal olefin units 62, 66 takes place in the presence of a metathesis catalyst, such as the ruthenium carbene complex 64.

In this example method, grafting generally involves adding the ruthenium carbene complex 64 and the olefin terminated primers 32D, 34D to a liquid carrier to generate a mixture, and introducing the mixture into the flow cell 10. The liquid carrier that is used will depend upon the ruthenium carbene complex 64. In one example, the ruthenium carbene complex 64 is Dichloro[1,3-bis(2,4,6-trimethylphenyl)-2-imidazolidinylidene](benzylidene)bis(3-bromopyridine)ruthenium(II); and initiating the first cross-metathesis reaction involves adding the ruthenium carbene complex 64 and the olefin terminated primers 32D, 34D to a liquid carrier including water, t-butanol, and magnesium chloride, thereby generating the mixture; and introducing the mixture into the flow cell 10. In another example, the ruthenium carbene complex 64 is Dichloro(o-isopropoxyphenylmethylene)(tricyclohexylphosphine)ruthenium(II) or [1,3-Bis-(2,4,6-trimethylphenyl)-2-imidazolidinylidene]dichloro(o-isopropoxyphenylmethylene)ruthenium, or any example of the ammonium-tagged catalysts, or any example of the poly(ethylene glycol)-tethered catalyst, or Benzylidene-bis(tricyclohexylphosphino)-dichlororuthenium or [1,3-bis-(2,4,6-trimethylphenyl)-2-imidazolidinylidene]dichloro (phenylmethylene)(tricyclohexylphosphino)ruthenium; and initiating the first cross-metathesis reaction involves adding the ruthenium carbene complex 64 and the olefin terminated primers 32D, 34D to a liquid carrier including a solvent of the ruthenium carbene complex 64, thereby generating the mixture; and introducing the mixture into the flow cell 10. Examples of suitable solvents include DMSO, tetrahydrofuran (THF), or aqueous mixtures of these solvents.

In some examples, it may be desirable to incubate the ruthenium carbene complex 64 in an organic solvent with the olefin terminated primers 32D, 34D prior to introducing the mixture to the flow cell 10 and initiating the cross-metathesis reaction. This can generate a water soluble ruthenium carbene complex having the olefin terminated primers attached thereto. This process may be desirable to render an otherwise non-water soluble ruthenium carbene complex water soluble. In one example, the ruthenium carbene complex is Dichloro[1,3-bis(2,4,6-trimethylphenyl)-2-imidazolidinylidene](benzylidene)bis(3-bromopyridine)ruthenium (II); and prior to performing the first cross-metathesis reaction, the method further comprises incubating the olefin terminated primers 32D, 34D in an organic solvent containing the ruthenium carbene complex 64, thereby generating a water soluble ruthenium carbene complex 64 having the olefin terminated primers attached thereto 32D, 34D. In this example, the water soluble ruthenium carbene complex having the olefin terminated primers attached thereto is used in the first cross-metathesis reaction. In this example, the organic solvent may be tetrahydrofuran, and the incubation may take place at a temperature ranging from about 18° C. to about 60° C. for a time of 10 minutes or less. To avoid or at least reduce oligonucleotide to oligonucleotide coupling during incubation, a more diluted mixture of the olefin terminated primers 32D, 34D, the organic solvent, and the ruthenium carbene complex 64 may be used.

The mixture of the ruthenium carbene complex 64 and the olefin terminated primers 32D, 34D or the water soluble ruthenium carbene complex having the olefin terminated primers attached thereto may be introduced to the flow cell 10 using flow through deposition. Grafting may be performed at a temperature ranging from about 55° C. to about 65° C. for a time ranging from about 20 minutes to about 35 minutes. In one example, grafting is performed at 60° C. for about 30 minutes. During grafting, the olefin terminated primers 32D, 34D replace the terminal olefins 66 of the polymeric hydrogel 28, and have no affinity for the interstitial regions 22 or edge portions 30 of the flow cell 10. A grafted primer 32D, 34D is shown at letter C of FIG. 7.

The nucleic acid analysis may then be performed as described in reference to FIG. 2. The template strand 40 and the nascent strand 42 are shown at letter D in FIG. 7.

After sequencing, the regeneration fluid 46''' is introduced into the flow cell 10, e.g., via the inlet, to cleave the grafted olefin terminated primers 32D, 34D (and the template strand 40 and the nascent strand 42 attached thereto) and generate new olefin terminated molecules. The regeneration fluid 46''' includes another olefin terminated molecule that can undergo a cross-metathesis reaction with the terminal olefin (alkene) 62 of the olefin terminated primers 32D, 34D. The ruthenium carbene complex 64 may be introduced to the flow cell 10 with the regeneration fluid 46''' to initiate this additional cross-metathesis reaction. This reaction introduces new olefin terminated molecules along the polymeric hydrogel 28.

Because there are new olefin terminated molecules on the polymeric hydrogel 28, this method may be repeated when it is desirable to perform another nucleic acid analysis. The method continues with another round of primer 32D, 34D grafting and nucleic acid analysis. The processes shown and described in reference to letters B through D may be repeated as desired to perform multiple nucleic acid analyses.

Kit and Method #5

In a fifth example, the kit includes: a flow cell including at least one surface functionalized with a polymeric hydrogel including azide functional groups; a first linker fluid including allyl moieties, each allyl moiety including an internal oxygen, sulfur, or selenium atom and a terminal alkyne to react with a respective one of the azide functional groups; a second linker fluid including olefin terminated molecules, each olefin terminated molecule including a terminal azide functional group; a primer fluid including a plurality of alkyne-containing primers; a ruthenium carbene complex; and a regeneration fluid including the olefin terminated molecules. This kit may be used in the example method shown in FIG. 8.

In this example kit, the flow cell 10 may be any of the examples described herein in reference to FIG. 1B through FIG. 1D. The surface functionalized with the polymeric hydrogel may be any of the patterned or non-patterned structures described herein, which may include any example of the polymeric hydrogel 28 that includes the azide functional groups.

The fifth example kit includes two linker fluids 52''', 52''''. The linker fluids 52''', 52'''' are used to introduce olefins to the polymeric hydrogel 28, which are used in cleavage and regeneration, and to reintroduce azide functional groups, which are used in primer grafting. The fifth example kit, and the method in which it is used, utilizes olefin metathesis for cleavage and regeneration, but avoids involving the primers 32E, 34E in the olefin metathesis reaction.

The first linker fluid 52''' in the fifth example kit includes allyl moieties. The reacted allyl moiety is shown at reference numeral 68 in FIG. 8. Each allyl moiety 68 includes a terminal olefin, an internal oxygen, sulfur, or selenium atom, and a terminal alkyne to react with a respective one of the azide functional groups (of the polymeric hydrogel 28). Each of the oxygen, sulfur, or selenium atoms is reactive in the cross-metathesis reaction. One example of the allyl moiety 68 is:

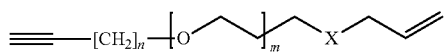

wherein n ranges from 1 to 6, m ranges from 4 to 12, and X=oxygen, sulfur, or selenium.

The second linker fluid 52'''' includes olefin terminated molecules. Each of the olefin terminated molecules includes a terminal olefin 66' and also includes a terminal azide functional group. In an example, each of the olefin terminated molecules in the second linker fluid 52'''' has structure (II):

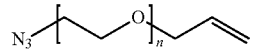

wherein n ranges from 4 to 10.

The linker fluids 52''', 52'''' also include respective carrier liquids, such as water, an aqueous buffer, dimethylsulfoxide (DMSO), or a mixture of a buffer and DMSO. The allyl moieties 68 may be included in the carrier liquid of the linker fluid 52''' in a concentration ranging from about 10 nM to about 50 mM. In another example, the allyl moieties 68 may be included in the carrier liquid of the linker fluid 52''' in a concentration ranging from about 1 μM to about 1 mM. The olefin terminated molecules may be included in the carrier liquid of the linker fluids 52'''' in a concentration ranging from about 10 nM to about 50 mM. In another example, the olefin terminated molecules may be included in the carrier liquid of the linker fluid 52"" in a concentration ranging from about 1 μM to about 1 mM.

The fifth example kit includes another example of the primer fluid. The primer fluid in the fifth example kit includes a plurality of alkyne-containing primers 32E, 34E in a carrier liquid. The alkyne-containing primers 32E, 34E may include forward and reverse amplification primer sequences that are terminated with an alkyne that can participate in a click reaction with the azide functional groups that are introduced to the polymeric hydrogel 28 (e.g., at letter D in FIG. 8). The primers 32E, 34E together enable the amplification of a library template having end adapters that are complementary to the two different primers 32E, 34E.

As examples, the primer sequences of the alkyne-containing primers 32E, 34E may include P5 and P7 primer sequences; P15 and P7 primer sequences; or any combination of the PA primer sequences, the PB primer sequences, the PC primer sequences, and the PD primer sequences set forth herein.

Each of the alkyne-containing primers 32E, 34E in the fifth example kit may also include a polyT sequence or other linking molecule attached at the 5' end of the primer sequence. In some examples, the polyT region includes from 2 T bases to 20 T bases. As specific examples, the polyT region may include 3, 4, 5, 6, 7, or 10 T bases.

Each of the alkyne-containing primers 32E, 34E in the fifth example kit also includes an alkyne that is to react with the azide functional group of the polymeric hydrogel 28. The alkyne may be a terminal alkyne or an internal alkyne. The terminal alkyne is part of an alkyne-containing moiety 38, such as hexyne, that is attached to the 5' end of the primer sequence or to the polyT sequence or other linking molecule that is attached to the 5' end of the primer sequence. The internal alkyne is part of a cyclic compound that is attached to the 5' end of the primer sequence or to the polyT sequence or other linking molecule that is attached to the 5' end of the primer sequence. Bicyclo[6.1.0]nonyne (BCN) is one example that can be attached to generate an internal alkyne.

The carrier liquid of the primer fluid in the fifth example kit may be water, alone or in combination with any of the alkaline buffers set forth herein. The alkyne-containing primers 32E, 34E may be included in the carrier liquid in a concentration ranging from about 0.5 μM to about 100 μM, with a range of 0.5 μM to about 25 μM being particularly suitable for use with the patterned structures disclosed herein.

The fifth example kit also includes a ruthenium carbene complex 64. Any example of the ruthenium carbene complex 64 described herein may be used in the fifth example kit. In one example, the ruthenium carbene complex 64 is selected from the group consisting of Benzylidene-bis(tricyclohexylphosphino)-dichlororuthenium ($1^{st}$ generation Grubbs Catalyst), [1,3-bis-(2,4,6-trimethylphenyl)-2-imidazolidinylidene]dichloro(phenylmethylene)(tricyclohexylphosphino)ruthenium ($2^{nd}$ generation Hoveyda-Grubbs Catalyst), Dichloro(o-isopropoxyphenylmethylene)(tricyclohexylphosphine)ruthenium(II) ($1^{st}$ generation Hoveyda-Grubbs Catalyst), [1,3-Bis-(2,4,6-trimethylphenyl)-2-imidazolidinylidene]dichloro(o-isopropoxyphenylmethylene) ruthenium ($2^{nd}$ generation Grubbs Catalyst), and Dichloro [1,3-bis(2,4,6-trimethylphenyl)-2-imidazolidinylidene] (benzylidene)bis(3-bromopyridine)ruthenium(II) ($3^{rd}$ generation Grubbs Catalyst).

The fifth example kit also includes the regeneration fluid 46"". The regeneration fluid 46"" in the fifth example kit includes the same type of olefin terminated molecules that are included in the second linker fluid 52"".

The method which utilizes the fifth example kit includes: replacing azide functional groups of a polymeric hydrogel 28 on a surface of a flow cell 10 with allyl moieties 68; initiating a first cross-metathesis reaction, in the presence of a ruthenium carbene complex 64, to introduce azide terminated molecules to at least some of the allyl moieties 68, the azide terminated molecules including terminal olefins 66' to react with the allyl moieties 68 and generate respective carbon-carbon double bonds; grafting a plurality of alkyne-containing primers 32E, 34E to respective azide terminated molecules; performing a nucleic acid analysis involving the grafted plurality of alkyne-containing primers 32E, 34E; and initiating a second cross-metathesis reaction, in the presence of the ruthenium carbene complex 64, to introduce new azide terminated molecules to at least some of the carbon-carbon double bonds, the new azide terminated molecules including terminal olefins to react with the carbon-carbon double bonds.

It is to be understood that in this example of the method, the plurality of alkyne-containing primers 32E, 34E may alternatively be pre-grafted to the flow cell 10. In this example, masking may be used during grafting. In these examples, the method would include performing a nucleic acid analysis involving the grafted plurality of alkyne-containing primers 32E, 34E; and initiating a second cross-metathesis reaction, in the presence of the ruthenium carbene complex 64, to introduce new azide terminated molecules to at least some of the carbon-carbon double bonds, the new azide terminated molecules including terminal olefins to react with the carbon-carbon double bonds.

Figure 8:
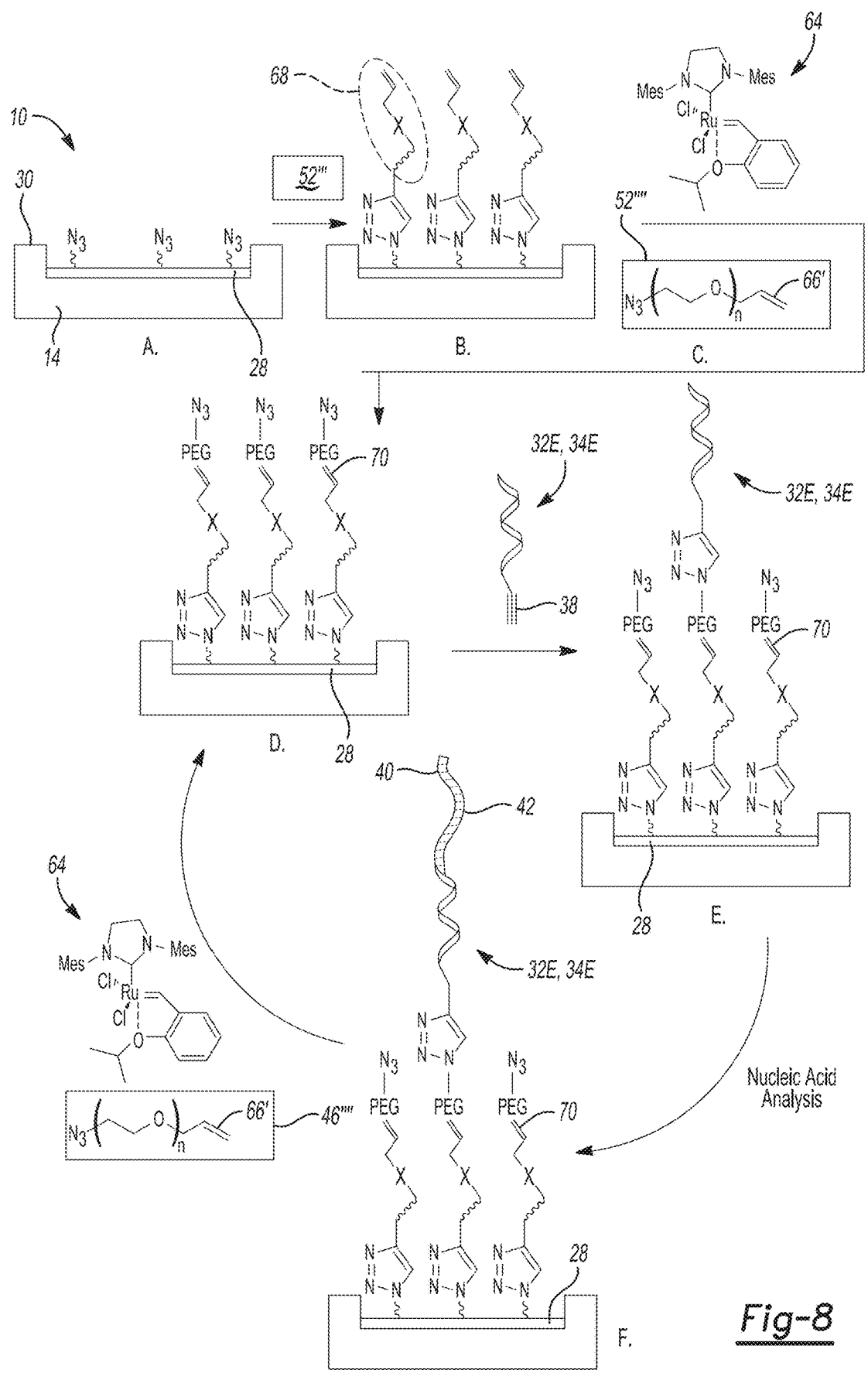
FIG. 8 is a schematic illustration of another example of a method for regenerating primer-grafting functional groups of the polymeric hydrogel after a nucleic acid analysis.

The example method shown in FIG. 8 depicts the regeneration of the azide functional groups on the polymeric hydrogel 28, which is positioned in the lane 26 of the non-patterned structure of the flow cell 10. One lane 26 of the flow cell 10 is depicted at letter A in FIG. 8. It is to be understood that any of the flow cell architectures disclosed herein could be used.

At the outset of the method shown in FIG. 8, the linker fluid 52''' is introduced into the flow cell 10, e.g., via the inlet. As mentioned above, the linker fluid 52"" includes the allyl moiety 68. The terminal alkyne of the allyl moiety 68 reacts with a respective one of the azide functional groups of the polymeric hydrogel 28, and thus introduces a terminal olefin (allyl) to the polymeric hydrogel, as shown at letter B in FIG. 8. The linker fluid 52''' may be allowed to incubate in the flow cell 10 for about 30 minutes at about 60° C., or at other conditions suitable for the click reaction.

This example method then involves introducing the linker fluid 52"" and the ruthenium carbene complex 64. The linker fluid 52"" and the ruthenium carbene complex 64 can be introduced into the flow cell 10, e.g., via the inlet. The linker fluid 52"" and the ruthenium carbene complex 64 initiate a cross-metathesis reaction between the allyl moiety 68 and the terminal olefin 66' of the olefin terminated molecules in the linker fluid 52"". In this example, the terminal olefin (alkene) of the allyl moiety 68 and the terminal olefin (alkene) 66' undergo transalkylidenation. The resulting carbon-carbon double bonds that are generated are shown at reference numeral 70 at letter D in FIG. 8. Because the olefin terminated molecules in the linker fluid 52"" also include a terminal azide, this cross-metathesis reaction introduces azide functional groups ($N_2$) to the polymeric hydrogel 28. This is also shown at letter D in FIG. 8.

In this example method, the ruthenium carbene complex 64 and the linker fluid 52"" are mixed together to generate a mixture, and the mixture is introduced into the flow cell 10. In one example, the ruthenium carbene complex 64 is Dichloro[1,3-bis(2,4,6-trimethylphenyl)-2-imidazolidinylidene](benzylidene)bis(3-bromopyridine)ruthenium(II); and initiating the first-cross metathesis reaction involves adding the ruthenium carbene complex 64 and the linker fluid 52'''' (e.g., including the azide terminated molecules in a liquid carrier including water, t-butanol, and magnesium chloride), thereby generating the mixture; and introducing the mixture into the flow cell 10. In another example, the ruthenium carbene complex 64 is Dichloro(o-isopropoxyphenylmethylene)(tricyclohexylphosphine)ruthenium(II) or [1,3-Bis-(2,4,6-trimethylphenyl)-2-imidazolidinylidene]dichloro(o-isopropoxyphenylmethylene)ruthenium, or any example of the ammonium-tagged catalysts, or any example of the poly(ethylene glycol)-tethered catalyst, or Benzylidene-bis(tricyclohexylphosphino)-dichlororuthenium or [1,3-bis-(2,4,6-trimethylphenyl)-2-imidazolidinylidene]dichloro(phenylmethylene)(tricyclohexylphosphino)ruthenium; and initiating the first cross-metathesis reaction involves adding the ruthenium carbene complex 64 and the linker fluid 52'''' (e.g., including the azide terminated molecules in a liquid carrier including a solvent of the ruthenium carbene complex 64), thereby generating the mixture; and introducing the mixture into the flow cell 10.

This example method then involves grafting the alkyne-containing primers 32E, 34E to at least some of the azide functional groups of the polymeric hydrogel 28. For grafting, the primer fluid of the fifth example kit is introduced into the flow cell 10. The primer fluid may be introduced using flow through deposition. Grafting may be performed at a temperature ranging from about 55° C. to about 65° C. for a time ranging from about 20 minutes to about 35 minutes, or at any other suitable conditions for the click reaction. In one example, grafting is performed at 60° C. for about 30 minutes. During grafting, the alkyne-containing primers 32B, 34B attach to at least some of the azide functional groups of the polymeric hydrogel 28 and have no affinity for the interstitial regions 22 or edge portions 30 of the flow cell 10. A grafted primer 32E, 34E is shown at letter E of FIG. 8.

The nucleic acid analysis may then be performed as described in reference to FIG. 2. The template strand 40 and the nascent strand 42 are shown at letter F in FIG. 8.

After sequencing, the regeneration fluid 46'''' and the ruthenium carbene complex 64 are introduced into the flow cell 10, e.g., via the inlet, to initiate a second cross-metathesis reaction. The second cross-metathesis reaction cleaves the primers 32E, 34E (and the strands 40, 42) from the polymeric hydrogel 28, and introduces new azide functional groups (present in the regeneration fluid 46'''') to the polymeric hydrogel 28. The regeneration fluid 46'''' includes the olefin terminated molecules, each of which includes the terminal olefin 66' and the terminal azide functional group. The second cross-metathesis reaction takes place between the hydrogel-bound olefin (i.e., carbon-carbon double bond) 70 and the terminal olefin 66' of the olefin terminated molecules in the regeneration fluid 46''''. Because the olefin terminated molecules in the regeneration fluid 46'''' include the terminal azides, this cross-metathesis reaction introduces new azide functional groups to the polymeric hydrogel 28. This is shown at letter D in FIG. 8.

Because there are new azide functional groups on the polymeric hydrogel 28, this method may be repeated when it is desirable to perform another nucleic acid analysis. The method continues with another round of primer 32E, 34E grafting and nucleic acid analysis. The processes shown and described in reference to letters D through F may be repeated as desired to perform multiple nucleic acid analyses.

Simultaneous Paired End Read Primer Sets

Each of the primers 32A, 34A through 32E, 34E described in reference to FIG. 2 through FIG. 8 enable a sequential paired-end read nucleic acid analysis. In this method, the respective forward strands that are generated are sequenced and removed, and then the respective reverse strands are generated, sequenced, and removed.

The primers 32A, 34A through 32E, 34E in any of the primer fluids disclosed herein may be replaced with primers sets 80, 82 (see FIG. 9), which enable a simultaneous paired-end read nucleic acid analysis. The primers sets 80, 82 enable a cluster of forward strands to be generated in one region A of the polymeric hydrogel 28 and a cluster of reverse strands to be generated in another region B of the polymeric hydrogel 28. As described herein, the primer sets 80, 82 are controlled so that the cleaving (linearization) chemistry is orthogonal at the different polymeric hydrogel regions 28, A and 28, B. More specifically, the primer sets 80, 82 are related in that one set includes an un-cleavable first primer and a cleavable second primer, and the other set includes a cleavable first primer and an un-cleavable second primer. While the un-cleavable first and second primers of the primer sets 80, 82 are uncleavable during linearization of the clusters, these primers may include the amino cleavable group 36, the enzymatically cleavable group 56, the chemically or enzymatically cleavable group 60, 60', or the olefin-containing moiety 62 that enables them to be cleaved or to participate in the cross-metathesis reaction for flow cell surface regeneration in accordance with the examples set forth herein.

The first primer set 80 includes an un-cleavable first primer 84 and a cleavable second primer 86; and the second primer set 82 includes a cleavable first primer 88 and an un-cleavable second primer 90.

The un-cleavable first primer 84 and the cleavable second primer 86 are oligonucleotide pairs, e.g., where the un-cleavable first primer 84 is a forward amplification primer and the cleavable second primer 86 is a reverse amplification primer or where the cleavable second primer 86 is the forward amplification primer and the un-cleavable first primer 84 is the reverse amplification primer. In the first primer set 80, the cleavable second primer 86 includes a cleavage site 92, while the un-cleavable first primer 84 does not include a cleavage site 92.

The cleavable first primer 88 and the un-cleavable second primer 90 are also oligonucleotide pairs, e.g., where the cleavable first primer 88 is a forward amplification primer and the un-cleavable second primer 90 is a reverse amplification primer or where the un-cleavable second primer 90 is the forward amplification primer and the cleavable first primer 88 is the reverse amplification primer. In the second primer set 82, the cleavable first primer 88 includes a cleavage site 92' or 94, while the un-cleavable second primer 90 does not include a cleavage site 92' or 44.

It is to be understood that the un-cleavable first primer 84 of the first primer set 80 and the cleavable first primer 88 of the second primer set 82 have the same nucleotide sequence (e.g., both are forward amplification primers), except that the cleavable first primer 88 includes the cleavage site 92' or 94 integrated into the primer sequence or into the linking molecule attached to the primer sequence. Similarly, the cleavable second primer 86 of the first primer set 80 and the un-cleavable second primer 90 of the second primer set 82 have the same nucleotide sequence (e.g., both are reverse amplification primers), except that the cleavable second primer 86 includes the cleavage site 92 integrated into the primer sequence or into the linking molecule attached to the primer sequence.

It is to be understood that when the first primers 84 and 88 are forward amplification primers, the second primers 86 and 90 are reverse primers, and vice versa.

The un-cleavable primers 84, 90 may be any primer sequence with a universal sequence for capture and/or amplification purposes, such as the P5 and P7 primers, P15 and P7 primers, or any combination of the PA, PD, PC, PD primers (e.g., PA and PB or PA and PD, etc.) without the cleavage site 92, 92', 94 (e.g., "n" in some of the sequences set forth herein). In some examples, the P5 and P7 primers are un-cleavable primers 84, 90 because they do not include the cleavage site 92, 92', 94. It is to be understood that any suitable universal sequence can be used as the un-cleavable primers 84, 90.

Examples of cleavable primers 86, 88 include the P5 and P7 primers, the P15 and P7 primers, or other universal sequence primers (e.g., the PA, PB, PC, PD primers) with the respective cleavage sites 92, 92', 94 (e.g., "n" in some of the sequences set forth herein) incorporated into the primer sequence or into the linking molecule attached to the primer sequence. Examples of suitable cleavage sites 92, 92', 94 include enzymatically cleavable nucleobases or chemically cleavable nucleobases, modified nucleobases, or linkers (e.g., between nucleobases), as described herein, as long the cleavage sites 92 and 92' or 94 are orthogonal to each other and are orthogonal to any other cleavable moieties (e.g., 30, 56, 60, 60') that are included in the primer set 80, 82.

Each primer set 80 and 82 is attached to a respective region A or B of the polymeric hydrogel 28. The regions 28, A and 28, B are chemically the same, and suitable techniques may be used to sequentially immobilize the primer sets 80, 82 to the desired regions 28, A and 28, B. Alternatively, the primer sets 80, 82 may be pre-grafted to different batches of the polymeric hydrogel 28 and deposited to form the desired regions 28, A and 28, B.

The primers 84, 86 and 88, 90 of the primer sets 80 and 82 are attached to the regions 28, A and 28, B, for example, through the alkyne-containing moiety 38 or the olefin-containing moiety 62 described herein. As described in the examples of FIG. 2 through FIG. 8, the polymeric hydrogel 28 has surface groups that can immobilize the terminal groups at the 5' end of the primers 84, 86 and 88, 90.

As described herein, e.g., in reference to primers 32A, 34A and the cleavage site labeled "n" in the sequences, the cleavage site 92, 92', 94 of each of the cleavable primers 86, 88 is incorporated into the primer sequence.

In one example, the same type of cleavage site 92, 92' is used in the cleavable primers 86, 88 of the respective primer sets 80, 82. As an example, the cleavage sites 92, 92' are uracil bases, and the cleavable primers 86, 88 are P5U and P7U. The uracil bases or other cleavage sites may also be incorporated into any of the PA, PB, PC, and PD primers to generate the cleavable primers 86, 88. In this example, the un-cleavable primer 84 of the oligonucleotide pair 84, 86 may be P7 (without the cleaveage site "n" shown in the sequences), and the un-cleavable primer 90 of the oligonucleotide pair 88, 90 may be P5 (without the cleaveage site "n" shown in the sequence). Thus, in this example, the first primer set 80 includes P7, P5U and the second primer set 82 includes P5, P7U. The primer sets 80, 82 have opposite linearization chemistries, which, after amplification, cluster generation, and linearization, allows forward template strands to be formed on one polymeric hydrogel region 28, A, and reverse strands to be formed on the other polymeric hydrogel region 28, B.

In another example, different types of cleavage sites 92, 94 are used in the cleavable primers 86, 88 of the respective primer sets 80, 82. As examples, two different enzymatic cleavage sites may be used, two different chemical cleavage sites may be used, or one enzymatic cleavage site and one chemical cleavage site may be used as the linearization cleavage sites 92, 94. Examples of different cleavage sites 92, 94 that may be used in the respective cleavable primers 86, 88 include any combination of the following: vicinal diol, uracil, allyl ether, disulfide, restriction enzyme site, and 8-oxoguanine.

Figure 9:
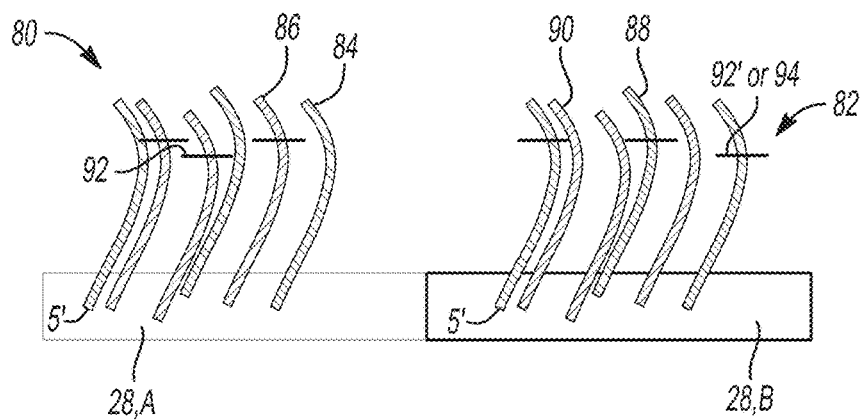
FIG. 9 is a schematic view of first and second primer sets that can be used in the primer fluids disclosed herein.

While not shown in FIG. 9, all of the primers in the primer set 80, 82 also include the amino cleavable group 36 and the alkyne-containing moiety 38, or the enzymatically cleavable group 56 and the alkyne-containing moiety 38, or the chemically or enzymatically cleavable group 60, 60' and the alkyne-containing moiety 38, or the olefin-containing moiety 62, or the alkyne-containing moiety 38 of the respective primers of the 32A, 34A, or 32B, 34B, or 32C, 34C, or 32D, 34D, or 32E, 34E. Thus, the primers in the primer set 80, 82 can participate in the cleavage or cross-metathesis reactions that regenerate the flow cell surface.

To further illustrate the present disclosure, examples are given herein. It is to be understood that these examples are provided for illustrative purposes and are not to be construed as limiting the scope of the present disclosure.

NON-LIMITING WORKING EXAMPLES

Example 1

A patterned flow cell including 8 lanes, each of which had depressions defined therein, was used. Each of the depressions had the polymeric hydrogel, PAZAM, therein. BCN-terminated primers (BCN cleavable-P5 and BCN non-cleavable-P7) were initially grafted to at least some of the azide functional groups of the PAZAM in at least some of the depressions. The primers in lanes 1-4 were not exposed to Exonuclease I or to a cleavage mix containing phosphine. In contrast, the primers in lanes 5-8 were exposed to Exonuclease I and to the cleavage mix containing phosphine in order to digest the primers and reduce unreacted azides to amines.

Figure 10A:
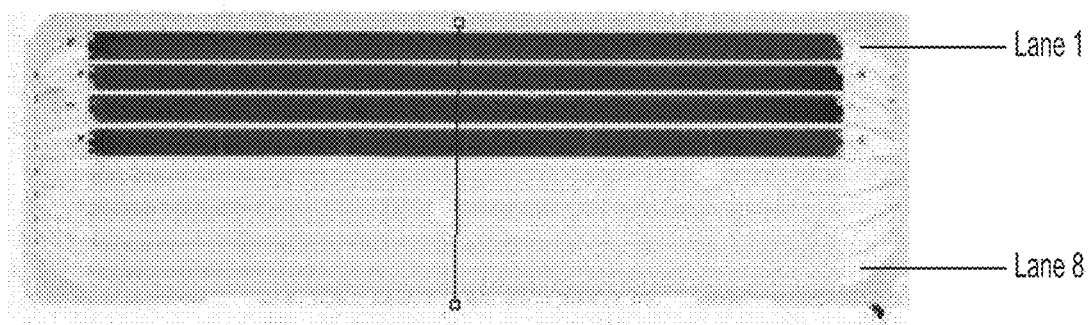
FIGS. 10A and 10B are fluorescence scanner images of a flow cell after primer removal was performed in lanes 5-8 and after a primer regrafting process was attempted in lanes 3-8.

A Cal Fluor Red (CFR) assay was then performed to determine whether digestion of the primers from lanes 5-8 was successful. During the CFR assay, all lanes of the flow cell were exposed to fluorescently tagged (CAL FLUOR® Red (CFR) dye) oligonucleotides in a buffer solution. These oligonucleotides were complementary to the initially grafted BCN-terminated primers. The fluorescently tagged complementary oligonucleotides bind to surface bound primers and excess CFR tagged complementary oligonucleotides were washed off. The surface was then scanned in a fluorescent detector to measure CFR intensity on the surface. A fluorescence scanner image of the flow cell is depicted in FIG. 10A. As shown, fluorescence signals were detected in lanes 1-4 and no signals were detected in lanes 5-8. The results in FIG. 10A demonstrate that the initially grafted primers were removed from lanes 5-8.

Regrafting of the BCN-terminated primers was then attempted in some of the lanes. In some lanes (5, 6, and 8), azide regeneration was attempted followed by BCN-terminated primer grafting. In another lane (7), BCN-terminated primer grafting was attempted without first attempting azide regeneration. Azide regeneration was not performed in lanes 1-4, as these lanes were not exposed to the cleavage mix containing phosphine which reduces the azides to amines. The regrafting conditions that were used in each of the lanes are shown in Table 1.

TABLE 1

| Lane | Azide Regeneration | Regraft |
|---|---|---|
| 1 | No | No |
| 2 | No | No |
| 3 | No | BCN cleavable-P5 and BCN non-cleavable-P7 |
| 4 | No | BCN cleavable-P5 and BCN non-cleavable-P7 |
| 5 | Azido-PEG$_4$-N-Hydroxysuccinimide ester | BCN cleavable-P5 and BCN non-cleavable-P7 |
| 6 | Azido-PEG$_4$-N-Hydroxysuccinimide ester | BCN cleavable-P5 and BCN non-cleavable-P7 |
| 7 | No | BCN cleavable-P5 and BCN non-cleavable-P7 |
| 8 | Azido-PEG$_4$-N-Hydroxysuccinimide ester | BCN cleavable-P5 and BCN non-cleavable-P7 |

For azide regeneration, a 10 mM aqueous solution of Azido-PEG was introduced into lanes 5, 6, and 8 and allowed to incubate at about 25° C. for about 30 minutes. Lanes 1-4 and 7 were not exposed to this treatment. Each lane was then exposed to a wash solution.

Then, a primer fluid containing 10 µM BCN-terminated primers was introduced into lanes 3-8. The primer fluid was allowed to incubate for about 2 hours at 60° C.

Figure 10B:
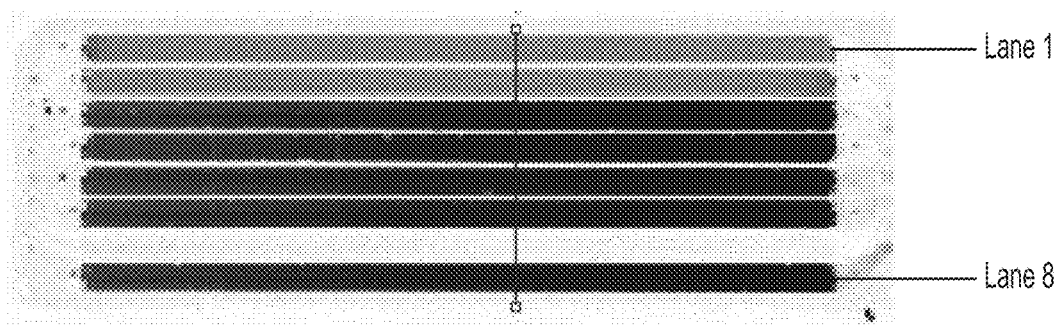

The Cal Fluor Red (CFR) assay was then repeated to determine whether primer regrafting in lanes 3-8 was successful. A fluorescence scanner image of the flow cell after regrafting is depicted in FIG. 10B. The results for lanes 3 and 4 indicated that additional primer grafting to surface azides (that had not been reduced to amines due to cleavage mix exposure) did take place. The results in lanes 5, 6, and 8 indicated that azide regeneration and primer grafting was successful. The lack of fluorescence signal in lane 7 indicated that the cleavage mix did reduce the azides to amines, and that azide regeneration was needed in order to regraft the primers.

Library fragments (from the PhiX genome) were introduced and clustering was performed using bridge amplification. A first sequencing run was then performed on the flow cell.

The sequencing data collected included fluorescence intensity, passing filter (% PF) (percentage), and the percentage of Qscores that were greater than Q30. Passing filter (PF) is the metric used to describe clusters which pass a chastity threshold and are used for further processing and analysis of sequencing data. The % PF calculation involves the application of a chastity filter to each cluster. "Chastity" is defined as the ratio of the brightest base intensity divided by the sum of the brightest and second brightest base intensities. Clusters "pass filter" if no more than 1 base call has a chastity value below 0.6 in the first 25 cycles. This filtration process removes the least reliable clusters from the image analysis results. As such, a higher % passing filter result indicates an increased yield of unique clusters used for sequencing data. A Qscore of 30 (Q30) is equivalent to the probability of an incorrect base call 1 in 1000 times. This means that the base call accuracy (i.e., the probability of a correct base call) is 99.9%. A lower base call accuracy of 99% (Q20) will have an incorrect base call probability of 1 in 100, meaning that every 100 base pair sequencing read will likely contain an error. When sequencing quality reaches Q30, virtually all of the reads will be perfect, having 99.9% accuracy.

The sequencing data from the first sequencing run for lane 2 (positive control), lane 5 (successful regeneration and regraft), and lane 7 (negative control) is reproduced in Table 2.

TABLE 2

| | First Sequencing Run | | |
|---|---|---|---|
| Lane | Intensity | Cluster PF (%) | % >= Q30 |
| 2 | 258 ± 18 | 82.93 ± 1.71 | 92.96 |
| 5 | 530 ± 57 | 75.54 ± 1.84 | 93.01 |
| 7 | 4 ± 5 | 0.00 ± 0.00 | 0.00 |

After sequencing, the primers in lanes 2-8 were removed by exposure to deoxyribonuclease (to remove clustered DNA) and then Exonuclease I (to remove single stranded DNA and leftover primers), and azide generation and another round of primer grafting was performed as described in this example.

Library fragments (from the PhiX genome) were again introduced and clustering was performed using bridge amplification. A second sequencing run was then performed on the flow cell. The same sequencing data was collected in the second sequencing run as the first sequencing run. The data from the second sequencing run for lane 2 (positive control), lane 5 (successful regeneration and regraft), and lane 7 (negative control) is reproduced in Table 3.

TABLE 3

| | Second Sequencing Run | | |
|---|---|---|---|
| Lane | Intensity | Cluster PF (%) | % >= Q30 |
| 2 | 362 ± 43 | 76.60 ± 7.18 | 94.73 |
| 5 | 329 ± 38 | 76.96 ± 7.39 | 95.13 |
| 7 | 402 ± 37 | 79.16 ± 6.74 | 95.25 |

These results illustrate that sequencing can be successfully performed after primer removal, azide regeneration, and primer regrafting.

Example 2

A patterned flow cell including 8 lanes, each of which had depressions defined therein, was used. Each of the depressions had the polymeric hydrogel, PAZAM, therein.

Lanes 1 and 8 were control lanes that included P5/P7 primers attached to azide groups of the PAZAM. Lane 1 was not exposed to primer removal or regrafting, while lane 8 was exposed to P5/P7 primer removal and regrafting.

Different tetrazine molecules were introduced to the PAZAM in lanes 2-7. BCN-terminated primers (BCN cleavable-P5 and BCN non-cleavable-P7) were initially grafted to at least some of the tetrazine molecules. Primer removal was performed in lanes 2, 4, 6, and 8. Primer regrafting was performed in lanes 2-7. Primer removal was followed by either i) the introduction of additional tetrazine molecules and another round of primer grafting (lanes 2, 4, 6, 8) or ii) another round of primer grafting without first introducing additional tetrazine molecules (lanes 3, 5, and 7).

After primer grafting, primer removal, and attempted primer regrafting, a TET (TET™ Dye Phosphoramidite) quality control (QC) assay was performed to determine whether the respective processes were successful. During the TET QC assay, all lanes of the flow cell were exposed to fluorescently tagged (TET™ Dye Phosphoramidite) oligonucleotides in a buffer solution. These oligonucleotides were complementary to the grafted P5/P7 and BCN-terminated primers. The fluorescently tagged complementary oligonucleotides bind to surface bound primers and excess TET tagged complementary oligonucleotides were washed off. The surface was then scanned in a fluorescent detector to measure TET intensity on the surface. The fluorescently tagged complementary oligonucleotides were dehybridized after imaging using 0.1 M NaOH.

Tables 4A and 4B depict the series of steps that were performed in each of the lanes of the flow cell. The following abbreviations are used in Tables 4A and 4B: MT-S-NHSE=Methyltetrazine-sulfo-NHS ester; MT-PEG-NHS-E=Methyltetrazine-PEG4-NHS ester; S-6-MT-DBCO=Sulfo-6-methyl-tetrazine-DBCO; Exo I=Exonuclease I; and DNase=deoxyribonuclease.

The results illustrate that primer removal and regrafting was successful in each of lanes 2, 4, 6, and 8. The results for lanes 3, 5, and 7, where primer removal was not performed before additional primer grafting was performed, indicate that new primers can be grafted to tetrazine molecules that had not been grafted in a previous grafting process.

Library fragments (from the PhiX genome) were introduced and clustering was performed using bridge amplification. A first sequencing run was then performed on the flow cell.

The sequencing data collected included fluorescence intensity, passing filter (% PF) (percentage), and the percentage of Qscores that were greater than Q30.

The sequencing data from the first sequencing run for lanes 1 and 8 (controls), and 2, 4, and 6 (successful regraft) is reproduced in Table 5.

TABLE 4A

Lanes 2-7

| Process | Lane 2 | Lane 3 | Lane 4 | Lane 5 | Lane 6 | Lane 7 |
|---|---|---|---|---|---|---|
| Azide → Amine Conv. | | Phosphine | | | No | No |
| P5/P7 Graft | | | No | | | |
| Tetrazine Coupling | MT-S-NHSE | | MT-PEG-NHS-E | | S-6-MT-DBCO | |
| BCN-Oligo Graft | | | Yes | | | |
| TET QC | | | Yes | | | |
| Primer Removal | Exo I/DNase | None | Exo I/DNase | None | Exo I/DNase | None |
| TET QC | | | Yes | | | |
| P5/P7 Graft | | | No | | | |
| Tetrazine Coupling | MT-S-NHSE | None | MT-PEG-NHS-E | None | S-6-MT-DBCO | None |
| BCN-Oligo Graft | | | Yes | | | |
| TET ™ QC | | | Yes | | | |

TABLE 4B

Lanes 1 and 8

| Process | Lane 1 | Lane 8 |
|---|---|---|
| Azide → Amine Conv. | | No |
| P5/P7 Graft | | Yes |
| Tetrazine Coupling | | No |
| BCN-Oligo Graft | | No |
| TET QC | | Yes |
| Primer Removal | None | Exo I/DNase |
| TET QC | | Yes |
| P5/P7 Graft | No | Yes |
| Tetrazine Coupling | | No |
| BCN-Oligo Graft | | No |
| TET QC | | Yes |

Figure 11A:
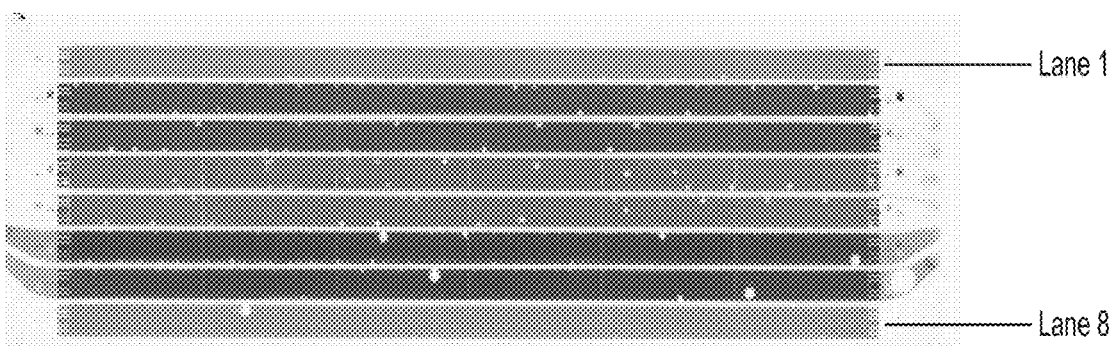
FIGS. 11A, 11B, and 11C are fluorescence scanner images of a flow cell after initial primer grafting in lanes 1-8, after primer removal was performed in lanes 2, 4, 6, and 8, and after a primer regrafting process was attempted in lanes 2-7.
Figure 11B:
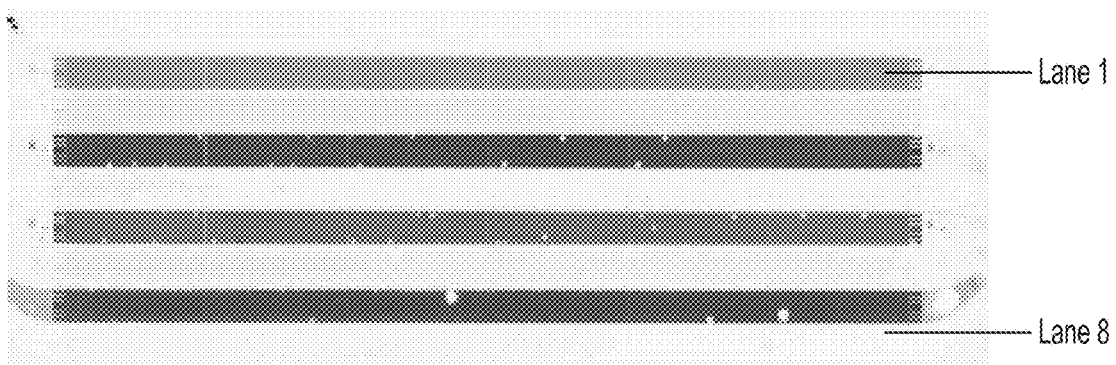
Figure 11C:
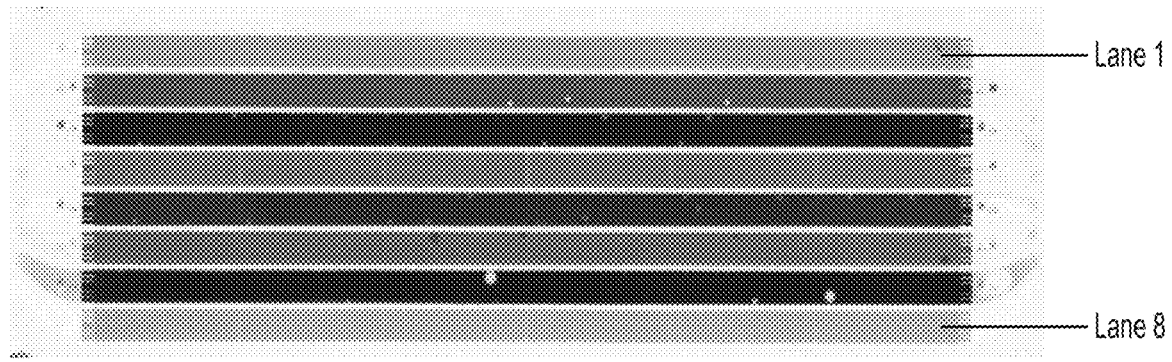
Figure 12:
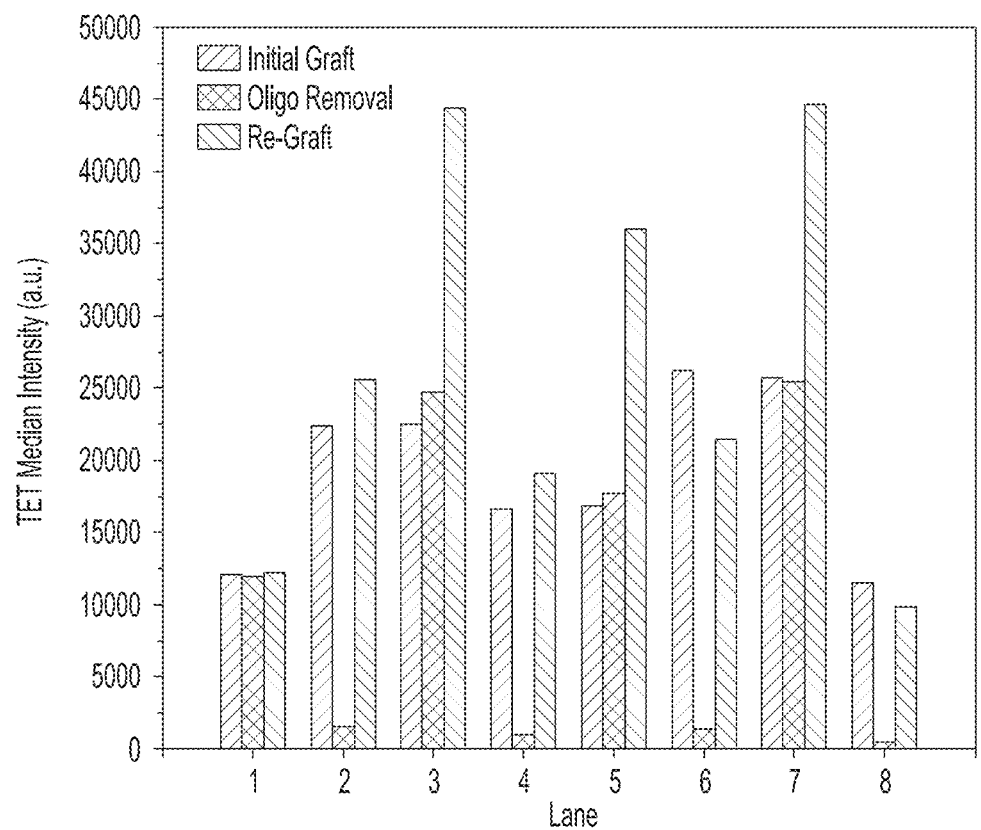
FIG. 12 is a graph depicting the quantitative TET™ Dye Phosphoramidite assay results for the flow cells of FIGS. 11A, 11B, and 11C.

Fluorescence scanner images of the flow cell after the initial primer grafting processes, after primer removal, and after the primer regrafting processes are respectively depicted in FIG. 11A, FIG. 11B, and FIG. 11C. As shown, fluorescence signals were detected in all of the lanes 1-8 after primer grafting (FIG. 11A) and regrafting (FIG. 11C) and little to no signals were detected in lanes 2, 4, 6, and 8 after primer removal (FIG. 11B). The corresponding quantitative results of the TET QC assay after the initial primer grafting processes, after primer removal, and after the primer regrafting processes are shown in FIG. 12.

TABLE 5

First Sequencing Run

| Lane | Intensity | Cluster PF (%) | % >= Q30 |
|---|---|---|---|
| 1 | 298 ± 16 | 79.57 ± 7.09 | 94.10 |
| 2 | 250 ± 18 | 69.70 ± 6.53 | 85.68 |
| 4 | 284 ± 21 | 69.54 ± 5.14 | 85.46 |
| 6 | 362 ± 43 | 63.78 ± 11.39 | 82.98 |
| 8 | 246 ± 21 | 78.82 ± 5.98 | 93.31 |

These results illustrate that sequencing can successfully be performed after primer removal and regraft.

Example 3

A patterned flow cell including 8 lanes, each of which had depressions defined therein, was used. Each of the depressions had the polymeric hydrogel, PAZAM, therein.

Different tetrazine molecules were introduced to the PAZAM in lanes 1-8. BCN-terminated primers (BCN cleavable-P5 and BCN non-cleavable-P7) were initially grafted to at least some of the tetrazine molecules in each of the lanes. Primer removal was performed in lanes 4 and 5. Primer removal was followed by either i) the introduction of additional tetrazine molecules and another round of primer grafting (lane 4) or ii) another round of primer grafting (lane 5).

After primer grafting, primer removal, and attempted primer regrafting, a TET quality control (QC) assay was performed as described in Example 2. The surface was then scanned in a fluorescent detector to measure TET intensity on the surface. The fluorescently tagged complementary oligonucleotides were dehybridized after imaging using 0.1 M NaOH.

Tables 6A and 6B depict the series of steps that were performed in each of the lanes of the flow cell. The following abbreviations are used in Tables 5A and 5B: MT-S-NHSE=Methyltetrazine-sulfo-NHS ester; MT-PEG-NHS-E=Methyltetrazine-PEG4-NHS ester; S-6-MT-DBCO=Sulfo-6-methyl-tetrazine-DBCO; Exo I=Exonuclease I; and DNase=deoxyribonuclease.

TABLE 6A

Lanes 1-5

| Process | Lane 1 | Lane 2 | Lane 3 | Lane 4 | Lane 5 |
|---|---|---|---|---|---|
| Azide → Amine Conv. | None | | | Phosphine | |
| Tetrazine Coupling | S-6-MT-DBCO | | | MT-S-NHSE | |
| BCN-Oligo Graft | Yes | Yes | Yes | Yes | Yes |
| TET QC | | | Yes | | |
| Primer Removal | | No | | Exo I/DNase | Exo I/DNase |
| TET QC | | | Yes | | |
| Tetrazine Coupling | | No | | MT-S-NHSE | No |
| BCN-Oligo Graft | | No | | Yes | |
| TET™ QC | | | Yes | | |

TABLE 6B

Lanes 6-8

| Process | Lane 6 | Lane 7 | Lane 8 |
|---|---|---|---|
| Azide → Amine Conv. | | Phosphine | |
| Tetrazine Coupling | | MT-PEG-NHS-E | |
| BCN-Oligo Graft | Yes | Yes | Yes |
| TET QC | | Yes | |
| Primer Removal | | None | |
| Tetrazine Coupling | | None | |
| TET QC | | Yes | |
| P5/P7 Graft | No | Yes | |
| Tetrazine Coupling | | No | |
| BCN-Oligo Graft | | No | |
| TET QC | | Yes | |

Figure 13A:
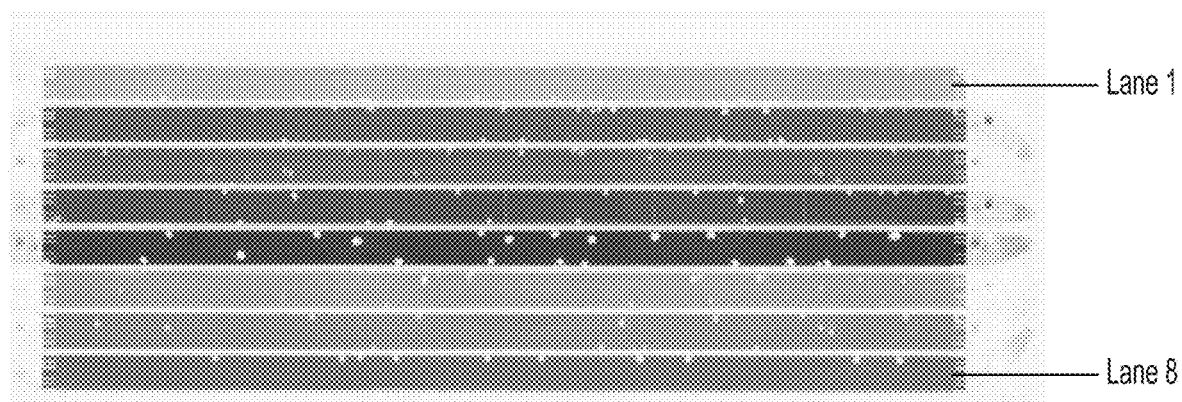
FIGS. 13A, 13B, and 13C are fluorescence scanner images of a flow cell after initial primer grafting in lanes 1-8, after primer removal was performed in lanes 4 and 5, and after a primer regrafting process was attempted in lanes 4 and 5.
Figure 13B:
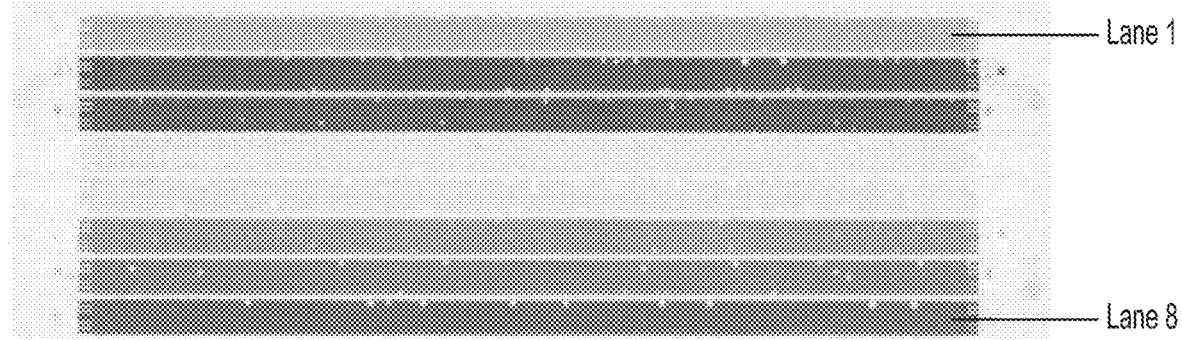
Figure 13C:
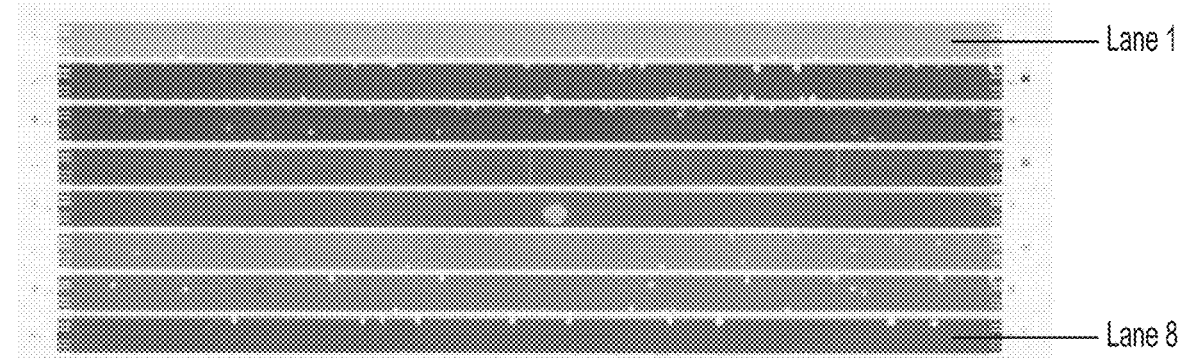
Figure 14:
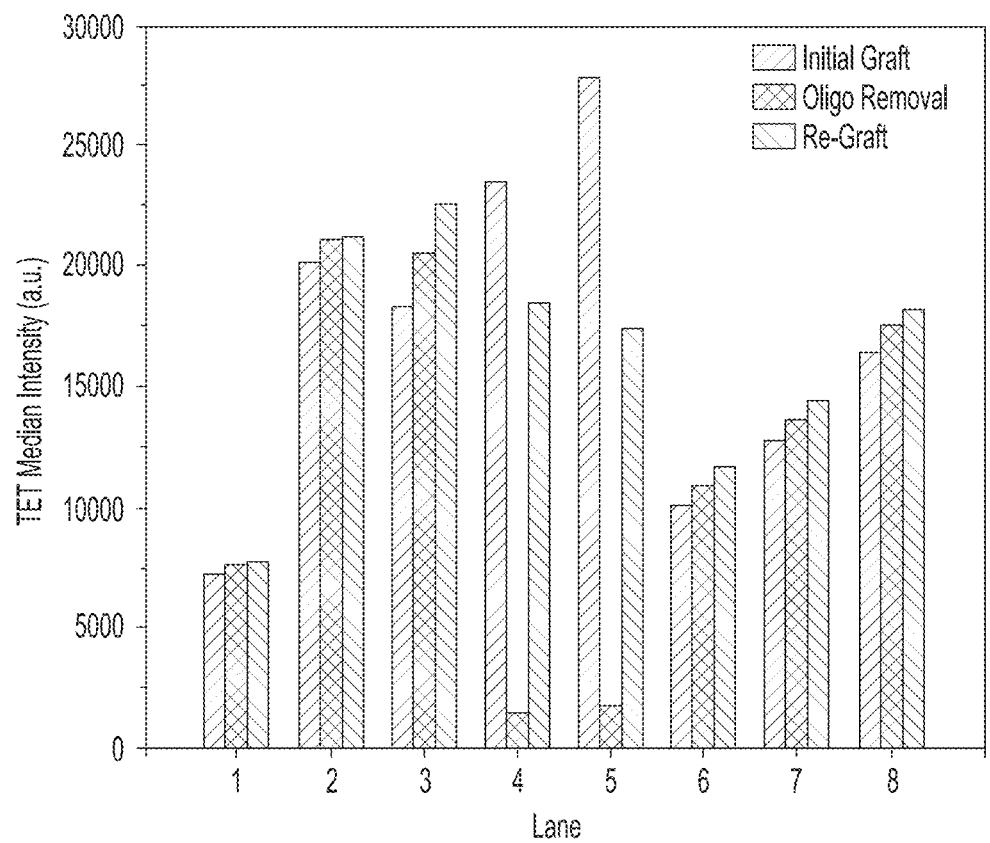
FIG. 14 is a graph depicting the quantitative TET™ Dye Phosphoramidite assay results for the flow cells of FIGS. 13A, 13B, and 13C.

Fluorescence scanner images of the flow cell after the initial primer grafting processes, after primer removal, and after the primer regrafting processes are respectively depicted in FIG. 13A, FIG. 13B, and FIG. 13C. As shown, fluorescence signals were detected in all of the lanes 1-8 after primer grafting (FIG. 13A) and regrafting (FIG. 13C) and little to no signals were detected in lanes 4 and 5 after primer removal (FIG. 13B). The corresponding quantitative results of the TET QC assay after the initial primer grafting processes, after primer removal (in lanes 4 and 5), and after the primer regrafting processes are shown in FIG. 14.

The results illustrate that primer removal and regrafting was successful in lanes 4 and 5. The results for lane 5, where additional tetrazine coupling was not performed after primer removal, also indicate that new primers can be grafted to tetrazine molecules that had not been grafted in a previous grafting process.

Additional Notes

It is to be understood that any features of the examples set forth herein may be combined together in any desirable manner to achieve the benefits as described in this disclosure, including, for example, to obtain a flow cell.

It should also be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A kit, comprising:
   a flow cell including at least one surface functionalized with a polymeric hydrogel including azide functional groups or amine functional groups;
   a primer fluid including a plurality of alkyne-containing primers, each alkyne-containing primer having an amino cleavable group attaching a primer sequence of the alkyne-containing primer to an alkyne-containing moiety of the alkyne-containing primer; and
   a cleaving fluid that is reactive with the amino cleavable group,
   wherein the amino cleavable group of each of the plurality of alkyne-containing primers is a BOC amide or triphenylmethylamine; and
   wherein the cleaving fluid is an acid.

2. The kit as defined in claim 1, wherein the surface of the flow cell is non-patterned, and the polymeric hydrogel is positioned within a lane of the non-patterned surface.

3. The kit as defined in claim 1, wherein the surface of the flow cell is patterned with depressions separated by interstitial regions, and the polymeric hydrogel is positioned within each depression of the patterned surface.

4. The kit as defined in claim 1, wherein the surface of the flow cell is patterned with protrusions separated by interstitial regions, and the polymeric hydrogel is positioned on each protrusion of the patterned surface.

5. A kit, comprising:
   a flow cell including at least one surface functionalized with a polymeric hydrogel including azide functional groups or amine functional groups;
   a primer fluid including a plurality of alkyne-containing primers, each alkyne-containing primer having an amino cleavable group attaching a primer sequence of the alkyne-containing primer to an alkyne-containing moiety of the alkyne-containing primer;
   a cleaving fluid that is reactive with the amino cleavable group; and
   a regeneration fluid including i) azide terminated molecules selected from the group consisting of azido-$PEG_4$-C2-carboxylic acid, trifluoromethanesulfonyl azide, imidazolium sulfonyl azide hydrochloride, 1-(fluorosulfuryl)-2,3-dimethyl-1H-imidazol-3-ium trifluoromethanesulfonate, fluorosulfuryl azide, perfluorobutanesulfonyl azide, azido-$PEG_4$-N-Hydroxysuccinimide ester, and imidazole-1-sulfonyl azide hydrochloride, or ii) tetrazine terminated molecules selected from the group consisting of tetrazine-N-Hydroxysuccinimide ester and methyltetrazine-sulfo-N-Hydroxysuccinimide ester.

6. A kit, comprising:
   a flow cell including at least one surface functionalized with a polymeric hydrogel including azide functional groups or amine functional groups;
   a primer fluid including a plurality of alkyne-containing primers, each alkyne-containing primer having an amino cleavable group attaching a primer sequence of the alkyne-containing primer to an alkyne-containing moiety of the alkyne-containing primer;
   a cleaving fluid that is reactive with the amino cleavable group; and
   a linker fluid including one of:
      a tetrazine molecule to react with the amine functional groups of the flow cell, the tetrazine molecule being selected from the group consisting of tetrazine-N-Hydroxysuccinimide ester, methyltetrazine-sulfo-N-Hydroxysuccinimide ester, and methyltetrazine-$PEG_n$-N-Hydroxysuccinimide ester where n=4 or 5 or 8; or a tetrazine molecule to react with the azide functional groups of the flow cell, the tetrazine molecule being sulfo-6-methyl-tetrazine-dibenzocyclooctyne.

7. A method, comprising:
   grafting a plurality of alkyne-containing primers to respective azide functional groups or tetrazine functional groups of a polymeric hydrogel on a surface of a flow cell, each of the plurality of alkyne-containing primers having an amino cleavable group attaching a primer sequence of the alkyne-containing primer to an alkyne-containing moiety of the alkyne-containing primer;
   performing a nucleic acid analysis involving the grafted plurality of alkyne-containing primers;
   introducing a cleaving fluid to cleave the grafted plurality of alkyne-containing primers at the amino cleavable group, thereby leaving a plurality of amine functional groups at the surface of the flow cell; and
   reacting respective azide terminated molecules or tetrazine terminated molecules with at least some of the plurality of amine functional groups to introduce new azide functional groups or new tetrazine functional groups to the surface of a flow cell.

8. The method as defined in claim 7, wherein performing the nucleic acid analysis involves:
   introducing a sample including a plurality of template nucleic acid strands into the flow cell, whereby at least some of the plurality of template nucleic acid strands respectively hybridize to the primer sequence of at least some of the grafted plurality of alkyne-containing primers; and
   performing sequencing-by-synthesis.

9. The method as defined in claim 7, wherein:
   the azide terminated molecules are selected from the group consisting of azido-$PEG_4$-C2-carboxylic acid, trifluoromethanesulfonyl azide, imidazolium sulfonyl azide hydrochloride, 1-(fluorosulfuryl)-2,3-dimethyl-1H-imidazol-3-ium trifluoromethanesulfonate, fluorosulfuryl azide, perfluorobutanesulfonyl azide, azido-$PEG_4$-N-Hydroxysuccinimide ester and imidazole-1-sulfonyl azide hydrochloride; or
   the tetrazine terminated molecules are selected from the group consisting of tetrazine-N-Hydroxysuccinimide ester, methyltetrazine-sulfo-N-Hydroxysuccinimide ester, sulfo-6-methyl-tetrazine-dibenzocyclooctyne, and methyltetrazine-$PEG_n$-N-Hydroxysuccinimide ester where n=4 or 5 or 8.

10. The method as defined in claim 7, wherein:
    the flow cell includes the azide functional groups;
    some of the azide functional groups remain free after grafting;
    the free azide functional groups are reduced to amine groups during the nucleic acid analysis; and
    at least some of the azide terminated molecules react with at least some of the plurality of amine functional groups and at least some other of the azide terminated molecules react with the amine groups.

11. The method as defined in claim 7, wherein:
    the amino cleavable group is a phthalimide group; and
    the cleaving fluid includes hydrazine or methyl hydrazine.

12. The method as defined in claim 7, wherein:
    the amino cleavable group is a BOC amide or triphenylmethylamine; and
    the cleaving fluid includes an acid.

* * * * *